US012466251B2

(12) United States Patent
Fanara

(10) Patent No.: US 12,466,251 B2
(45) Date of Patent: Nov. 11, 2025

(54) TRANSMISSION SYSTEM FOR A HYBRID DRIVE UNIT

(71) Applicant: CUSTOMACHINERY INC., Mississauga (CA)

(72) Inventor: Roberto Fanara, Mississauga (CA)

(73) Assignee: CUSTOMACHINERY INC., Mississauga (CA)

( * ) Notice: Subject to any disclaimer, the term of this patent is extended or adjusted under 35 U.S.C. 154(b) by 0 days.

(21) Appl. No.: 18/608,684

(22) Filed: Mar. 18, 2024

(65) Prior Publication Data

US 2024/0308325 A1    Sep. 19, 2024

Related U.S. Application Data

(60) Provisional application No. 63/458,130, filed on Apr. 9, 2023, provisional application No. 63/453,132, filed on Mar. 19, 2023.

(51) Int. Cl.
*B60K 6/48*    (2007.10)
*B60K 6/26*    (2007.10)
(Continued)

(52) U.S. Cl.
CPC ............ *B60K 6/48* (2013.01); *B60K 6/383* (2013.01); *B60K 6/387* (2013.01); *F16D 11/14* (2013.01);
(Continued)

(58) Field of Classification Search
CPC .......... B60K 6/38; B60K 6/383; B60K 6/387; B60K 6/48; B60K 2006/4825;
(Continued)

(56) References Cited

U.S. PATENT DOCUMENTS 2,691,437 A * 10/1954 Dalrymple .............. F16D 13/18
192/93 A
5,193,634 A    3/1993 Masut
(Continued)

FOREIGN PATENT DOCUMENTS

| DE | 202011104776 U1 | 11/2012 |
| EP | 3529512 B1 | 8/2020 |
| WO | 2004054836 A1 | 7/2004 |

OTHER PUBLICATIONS

Canadian Intellectual Property Office, International Search Report and Written Opinion of the International Searching Authority in PCT/CA2024/050326, Jun. 11, 2024.

*Primary Examiner* — Richard M Lorence
(74) *Attorney, Agent, or Firm* — Aird & McBurney LP

(57) ABSTRACT

A transmission system for a hybrid drive unit is provided herein. The transmission system includes a centrifugal clutch that is connected to a driven shaft and that is connectable to an electric machine, as well as a clutch slider element that is connected to a rotor of the electric machine and that is slidable relative to the centrifugal clutch between three engagement positions. In one of the position the transmission system is operable in either an electric-only drive mode (electric machine drives the driven shaft while the centrifugal clutch is disengaged), or at least one hybrid drive mode (engine and electric machine drive the driven shaft). The transmission system also includes a clutch override assembly for rotatably coupling the centrifugal clutch and clutch slider element to provide continuous torque transmission to the driven shaft when switching between the electric-only drive mode and the at least one hybrid drive mode.

20 Claims, 34 Drawing Sheets

(51) Int. Cl.
  *B60K 6/383*  (2007.10)
  *B60K 6/387*  (2007.10)
  *F16D 11/14*  (2006.01)
  *F16D 43/12*  (2006.01)
  *F16D 43/18*  (2006.01)
  *F16D 47/00*  (2006.01)

(52) U.S. Cl.
  CPC .............. *F16D 43/12* (2013.01); *F16D 43/18* (2013.01); *F16D 47/00* (2013.01); *B60K 2006/268* (2013.01); *B60K 2006/4825* (2013.01); *Y02T 10/62* (2013.01)

(58) Field of Classification Search
  CPC ... B60K 2006/268; F16D 43/08; F16D 43/12; F16D 2043/145; F16D 43/18; F16D 11/10; F16D 11/14; F16D 47/00; Y02T 10/62
  See application file for complete search history.

(56) References Cited

U.S. PATENT DOCUMENTS

| | | | |
|---|---|---|---|
| 5,773,904 A | 6/1998 | Schiebold et al. | |
| 5,931,271 A | 8/1999 | Haka | |
| 6,007,443 A | 12/1999 | Onimaru et al. | |
| 6,208,036 B1 | 3/2001 | Evans et al. | |
| 6,645,017 B1 | 11/2003 | Skrzypek et al. | |
| 6,659,910 B2 | 12/2003 | Gu et al. | |
| 6,720,696 B2 | 4/2004 | Berhan | |
| 6,781,272 B2 | 8/2004 | Kahlon et al. | |
| 6,888,273 B2 | 5/2005 | Hughes et al. | |
| 7,182,167 B2 | 2/2007 | Sasamoto | |
| 7,306,084 B2 | 12/2007 | Abusamra et al. | |
| 7,351,265 B2 | 4/2008 | Vitale et al. | |
| 7,410,444 B2 | 8/2008 | Groddeck et al. | |
| 7,469,778 B2 | 12/2008 | Groddeck et al. | |
| 7,485,061 B2 | 2/2009 | Reisch et al. | |
| 7,998,023 B2 | 8/2011 | Holmes et al. | |
| 8,074,758 B2 | 12/2011 | Angeletti | |
| 8,322,504 B2 | 12/2012 | Mueller et al. | |
| 8,327,986 B2 | 12/2012 | Engelmann et al. | |
| 8,360,181 B2 | 1/2013 | Wei et al. | |
| 8,499,867 B2 | 8/2013 | Maracci et al. | |
| 8,545,367 B2 | 10/2013 | Hartz et al. | |
| 8,556,010 B2 | 10/2013 | Ebert et al. | |
| 8,777,806 B2 | 7/2014 | Birkhold et al. | |
| 8,920,275 B2 | 12/2014 | Reitz et al. | |
| 8,992,378 B2 | 3/2015 | Holmes et al. | |
| 9,132,725 B2 | 9/2015 | Barnes | |
| 9,358,866 B2 | 6/2016 | Hartz et al. | |
| 9,511,761 B2 | 12/2016 | Yagyu et al. | |
| 10,023,184 B2 | 7/2018 | Hartz et al. | |
| 10,179,506 B2 | 1/2019 | Yagyu et al. | |
| 10,328,786 B2 | 6/2019 | Singh et al. | |
| 10,343,677 B2 | 7/2019 | Colavincenzo et al. | |
| 10,358,123 B2 | 7/2019 | Lee et al. | |
| 10,479,180 B2 | 11/2019 | Colavincenzo et al. | |
| 10,569,637 B2 | 2/2020 | Aringsmann et al. | |
| 10,882,512 B2 | 1/2021 | Kobler et al. | |
| 10,926,620 B2 | 2/2021 | McBride et al. | |
| 11,351,853 B2 | 6/2022 | Walter | |
| 11,396,286 B2 | 7/2022 | Campbell et al. | |
| 11,505,054 B2 | 11/2022 | Fanara | |
| 2003/0080637 A1 | 5/2003 | Berhan | |
| 2004/0084979 A1 | 5/2004 | Hughes et al. | |
| 2018/0347642 A1 | 12/2018 | Kimes | |
| 2021/0246950 A1 | 8/2021 | Pawley et al. | |
| 2022/0041044 A1 | 2/2022 | Fanara | |
| 2022/0185091 A1 | 6/2022 | Hofstetter | |
| 2022/0213833 A1 | 7/2022 | Shepherd et al. | |
| 2022/0235829 A1 | 7/2022 | Hand | |

\* cited by examiner

TRANSMISSION SYSTEM FOR A HYBRID DRIVE UNIT

This application claims the benefit of and priority to U.S. Provisional Patent Application Ser. No. 63/453,132, the contents of which are hereby incorporated by reference in their entirety. This application also claims the benefit of and priority to U.S. Provisional Patent Application Ser. No. 63/458,130, the contents of which are hereby incorporated by reference in their entirety.

FIELD OF THE DISCLOSURE

The present disclosure relates generally to hybrid electric/combustion propulsion and electric generator systems. In particular, the disclosure relates to a transmission system for a hybrid drive unit.

BACKGROUND OF THE DISCLOSURE

Hybrid engines combine a traditional internal combustion engine and an electric motor to provide a hybrid propulsion arrangement that combines the power provided by the air-fuel combustion of an internal combustion engine and the power provided by an electric motor. A centrifugal clutch comprises a central hub, a circular housing or drum about the hub, and spring-loaded flyweights or shoes between the hub and the drum. Rotation of a centrifugal clutch to a threshold speed causes the flyweights to move outward (i.e., away from the hub), by centrifugal force, until the flyweights frictionally engage the drum to thereby cause rotation of the drum and a driven shaft that is in cooperative engagement with the drum. A centrifugal clutch may be used to operatively connect an engine crankshaft to a driven shaft once the crankshaft rotates past a threshold speed, so as to permit transmission of power from the crankshaft to the driven shaft.

SUMMARY OF THE DISCLOSURE

According to an aspect, there is provided a transmission system for selectively connecting a driven shaft, a driving shaft that is driven by an internal combustion engine, and an electric machine that includes a rotor and a stator, the transmission system comprising: a centrifugal clutch that is connected to the driving shaft for rotating therewith, the centrifugal clutch being structured to engage the rotor, when the driving shaft is driven to rotate above a threshold speed of the centrifugal clutch, for rotatably coupling the rotor and the centrifugal clutch; a clutch slider element that includes a first clutch hub and first and second connectors positioned thereon, the first clutch hub being connected to the rotor such that the clutch slider element rotates with the rotor, the first connector including a plurality of first engagement surfaces that are circumferentially disposed about a first portion of the first clutch hub and the second connector including a plurality of second engagement surfaces that are circumferentially disposed about a second portion of the first clutch hub, the clutch slider element being slidable relative to the centrifugal clutch between: i) a first engagement position where the second connector is disconnected from the driven shaft, and at least some of the plurality of first engagement surfaces of the first connector are engaged with the centrifugal clutch for rotatably coupling the clutch slider element and the centrifugal clutch, the clutch slider element being rotatably coupled to the centrifugal clutch to thereby couple the electric machine to the driving shaft such that the electric machine is operable to start the internal combustion engine; ii) a second engagement position where the first connector is disconnected from the centrifugal clutch and the second connector is disconnected from the drive shaft such that the internal combustion engine is operable to drive a rotation of the driving shaft at a speed above the threshold speed to thereby engage the centrifugal clutch and rotate the rotor such that the electric machine is operable as a generator; and iii) a third engagement position where first connector is disconnected from the centrifugal clutch and at least some of the plurality of second engagement surfaces of the second connector are engaged with the driven shaft for rotatably coupling the clutch slider element and the driven shaft and to thereby rotatably couple the rotor to the driven shaft the rotor being rotatably coupled to the driven shaft so as to permit the driving of the driven shaft via energization of the stator and/or by rotation of the driving shaft via the internal combustion engine at a speed above the threshold speed such that the centrifugal clutch engages the rotor; and a clutch override assembly that is structured to selectively engage the centrifugal clutch, when the clutch slider element is in the third engagement position, for rotatably coupling the clutch slider element and the centrifugal clutch, the clutch override assembly including an actuator element that is movably connected to the clutch slider element for moving relative thereto between a non-override position where the actuator element is positioned to permit the centrifugal clutch to be rotatably uncoupled from the clutch slider element, and an override position where the actuator element engages the centrifugal clutch such that the centrifugal clutch becomes rotatably coupled to at least one of the clutch slider element and the rotor.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1A:
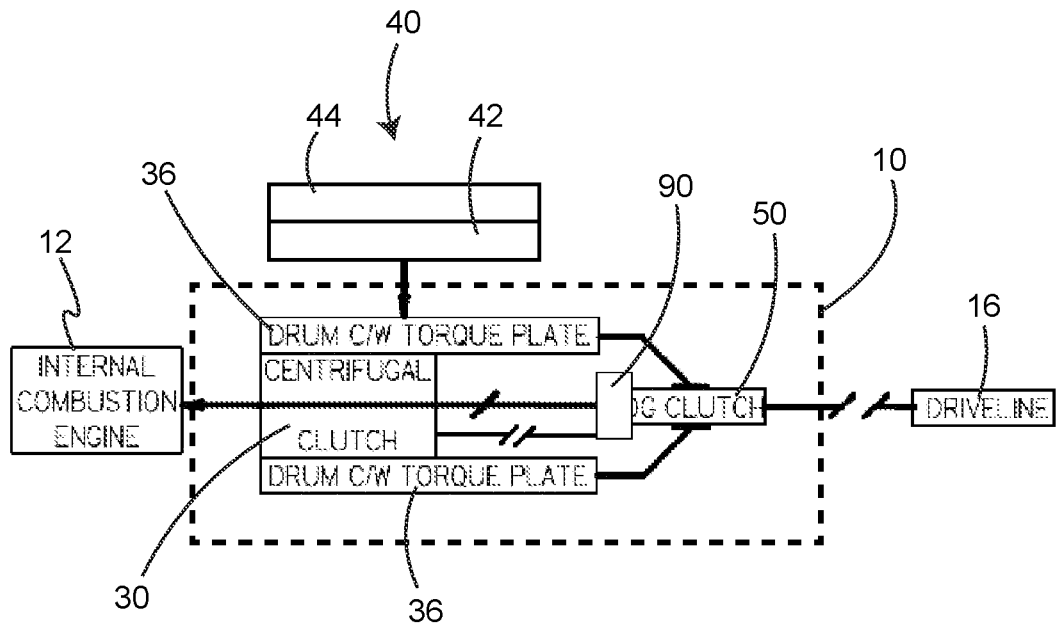
FIG. 1A shows a high-level schematic diagram of the transmission system of the present disclosure, where the clutch slider element is in the first engagement position.
Figure 1B:
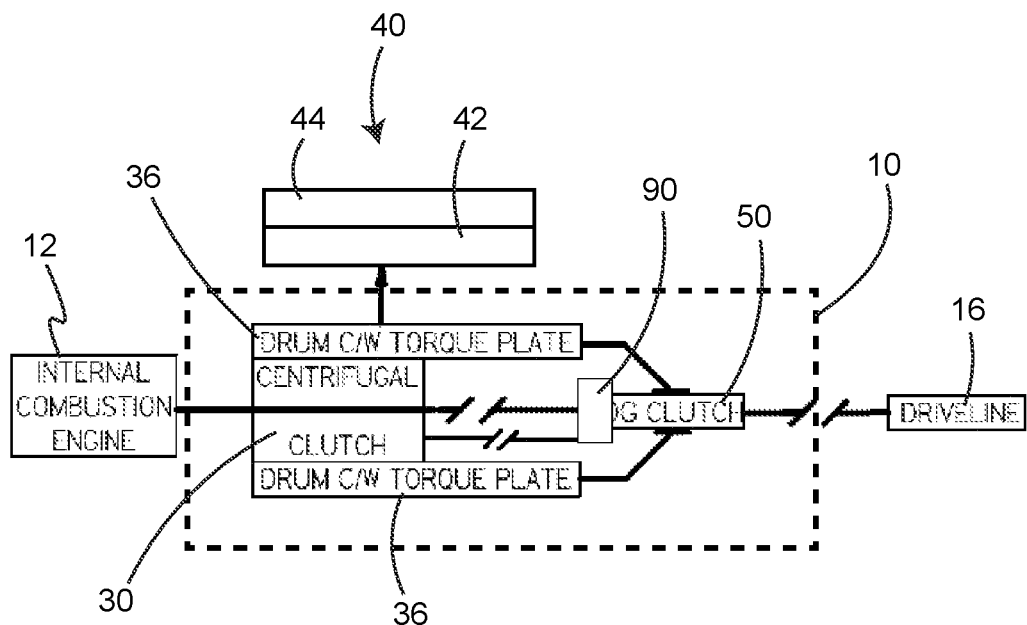
FIG. 1B shows a high-level schematic diagram of the transmission system of FIG. 1A, where the clutch slider element is in the second engagement position.
Figure 1C:
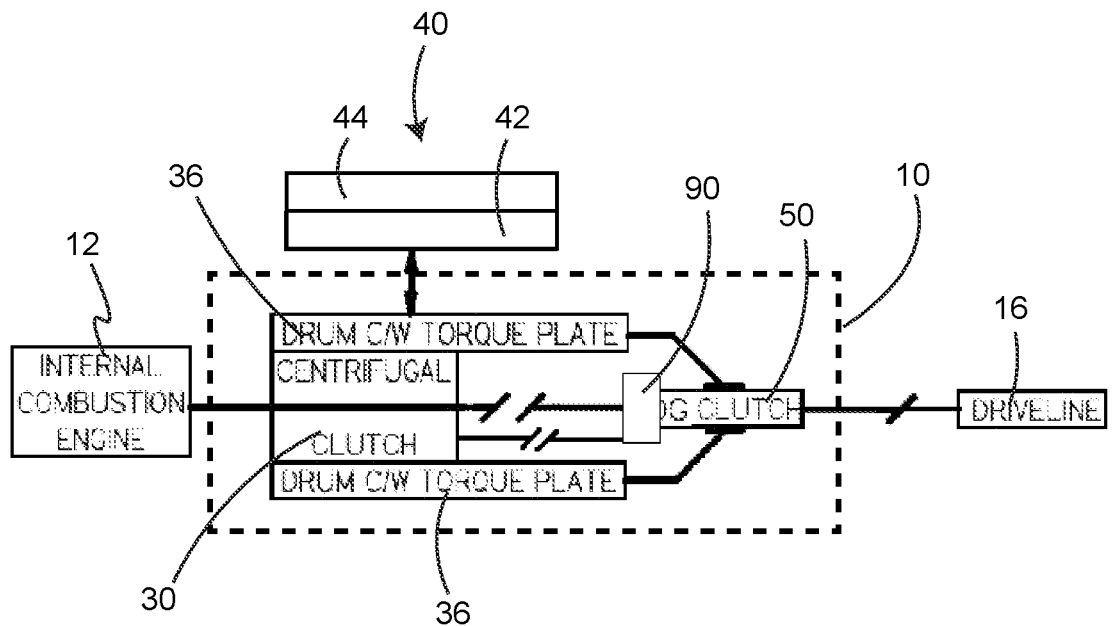
FIG. 1C shows a high-level schematic diagram of the transmission system of FIG. 1A, where the clutch slider element is in the third engagement position and the actuator element is in the non-override position.
Figure 1D:
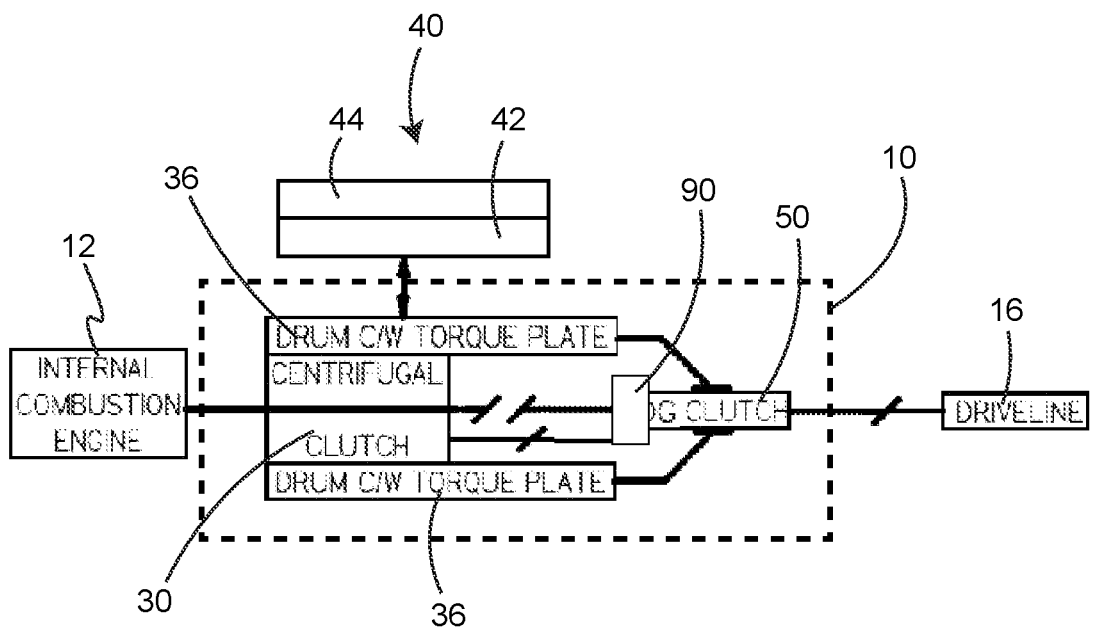
FIG. 1D shows a high-level schematic diagram of the transmission system of FIG. 1A, where the clutch slider element is in the third engagement position and the actuator element is in the override position.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures, and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one."

As used herein, the terms "comprises" and "comprising" are to be construed as being inclusive and open ended, and not exclusive. Specifically, when used in the specification and claims, the terms "comprises" and "comprising," and variations thereof mean the specified features, steps or components are included. These terms are not to be interpreted to exclude the presence of other features, steps, or components.

As used herein, the terms "about" and "approximately" are meant to cover variations that may exist in the upper and lower limits of the ranges of values, such as variations in properties, parameters, and dimensions.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The embodiments described herein are exemplary (e.g., in terms of materials, shapes, dimensions, and constructional details) and do not limit by the claims appended hereto and any amendments made thereto. Persons skilled in the art will appreciate that there are yet more alternative implementations and modifications possible, and that the following examples are only illustrations of one or more implementations. The scope of the disclosure, therefore, is only to be limited by the claims appended hereto and any amendments made thereto.

Referring to the embodiments provided in FIGS. 1A to 2, 9, and 16A, the present disclosure provides a transmission system 10 for selectively connecting a driven shaft 16, a driving shaft 14 that is driven by an internal combustion engine 12, and an electric machine 40 that includes a rotor 42 and a stator 44. The transmission system 10 comprises a centrifugal clutch 30, a clutch slider element 50, and a clutch override assembly 90. The centrifugal clutch 30 is connected to the driving shaft 14 for rotating therewith. The centrifugal clutch 30 is structured to engage the rotor 42 of the electric machine 40, when the driving shaft 14 is driven to rotate above a threshold speed of the centrifugal clutch 30, for rotatably coupling the rotor 42 and the centrifugal clutch 30. The clutch slider element 50 of the transmission system 10 includes a first clutch hub 52, and first and second connectors 54, 56 positioned thereon. The first clutch hub 52 is connected to the rotor 42 such that the clutch slider element 50 rotates with the rotor 42. The first connector 54 of the clutch slider element 50 includes a plurality of first engagement surfaces 54a that are circumferentially disposed about a first portion of the first clutch hub 52, and the second connector 56 including a plurality of second engagement surfaces 56a that are circumferentially disposed about a second portion of the first clutch hub 52. The clutch slider element 50 is slidable relative to the centrifugal clutch 30 between first, second and third engagement positions (described in more detail below).

In the transmission system 10 as disclosed herein, the clutch slider element 50 is slidable between the first, second and third engagement positions. The first engagement positions is a position of the clutch slider element 50 where the second connector 56 is disconnected from the driven shaft 16, and at least some of the plurality of first engagement surfaces 54a of the first connector 54 are engaged with the centrifugal clutch 30 for rotatably coupling the clutch slider element 50 and the centrifugal clutch 30. In the first engagement position, the clutch slider element 50 is rotatably coupled to the centrifugal clutch 30 to thereby couple the electric machine 40 to the driving shaft 14 such that the electric machine 40 is operable to start the internal combustion engine 12. The second engagement position is a position of the clutch slider element 50 where the first connector 54 is disconnected from the centrifugal clutch 30 and the second connector 56 is disconnected from the driven shaft 16 such that the internal combustion engine 12 is operable to drive a rotation of the driving shaft 14 at a speed above the threshold speed to thereby engage the centrifugal clutch 30 and rotate the rotor 42 such that the electric machine 40 is operable as a generator. The third engagement position is a position of the clutch slider element 50 where first connector 54 is disconnected from the centrifugal clutch 30 and at least some of the plurality of second engagement surfaces 56a of the second connector 56 are engaged with the driven shaft 16 for rotatably coupling the clutch slider element 50 and the driven shaft 16 and to thereby rotatably couple the rotor 42 to the driven shaft 16 the rotor 42 being rotatably coupled to the driven shaft 16 so as to permit the driving of the driven shaft 16 via energization of the stator 44 and/or by rotation of the driving shaft 14 via the internal combustion engine 12 at a speed above the threshold speed such that the centrifugal clutch 30 engages the rotor 42.

The clutch override assembly 90 of the transmission system 10 is structured to selectively engage the centrifugal clutch 30, when the clutch slider element 50 is in the third engagement position, for rotatably coupling the clutch slider element 50 and the centrifugal clutch 30. As shown in FIGS. 8A to 8D, the clutch override assembly 90 includes an actuator element 92 that is movably connected to the clutch slider element 50 for moving relative thereto between a non-override position (D) where the actuator element 92 is positioned to permit the centrifugal clutch 30 to be rotatably uncoupled from the clutch slider element 50, and an override position (E) where the actuator element 92 engages the centrifugal clutch 30 such that the centrifugal clutch 30 becomes rotatably coupled to the clutch slider element 50 (in other embodiments, the centrifugal clutch 30 may also become rotatably coupled to the clutch drum 36 and thereby to the rotor 42).

In an additional embodiment, the transmission system 10 includes at least one selector element (not shown) that is structured to selectively engage the clutch slider element 50 for driving the clutch slider element 50 to move between the first, second and third engagement positions.

In some embodiments, the at least one selector element is also structured to selectively engage the actuator element 92 of the clutch override assembly 90 for driving the actuator element 92 between the override and non-override positions.

In an exemplary embodiment, the at least one selector element includes a fork that is structured to engage at least one selector engagement portion on the clutch slider element 50.

Figure 1E:
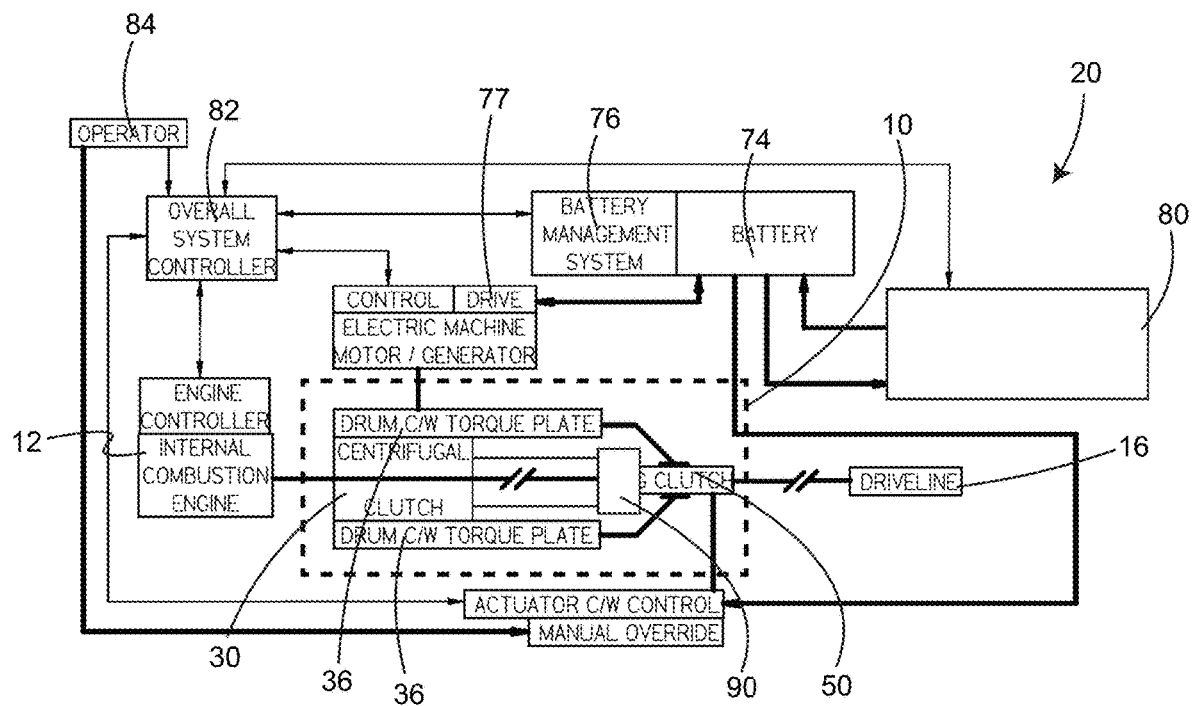
FIG. 1E shows a high-level schematic diagram of the transmission system of FIG. 1A, where the transmission system is incorporated within a vehicle.

The at least one selector element may, in simpler applications, comprise a manually activated element, such as a lever, or in more complex applications, comprise an automatic mechanism (such as an electric actuator), which may receive power from a battery 74 and be controllable via a control unit 82, and which may be overridden, in the event of a failure thereof, by a manual override mechanism (as shown in FIG. 1E).

In an embodiment such as provided in FIG. 1E, the transmission system 10 is incorporated as part of a larger drive system within a vehicle 20, where the drive system includes the driving shaft 14 as the output of the internal combustion engine 12, the driven shaft 16 as part of a driveline, and the electric machine 40 as an electric motor generator.

In an additional embodiment, the driven shaft 16 can be connected as an output shaft to a driveline, where the driveline can include a wheel differential, a gearbox, a CVT transmission, or other known torque transmission structures. The transmission system 10 as disclosed herein provides for various modes of operation of the vehicle 20.

When the clutch slider element 50 is in the first engagement position, the transmission system 10 provides an "engine start mode", where the internal combustion engine 12 can be started by the action of the electric machine 40 to rotate the rotor 42. When the clutch slider element 50 is in the second engagement position, the transmission system 10 provides a "generator mode", where the internal combustion engine 12 can idle or drive the electric machine 40 via the centrifugal clutch 30 to operate as a generator.

When the clutch slider element 50 is in the third engagement position, several modes of operation can be achieved by the vehicle 20. In some embodiments, the internal combustion engine 12 is turned off when the clutch slider element 50 is in the third engagement position, and the electric machine 40 is operated to drive the driven shaft 16 in the electric-only drive mode. In the electric-only drive mode, the centrifugal clutch 30 is disengaged and the electric motor can turn the driven shaft 16 in either directions (forward or reverse motion). In this electric-only mode, the transmission system 10 can also work as a generator during dynamic/regenerative braking of the vehicle 20.

In at least some other embodiments, the transmission system 10 provides at least one hybrid drive mode, where both the electric machine 40 and internal combustion engine 12 are operated to drive the rotation of the clutch slider element 50 and driven shaft 16. In the at least one hybrid drive mode, when the internal combustion engine 12 runs above the threshold speed of the centrifugal clutch 30, the centrifugal clutch 30 engages the the drum 36, rotatably connected to the rotor 42 (where the drum 36 is connected to the rotor 42 via chain, belt, gear or a solid attachment where the drum 36 and rotor 42 are concentric). In turn, the torque from the engine 12 and from the rotor 42 is transferred to the clutch slider 50 via the torque plate 58.

In an alternate embodiment, the rotor 42 of the electric machine 40 and transfers the torque from the driving shaft 14 to the rotor 42. The torque transmitted to the rotor 42 both via the electric machine 40 and via the internal combustion engine 12 is in turn transferred to the clutch slider element 50 via the connection between the rotor 42 and the clutch slider element 50.

When the engine is idle, the centrifugal clutch 30 is disengaged and the electric machine 40 can turn the driven shaft 16 in either directions (forward or reverse motion) and it can also work as a generator during dynamic/regenerative braking.

The clutch override assembly 90 provides a means to engage the centrifugal clutch 30 and clutch slider element 50, even when the clutch slider element 50 is in the third engagement position, to thereby rotatably couple the driving shaft 14 to the driven shaft 16 even when the clutch slider element 50 is itself spaced apart from the centrifugal clutch 30. By providing the clutch override assembly 90, the transmission system 10 is capable of shifting from the electric-only drive mode (where the clutch slider element 50 is in the third engagement position and the internal combustion engine 12 is off) to the at least one hybrid drive mode, without disengaging the clutch slider element 50 from the driven shaft 16 and thereby causing an interruption of the torque transmission to the driving shaft 14. The clutch override assembly 90 provides a means to re-engage the clutch slider element 50 and the centrifugal clutch 30, and to restart the internal combustion engine 12 by the combined action of the electric machine's 40 torque and of the vehicle's 20 inertia.

As shown in FIG. 1E, the vehicle 20 includes an overall control unit 82, that can include a number of sub-controllers. Each of the sub-controllers are communicatively connected to the overall control unit 82 and function to control the operation of one element of the drive system. The sub-controllers can include the engine controller which controls the operation of the internal combustion engine 12, the electric machine control which controls the operation of the electric machine 40, and the selector control, which is connected to, and which controls the movement of the clutch slider element 50, relative to the centrifugal clutch 30, between the first, second, and third engagement positions, via the at least one selector element.

The overall system controller can include an interface for a user or operator 84 of the vehicle 20. The overall system controller may be connected to each of the sub-controllers by known connection means. Each of the one or more sub-controllers may include one or more sensors for monitoring parameters and providing feedback thereon to the overall system controller.

The electric machine 40 may be connected by known connection means to one or more batteries (collectively, "battery") or a power store 74, as an electric power source, a battery management system 76, and power electronics 77. The battery 74 and/or battery management system 76 may in turn be connected to an external load 80.

The battery management system 76 may be considered as one of the sub-controllers of the overall system controller. The battery management system 76 is structured to regulates the distribution of power from a battery unit within the drive system. As is known in the art, the power electronics 77 may comprise the solid-state electronics that control and convert the electric power from the electric machine 40 into a suitable form for use. The power electronics 77 may control both unidirectional and bidirectional flow of power/energy, depending on whether the electric machine 40 is used as an electric machine 40 or an electric generator 40. It will be appreciated that each type of electric machine 40 (e.g., brushed, or brushless direct current, switched reluctance, induction, etc.) would require its own specific power electronics 77 that is suitable for the type of electric machine 40 used.

As provided above, the electric machine 40 that is connected to the drum 36 (or the clutch slider element 50) includes the rotor 42, and the stator 44.

Generally, the transmission system 10 may comprise any electric machine 40 capable of functioning as both an electric machine 40 and an electric generator.

Components known in the art that are required for operation of any suitable type of electric machine 40 may be used with apparatus 10. For example, a BLDC or SRM electric machine would require an electric commutator between the electric machine 40 and an attached battery 74.

Centrifugal Clutch

As provided above, the transmission system 10 includes the centrifugal clutch 30. In an embodiment such as in FIGS. 3 and 4, the centrifugal clutch 30 includes the second clutch hub 32, and at least one clutch element 38 that is movably connected to the second clutch hub 32 for moving between a radially inward position and a radially outward position due to rotation of the centrifugal clutch 30, above the threshold speed. The centrifugal clutch 30 is structured to engage the drum 36 when the at least one clutch element 38 is in the radially outward position. The at least one clutch element 38 is driven from the radially inward position to the radially outward position when the driving shaft 14 (and therefore the second clutch hub 32 and centrifugal clutch 30) rotate at above the threshold speed of the centrifugal clutch 30.

While the above description of the centrifugal clutch 30 described where the clutch 30 includes at least one clutch element 38, it will be readily understood that, in most clutch applications, the centrifugal clutch 30 would include at least two clutch elements 38 such that the centrifugal clutch 30 functions as a dynamically balanced system.

In some embodiments, the centrifugal clutch 30 is at least partially surrounded by the rotor 42, and the centrifugal clutch 30 is sized such that when the at least one clutch element 38 is in the radially outward position, the centrifugal clutch 30 engages the rotor 42 for rotatably coupling the rotor 42 and the centrifugal clutch 30.

Figure 2:
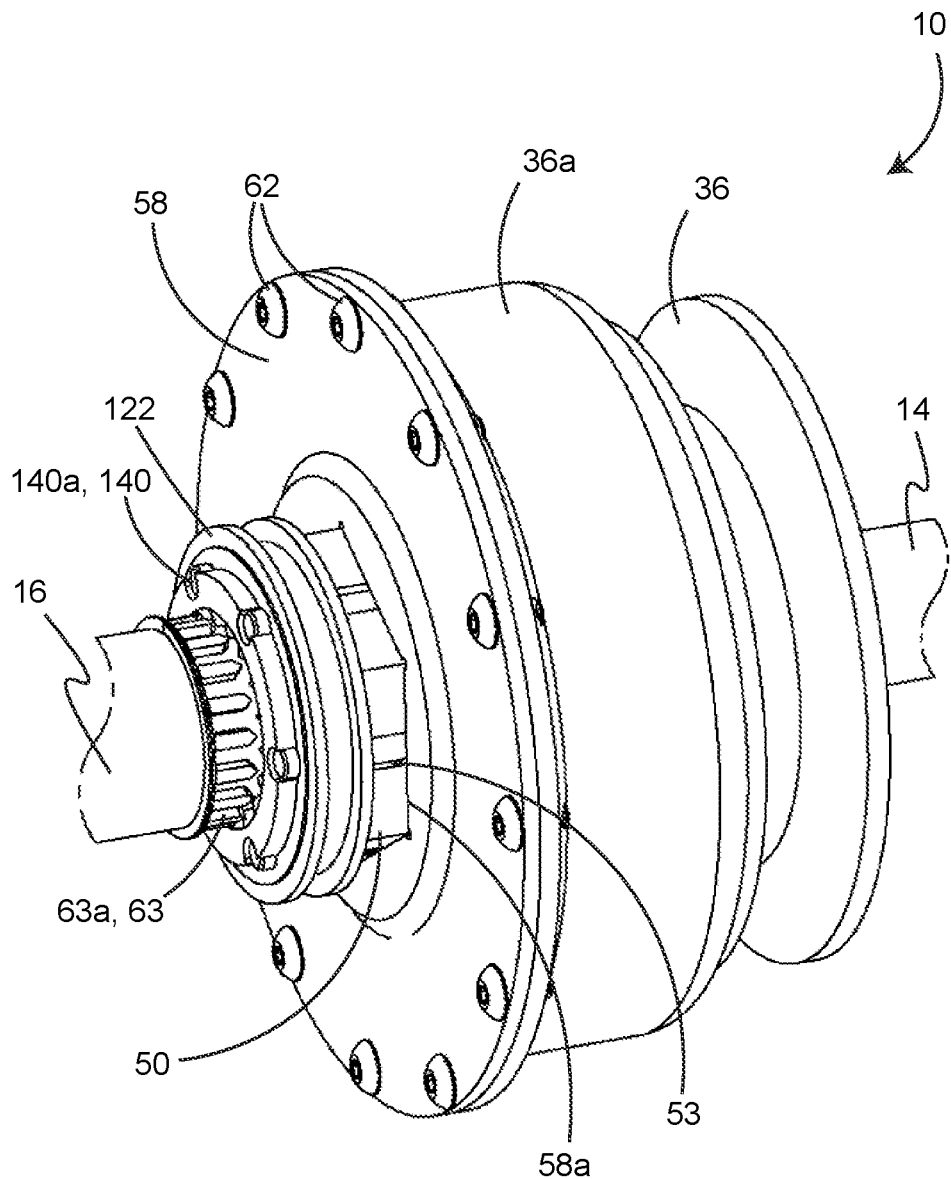
FIG. 2 shows a perspective view of a first embodiment of the transmission system of the present disclosure, where the centrifugal clutch of the transmission system is a slide centrifugal clutch.
Figure 10A:
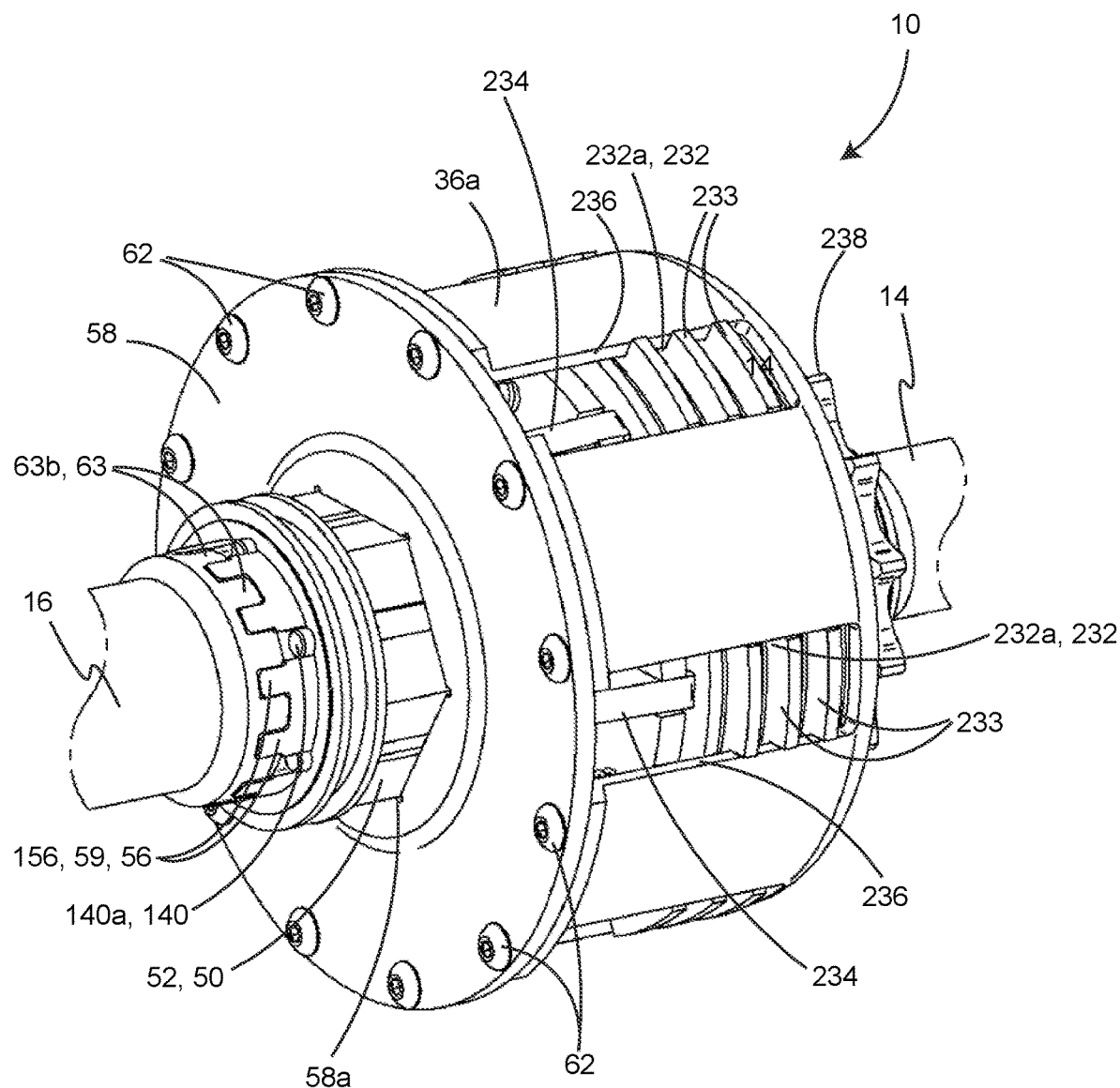
FIG. 10A shows a perspective view of the transmission system of FIG. 9.

As shown in the various embodiments provided in FIGS. 2, 10A and 16, some embodiments of the centrifugal clutch 30 include a drum 36 that at least partially surrounds the centrifugal clutch 30. The drum 36 may have a generally hollow, cylindrical shape, and different structures of the hollow interior of the drum 36 may be provided based on the specific type of centrifugal clutch 30 provided in transmission system 10. The drum 36 is positioned relative to the centrifugal clutch 30 and the centrifugal clutch 30 is structured such that when the driving shaft 14 and centrifugal clutch 30 are driven to rotate at speeds above the threshold speed of the centrifugal clutch 30, the centrifugal clutch 30 will be activated and the will contact and engage with at least one inner surface 39 of the drum 36 such that the centrifugal clutch 30, drum 36, and rotor 42 of the electric machine 40 are all rotatably coupled.

In an additional embodiment, the drum 36 may comprise steel or a steel alloy.

Figure 3:
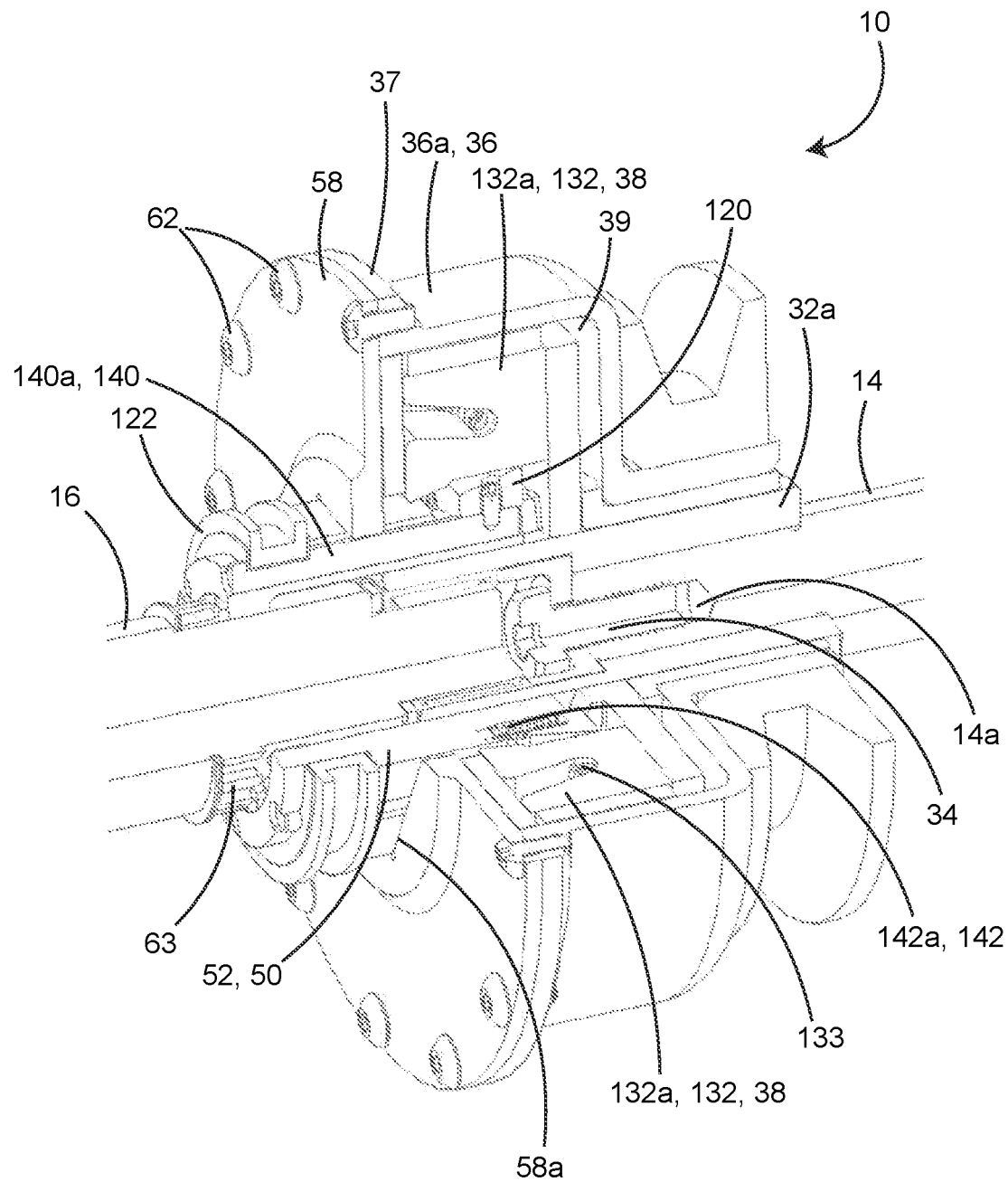
FIG. 3 shows a partial section view of the first embodiment of the transmission system shown in FIG. 2.

In the specific embodiment provided in FIGS. 2, and 3 the drum 36 includes a drum body 36a, with a first, open end, and a mounting flange 37 extending around a perimeter edge of the first, open end. The clutch slider element 50 is connected to the drum 36 such that the clutch slider element 50 at least partially extends into the first, open end of the drum body 36a of the drum 36. The centrifugal clutch 30 also includes a mounting plate 58 that is mounted to the first, open end of the drum 36 via a plurality of bolted connections 59. The mounting plate 58 includes a through-opening 58a that is formed thereon, and that is sized such that the clutch slider element 50 can be slidably received in the through opening 58a and can move within the through opening 58a between at least the first, second, and third engagement positions.

In an additional embodiment, the through-opening 58a of the mounting plate 58 has a substantially hexagonal form that corresponds to a substantially hexagonal cross-section of the first clutch hub 52 of the clutch slider element 50. In this way, the clutch slider element 50 can be received through through-opening 58a of the mounting plate 58.

Figure 9:
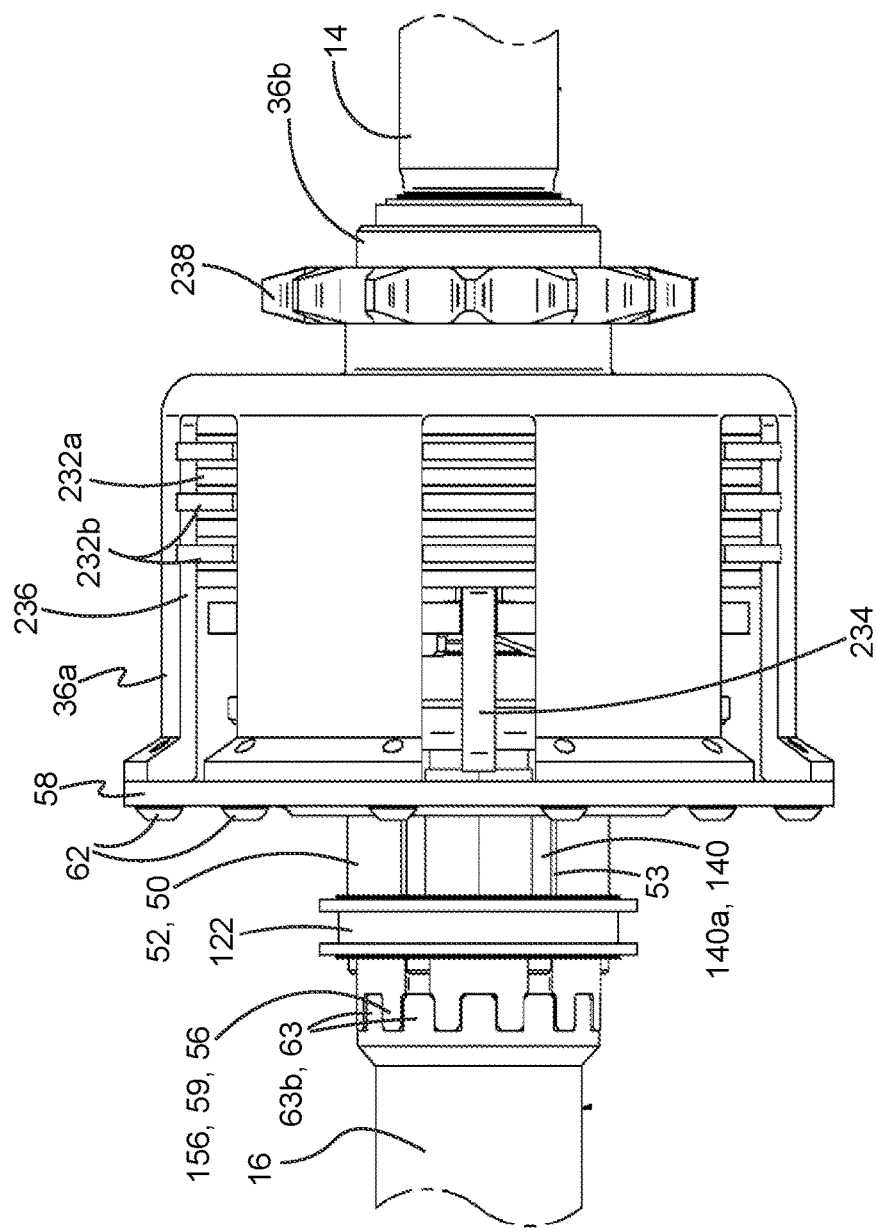
FIG. 9 shows a side view of a second embodiment of the transmission system of the present disclosure, where the centrifugal clutch of the transmission system is an axial-centrifugal clutch.

In the alternate embodiment provided in FIGS. 9, and 10A the drum 36 includes the drum body 36a, where the drum body 36a includes a plurality of longitudinal openings 236 that extend there along. The drum 36 also includes the mounting flange 37 formed around the open end of the drum body 36a. The clutch slider element 50 is connected to the drum 36 (which in turn is rotatably connected to the rotor 42 of the electric machine 40) such that the clutch slider element 50 at least partially extends into the first, open end of the drum body 36a. The centrifugal clutch 30 also includes the mounting plate 58 that is mounted to the first, open end of the drum 36 via the plurality of bolted connections 59. The mounting plate 58 includes the through-opening 58a.

In these embodiments, the drum 36 of the centrifugal clutch 30 is connected to the rotor 42 of the electric machine 40 such that rotation of the drum 36 similarly rotates the rotor 42, and rotation of the rotor 42 similarly rotates the drum 36.

The rotor 42 of the electric machine 40 can be connected to the drum 36 in various ways.

In a first embodiments, the rotor 42 is positioned concentric with the drum 36, and the drum 36 is formed inline with, but separate from, the electric machine 40.

In an alternate embodiment, the rotor 42 is positioned concentric with the drum 36, and the drum 36 is attached to the rotor 42 of the electric machine 40 but is magnetically isolated from the rotor 42.

In an alternate embodiment, the rotor 42 is positioned offset and parallel to the drum 36. In this embodiment, a connection means is provided for rotatably coupling the rotor 42 and drum 36. This connection means could be any of various known mechanisms for connecting parallel rotating bodies, such as a chain and sprocket, a belt and pulley system, or a set of parallel axle gears.

In yet another alternate embodiment, the rotor 42 is position offset and at an angle about a central axis of the drum 36. In this embodiment, the drum 36 and rotor 42 are rotatably connected via a set of non-parallel axle gears.

Each of the above-described embodiments of the connection of the rotor 42 and drum 36 are different architectures that can embody the same rotational connection between the rotor 42 and drum 36.

In some embodiments, the drum 36 and the rotor 42 may be matingly attached to one another. The connection between the drum 36 and the rotor 42 may be accomplished via a plurality of fasteners which may comprise, for example, a rigid fastener, or a flexible fastener such as a rubber bushing.

As noted above, the driving shaft 14 is connected to the centrifugal clutch 30 such that the centrifugal clutch 30 rotates with the driving shaft 14. The connection between the driving shaft 14 and the centrifugal clutch 30 may be provided by various known structures. For example, the driving shaft 14 may be matingly engaged with the second clutch hub 32 via a keyed connection that includes a key formed on the second clutch hub 32 and a corresponding keyway or mating component on the driving shaft 14.

In the specific embodiment provided in FIG. 3, an end of the driving shaft 14 that is opposite the end of the driving shaft 14 connected to the internal combustion engine 12 is structured to be mounted to the centrifugal clutch 30. The second clutch hub 32 of the centrifugal clutch includes a mounting bore 32b that is formed centrally therethrough and that is surrounded by a collar 32a. The end of the driving shaft 14 includes a threaded hole 14a that is formed thereon. The end of the driving shaft 14 is held within the collar 32a on the second clutch hub 32, and a threaded fastener 34 is mounted through the mounting bore 32b on the second clutch hub 32 and is threadedly held within the threaded hole 14a on the driving shaft 14 for securing the centrifugal clutch 30 and the driving shaft 14 together.

While the above embodiments are specific to keyed connections or threaded fasteners for securing the driving shaft 14 to the centrifugal clutch 30, any suitable mechanism for achieving the mating engagement between the driving shaft 14 and the second clutch hub 32 of the centrifugal clutch 30 may be used. The mating engagement between the driving shaft 14 and the second clutch hub 32 is such that rotation of the driving shaft 14 causes rotation of the second clutch hub 32 and thus, rotation of the centrifugal clutch 30.

The centrifugal clutch 30 may further comprise other components commonly found in centrifugal clutches, such as a bushing, sprocket, dust cover, and any other components which may be required for the proper functioning of the centrifugal clutch 30 (not shown).

Figure 4:
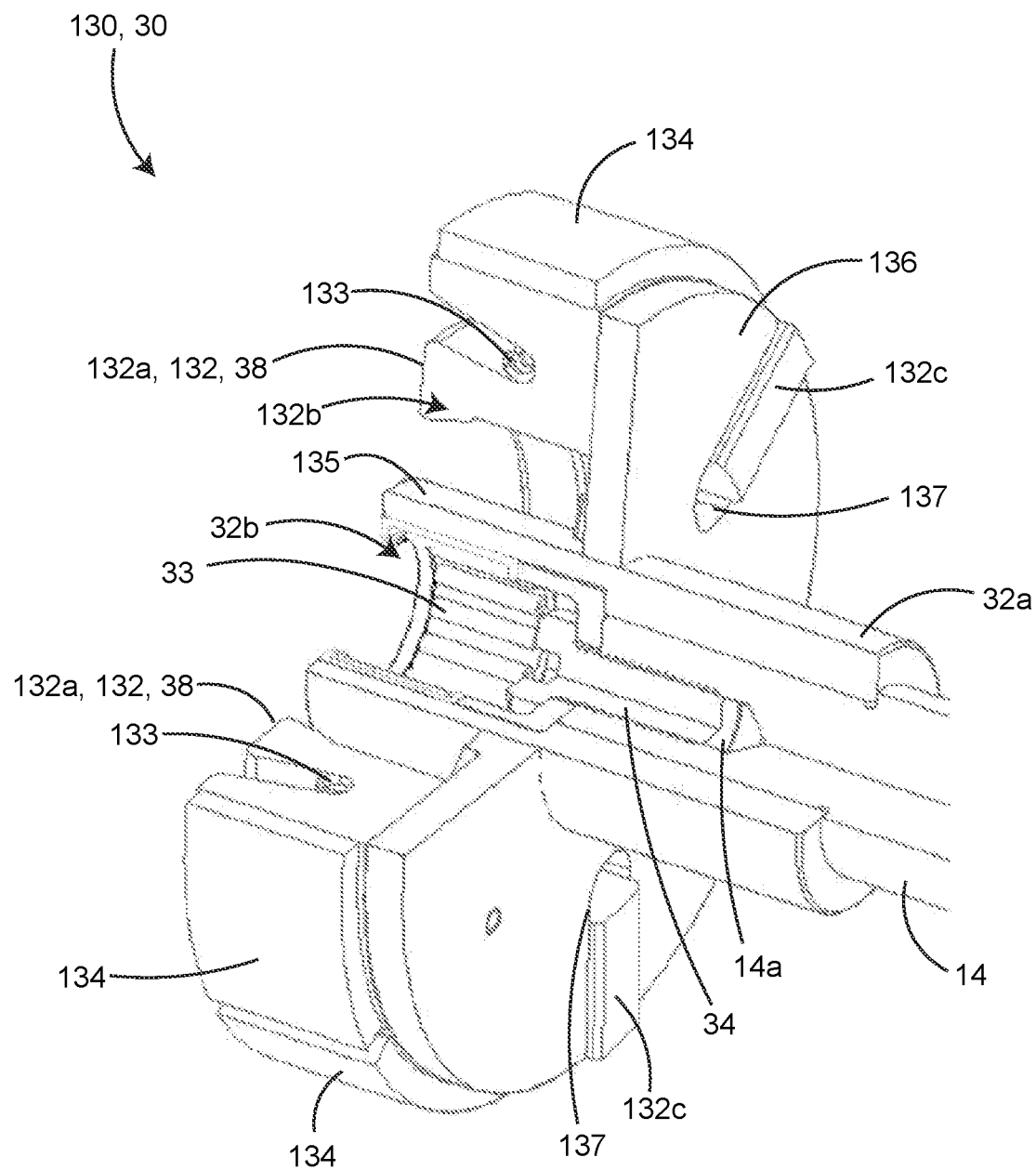
FIG. 4 shows a partial section view of the slide centrifugal clutch of the first embodiment of the transmission system shown in FIG. 2.

In an embodiment such as shown in FIGS. 2, 3, and 4, the centrifugal clutch 30 is a slide centrifugal clutch 130 that includes the second clutch hub 32, the drum 36 positioned about the second clutch hub 32, and a plurality of spring-biased flyweights 132 that are slidably connected to second clutch hub 32 for sliding thereabout between a radially inward position and a radially outward position, due to the rotation of the centrifugal clutch 30.

In the specific embodiment provided in FIGS. 2, 3, and 4, the slide centrifugal clutch 130 includes the plurality of spring-biased flyweights 132 formed as a plurality of radially slidable clutch shoes 132a. As shown more clearly in FIGS. 4 and 3, in an embodiment, the centrifugal clutch 30 includes the second clutch hub 32, and the second clutch hub 32 includes an inner hub portion 135 with the mounting bore 32b, and a hub flange 136 through which the inner hub portion 135 centrally passes. The at least one clutch element 38 is defined by the plurality of radially slidable clutch shoes 132a. Each of the plurality of radially slidable clutch shoes 132a includes a shoe body 132b and a slide portion 132c that is slidably held within one of a plurality of slots 137 formed on a flange 136 of the second clutch hub 32.

In this embodiment, the second clutch hub 32 includes the inner hub portion 135 with the mounting bore 32b, where the mounting bore 32b extends therethrough, along a central axis of the inner hub portion 135. The mounting bore 32b also includes a bearing 33 that extend from a second end of the mounting bore 32b.

In an additional embodiment, each of the radially slidable clutch shoes 132a is biased towards the radially inward position via at least one shoe biasing element 133 that is connected between the clutch shoe 132a and the inner hub portion 135. The at least one shoe biasing element 133 can, in some embodiments, be a garter spring.

In an additional embodiment such as shown in FIG. 3, each clutch shoe 132a may comprise a frictional surface 134. In the specific embodiment provided in FIG. 3, the frictional surface 134 of each radially slidable clutch shoe 132a is formed on a circumferential, outer surface of the radially slidable clutch shoe 132a such that when each of the radially slidable clutch shoes 132a are driven out, towards the radially outward position, the frictional surface 134 will engage the inner surface 39 of the drum 36.

In operation, the engagement of the slide centrifugal clutch 130 is based on the rotation speed of the driving shaft 14. As the driving shaft 14 is driven to rotate above the threshold speed, the centrifugal force acting on each radially slidable clutch shoe 132a will be sufficient to overcome the biasing force of the at least one shoe biasing element 133 that is connected to each radially slidable clutch shoe 132a. As a result, each radially slidable clutch shoe 132a will move, under centrifugal force, radially outward (i.e., away from the second clutch hub 32) to the radially outward position, until the clutch shoes 132a frictionally engage (via their frictional surfaces 134) the drum 36 to thereby rotatably couple the drum 36, rotor 42 and centrifugal clutch 30/driving shaft 14.

In the various embodiments of the transmissions system 10 provided in the present disclosure, the centrifugal clutch 30 may take on other forms of centrifugal clutches which are different than the slide centrifugal clutch 130.

In an alternate embodiment such as shown in FIGS. 9, 10A, 10B and 11, the centrifugal clutch 30 is structured as an axial-centrifugal clutch 230. The axial-centrifugal clutch 230 includes the second clutch hub 32, a clutch pack 232 and a plurality of weighted levers 234 that move relative to the clutch pack 232, due to the rotation of the centrifugal clutch 30, for selectively engaging the clutch pack 232.

In the specific embodiment provided in FIGS. 9, 10A, 10B and 11, the plurality of weighted levers 234 are each pivotably mounted to the second clutch hub 32 for rotating thereabout. The clutch pack 232 includes a plurality of first friction plates 232a and a plurality of second friction plates 232b, each of which is disposed between a pair of adjacent ones of the first friction plates 232a. The clutch pack 232 is structured to partially translate along the second clutch hub 32 between disengaged and engaged configurations. Each of the second friction plates 232b includes at least one engagement projection 233 that extends out through the longitudinal openings 236 in the drum 36. The first friction plates 232a and second friction plates 232b of the clutch pack 232 each have a central aperture that is formed therethrough. The second clutch hub 32 is received through the central apertures of the first friction plates 232a and second friction plates 232b for slidably mounting the clutch pack 232 on the second clutch hub 32.

Figure 15A:
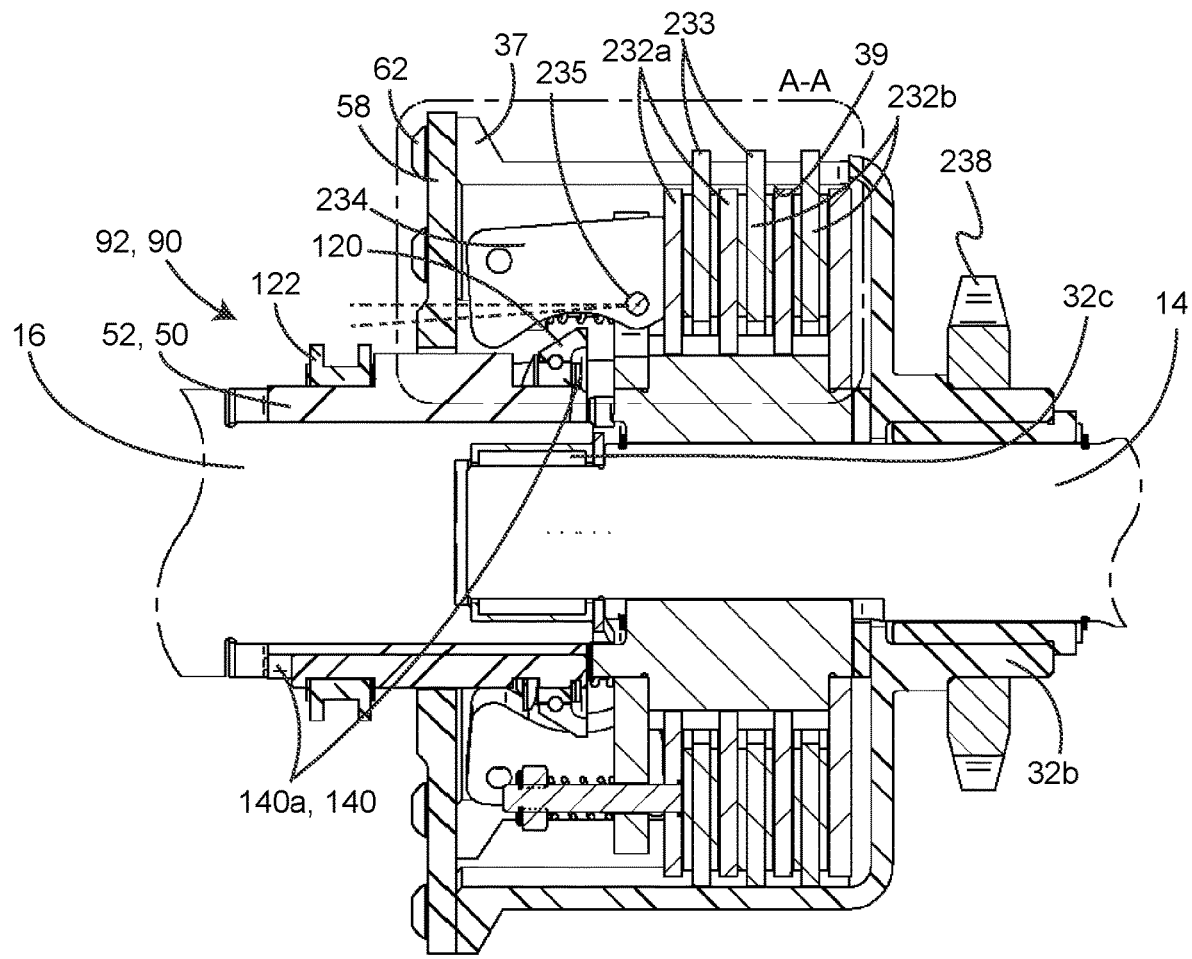
FIG. 15A shows a side, section view of the second embodiment of the transmission system shown in FIG. 9, where the actuator element is in the non-override position.
Figure 15B:
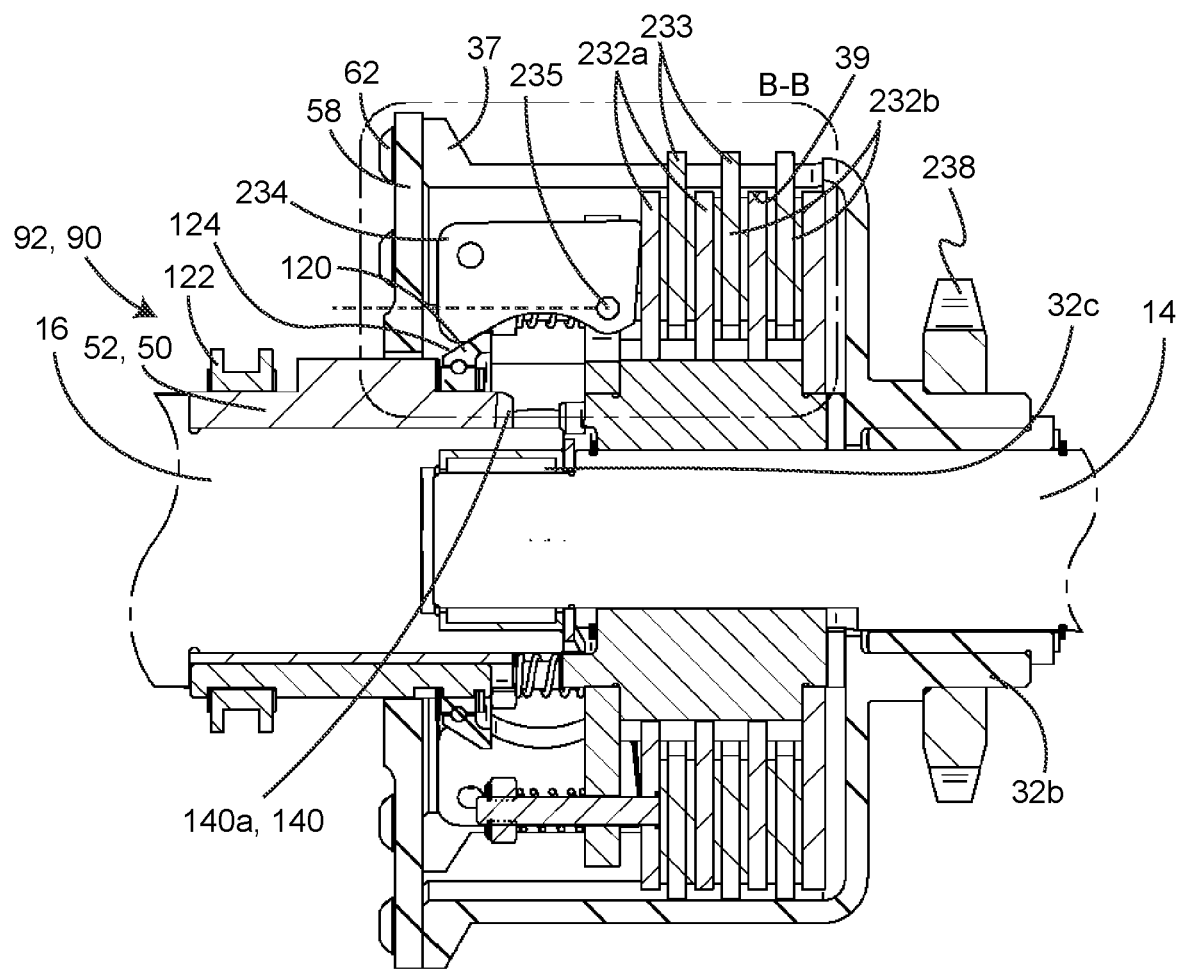
FIG. 15B shows a side, section view of the second embodiment of the transmission system shown in FIG. 9, where the actuator element is in the override position.
Figure 15C:
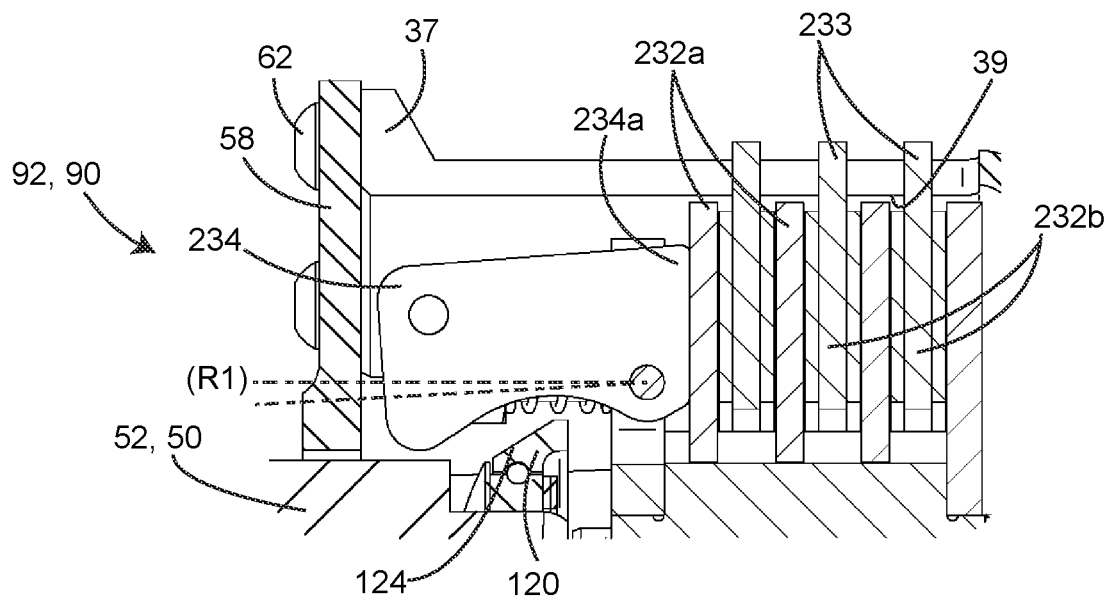
FIG. 15C shows a close-up, section view of the region A-A of the second embodiment of the transmission system shown in FIG. 15A.
Figure 15D:
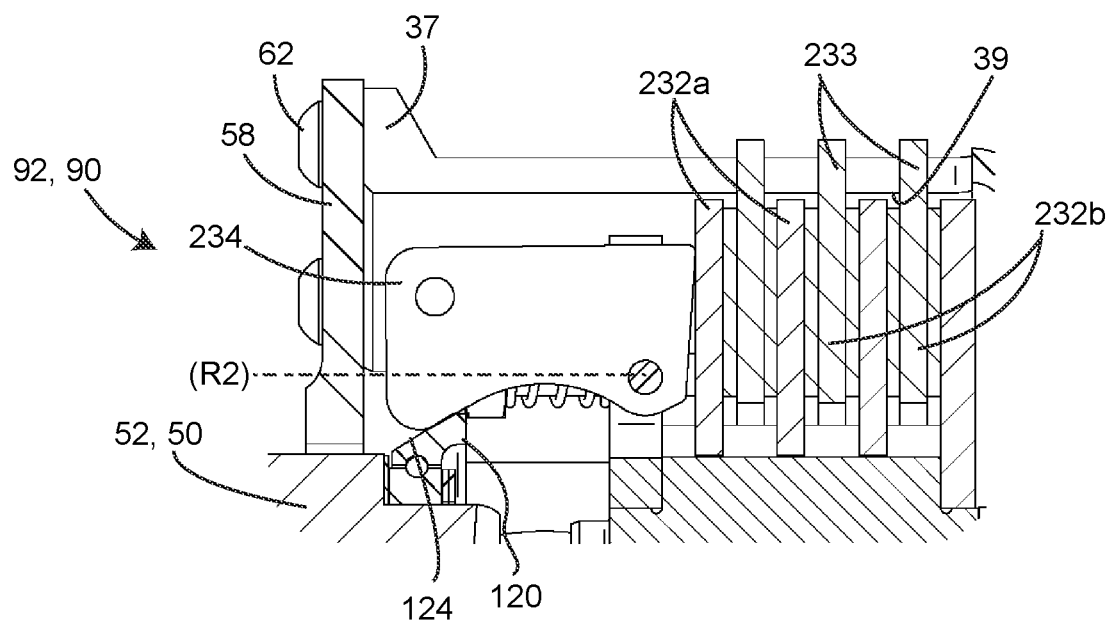
FIG. 15D shows a close-up, section view of the region B-B of the second embodiment of the transmission system shown in FIG. 15B.

As shown in FIGS. 15A to 15D, each of the plurality of weighted levers 234 includes a pivot point 235 about which the respective weighted lever 234 pivots relative to the second clutch hub 32, between a radially inward position (shown in FIGS. 15A and 15C) and a radially outward position (shown in FIGS. 15B and 15D). Each weighted lever 234 also defines a bottom contact portion 234a that will be driven into a top first friction plate of the plurality of first friction plates 232b of the clutch pack 232, as the weighted lever 234 pivots relative to the second clutch hub 32.

In an additional embodiment, the first and second friction plates 232a, 232b are biased towards the disengaged configuration by at least one plate biasing element 240 that is connected between the first/second friction plates 232a, 232b and the second clutch hub 32. In the specific embodiment provided in FIGS. 10A, 10B, and 11, the at least one plate biasing element 240 is a plurality of helical springs 240a. The second clutch hub 32 includes a plurality of aperture and a rod 241 mounted through each of the plurality of apertures. One of the helical springs 240a is mounted over each rod 241 and is connected at one end, via a bolt, to the rod 241.

In operation, the engagement of the axial-centrifugal clutch 230 is based on the rotation speed of the driving shaft 14. As the driving shaft 14 is driven to rotate above the threshold speed, each weighted lever 234 will pivot, under centrifugal force, radially outward (i.e., away from the second clutch hub 32) to the radially outward position, until the bottom contact portion 234a of the weighted lever 234 contacts the top first friction plate of the clutch pack 232 to drive the first and second friction plates 232a, 232b together and thereby engage the clutch pack 232. As the weighted levers 234 are forced to the radially outward position under centrifugal force, the force applied by each of the plurality of weighted levers 234 on the top first friction plate will be sufficient to overcome the biasing force of the at least one plate biasing element 240 that is connected to the first and second friction plates 232a, 232b, and as a result the first friction plates 232a will slide relative to the second friction plates 232b to engage the second friction plates 232b and thereby engage the clutch pack 232. As the clutch pack 232 engages, the engagement portions 233 of the second friction plates 232b will be driven into contact with the drum 36 to thereby rotatably couple the drum 36, rotor 42 and centrifugal clutch 30/driving shaft 14.

Figure 16A:
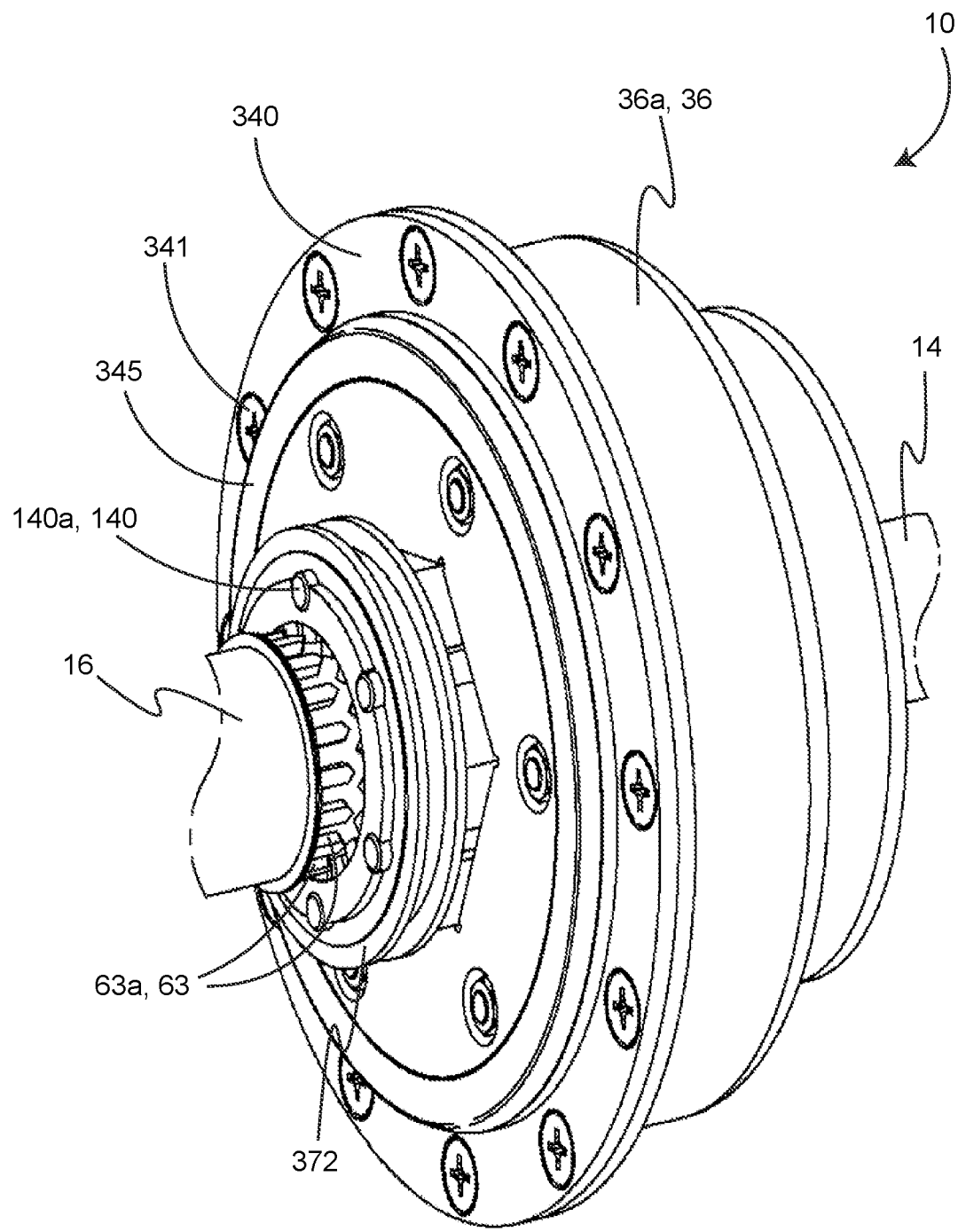
FIG. 16A shows a perspective view of a third embodiment of the transmission system of the present disclosure, where the centrifugal clutch of the transmission system is a pivoting flyweight centrifugal clutch.
Figure 16B:
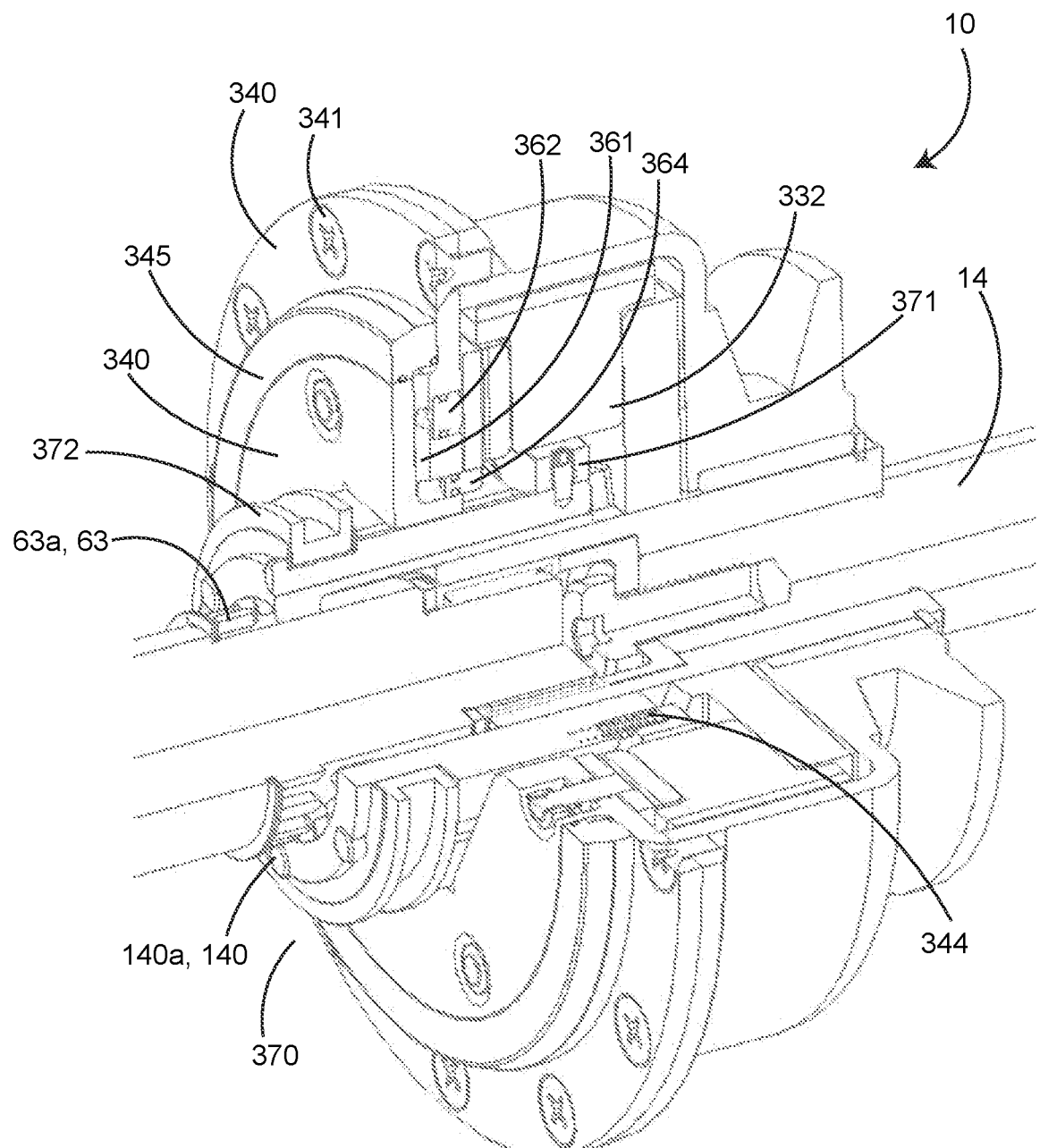
FIG. 16B shows a partial section view of the third embodiment of the transmission system shown in FIG. 16A.
Figure 17:
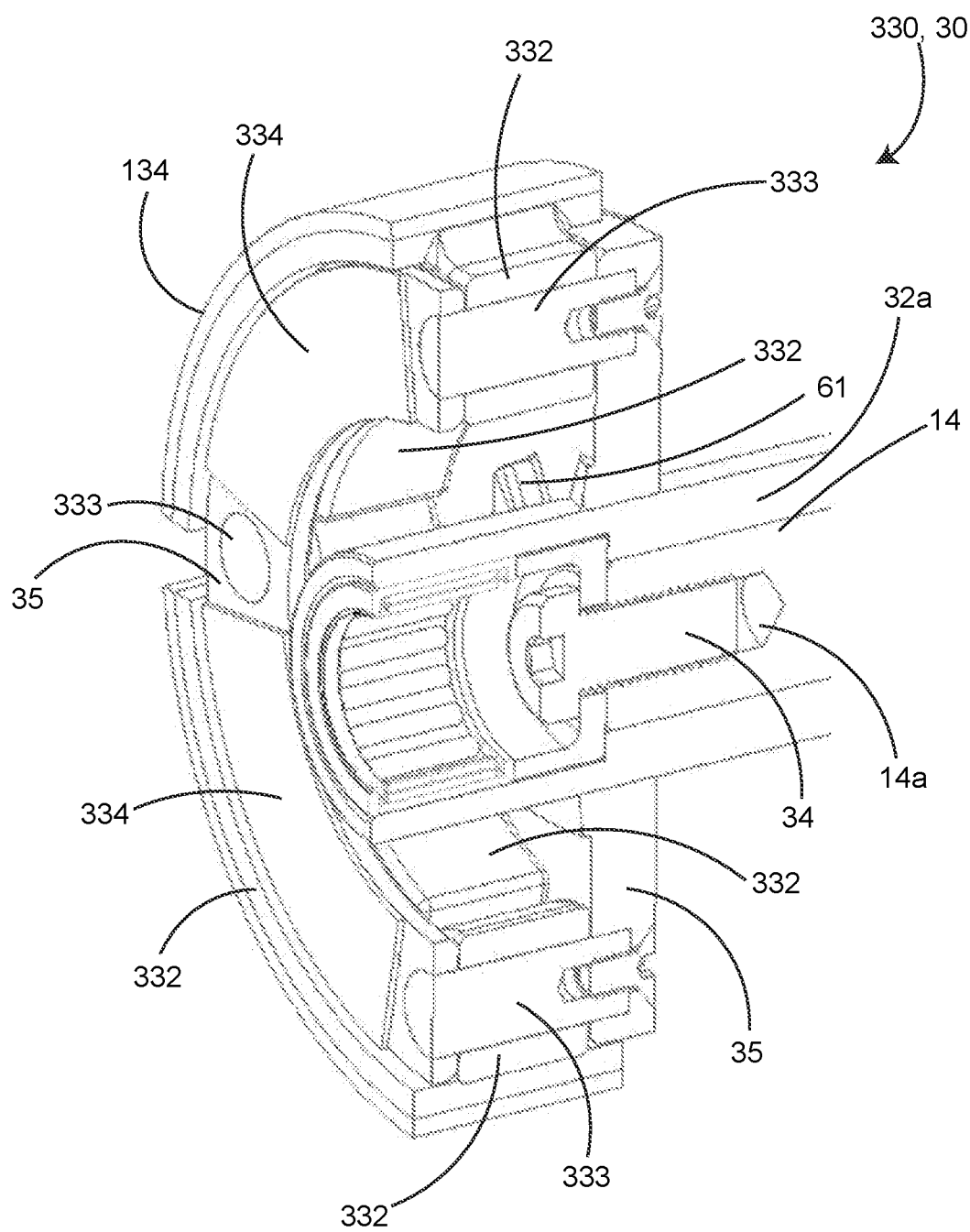
FIG. 17 shows a section view of the pivoting flyweight centrifugal clutch of the third embodiment of the transmission system shown in FIG. 16A.
Figure 18A:
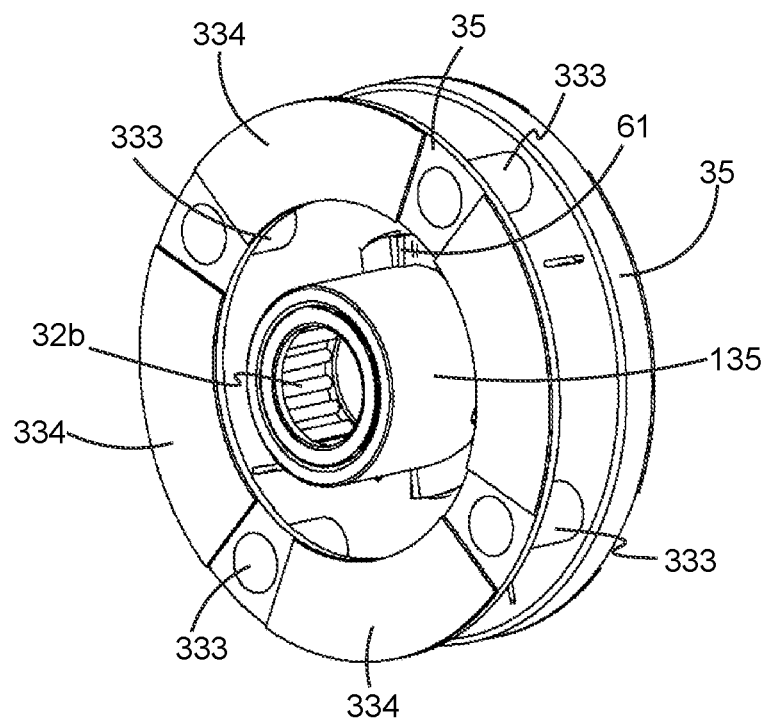
FIG. 18A shows a perspective view of the pivoting flyweight centrifugal clutch of FIG. 17, where the pivoting flyweights have been removed.
Figure 18B:
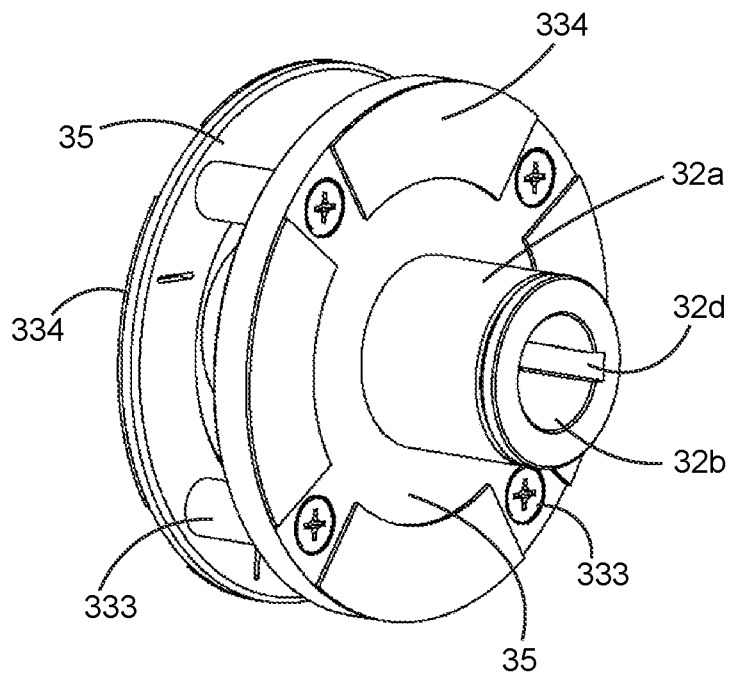
FIG. 18B shows an alternate perspective view of the pivoting flyweight centrifugal clutch of FIG. 18A.

In an embodiment such as is shown in FIGS. 16A, 16B, and 17, the centrifugal clutch 30 is a pivoting flyweight centrifugal clutch 330 that includes the second clutch hub 32, the drum 36 positioned about the second clutch hub 32, and the plurality of spring-biased flyweights 132. In this embodiment, the plurality of spring-biased flyweights 132 are a plurality of pivoting flyweights 332 that are pivotably connected to second clutch hub 32 for pivoting thereabout between the radially inward position and the radially outward position due to the rotation of the pivoting flyweight centrifugal clutch 330.

In this embodiment, the second clutch hub 32 includes the inner hub portion 135 with the mounting bore 32b, where the mounting bore 32b extends therethrough, along a central axis of the inner hub portion 135. The mounting bore 32b includes a keyway 32d extending from a first end thereof, for connecting the driving shaft 14 to the centrifugal clutch 30. The second clutch hub 32 also includes a clutch connection element 61 for engaging with the plurality of first engagement surfaces 54a of the first connector 54 on the clutch slider element 50.

The second clutch hub 32 of the pivoting flyweight centrifugal clutch 30 also includes a pair of retaining plates 35 that are spaced apart on either side of the inner hub portion 135, and which are mounted to one another by a plurality of spacers 333. Each of the plurality of the pivoting flyweights 332 is pivotally attached to the second clutch hub 32 via one of the plurality of spacers. Each of the plurality of the pivoting flyweights 332 pivots about one of the plurality of spacers 333 between radially inward and outward positions.

In operation, the engagement of the centrifugal clutch 330 is based on the rotation speed of the driving shaft 14. As the driving shaft 14 is driven to rotate above the threshold speed, the centrifugal force acting on each pivoting flyweight 332 will be sufficient to overcome the biasing force of the at least one biasing element that is connected to each the pivoting flyweight 332, and each the pivoting flyweight 332 will be driven, under centrifugal force, to pivot radially outward relative to the second clutch hub 32, to move towards the radially outward position and thereby engage the rotor 42 or drum 36.

In an additional embodiment of the centrifugal clutch 30 where the centrifugal clutch 30 is the pivoting flyweight centrifugal clutch 330, the pivoting flyweight centrifugal clutch 330 is structured in a self-energizing configuration. In this self-energizing configuration, the clutch 330 is structured such that friction forces that develop from clutch engagement with the drum 36 further increase the contact pressure between a contact surface of each of the plurality of the pivoting flyweights 332 and the drum 36.

By configuring the pivoting flyweight centrifugal clutch 330 in this self-energizing configuration, the pivoting flyweight centrifugal clutch 330 can be structured to only transmits torque in one direction (i.e., from the engine 12 to the driven shaft 16, and not from the driven shaft 16 to the engine 12) and to easily disengages when the power to the engine 12 is cut off to allow for vehicle coasting. Structuring the pivoting flyweight centrifugal clutch 330 in this way will cause the pivoting flyweight centrifugal clutch 330 to rapidly disengage from the drum 36 when the engine power is shutoff, thereby preventing a torque transfer from the driven shaft 16 to the engine 12, and hence maximizing the energy recuperation via regenerative braking.

Yet other forms of centrifugal clutches not described or shown herein may be used.

Clutch Slider Element

As provided above, the transmission system 10 also includes the clutch slider element 50. The clutch slider element 50 includes the first clutch hub 52, and the first and second connectors 54, 56 that are positioned on the first clutch hub 52. The first connector 54 includes the plurality of first engagement surfaces 54a for selectively engaging a portion of the centrifugal clutch 30, and the second connector 56 includes the plurality of second engagement surfaces 56a.

In the specific embodiments provided in FIGS. 2 to 23B, the first clutch hub 52 of the clutch slider element 50 has a generally hexagonal cross-section.

The cutch slider element 50 is structured to be slidable, relative to the centrifugal clutch 30, between the first, second and third engagement positions described above with reference to FIGS. 1A to 1C.

In the embodiments provided in FIGS. 2 to 23B, the clutch slider element 50 is structured to be slidable relative to the centrifugal clutch 30 along a central axis of the centrifugal clutch 30, and the second engagement position of the clutch slider element 50 is defined between the first engagement position and the third engagement position.

In the embodiments where the transmission system 10 includes the drum 36, the clutch slider element 50 is connected to the drum 36 such that the drum 36 rotates with the clutch slider element 50, and the clutch slider element 50 rotates with the drum 36.

The clutch slider element 50 is also connected to the rotor 42 of the electric machine 40 via the drum such that the rotor 42, the drum 36, and the clutch slider element 50 are rotatably coupled together. Various structures can be provided for connecting the rotor 42 and clutch slider element 50. In some embodiments, the rotor 42 is connected to the clutch slider element 50 via the drum 36 and the mounting plate 58, while in other embodiments the rotor 42 is connected to the clutch slider element 50 via the mounting plate 58.

Figure 10B:
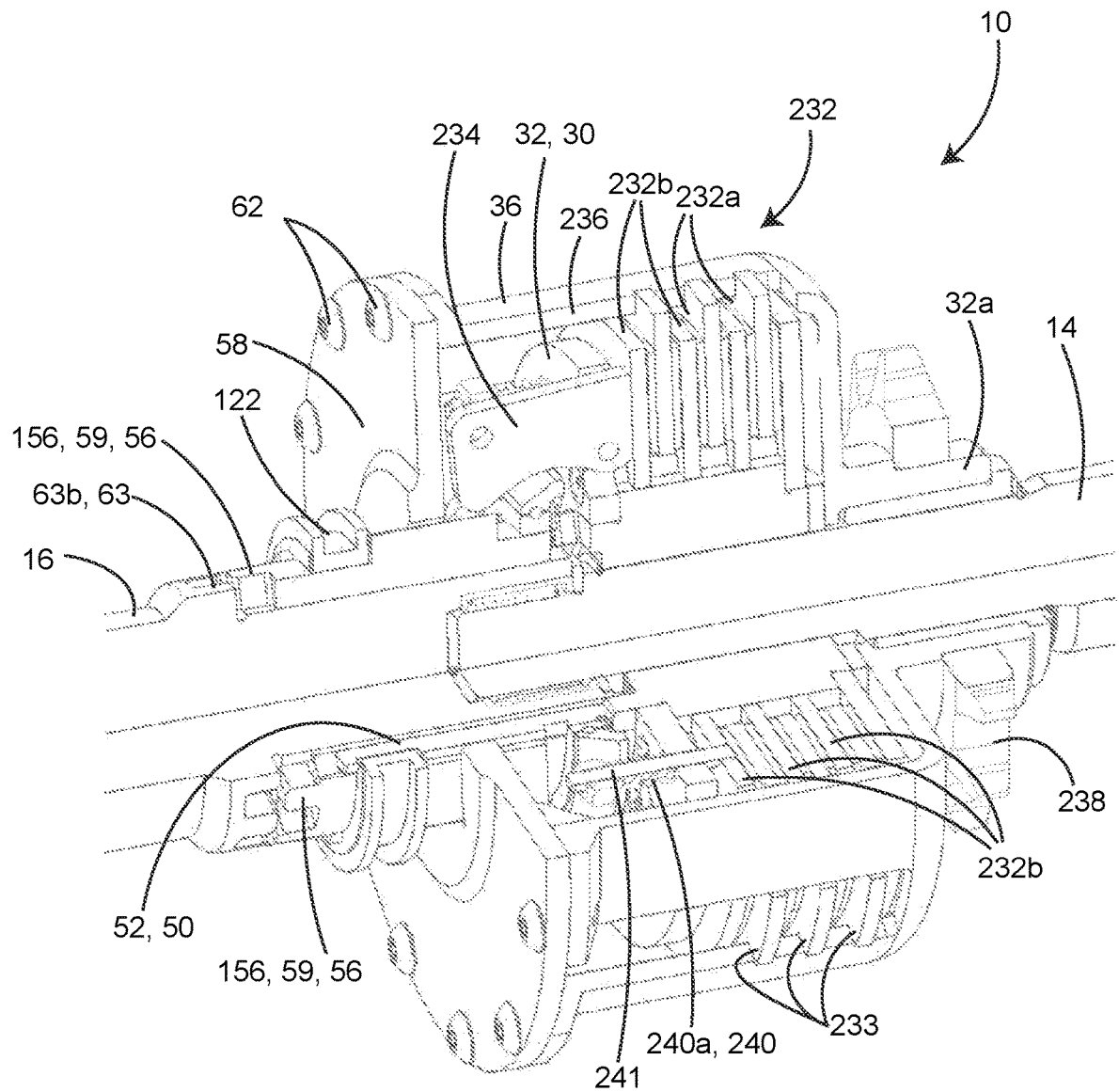
FIG. 10B shows a partial section view of the second embodiment of the transmission system shown in FIG. 9.
Figure 11:
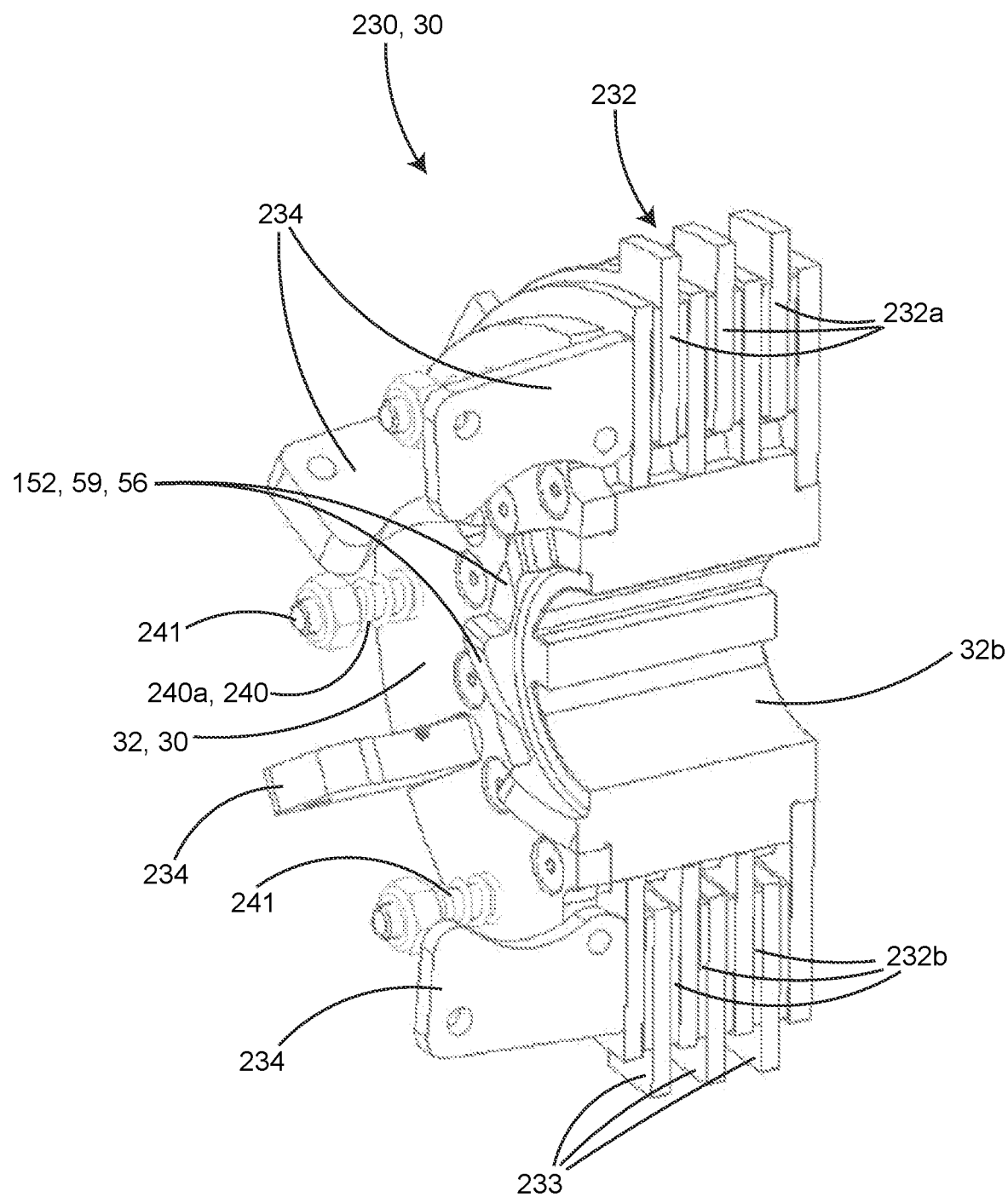
FIG. 11 shows a section view of the axial-centrifugal clutch of the second embodiment of the transmission system shown in FIG. 9.

In the specific embodiment provided in FIGS. 9, 10A and 10B, the connection between the clutch slider element 50 and the rotor 42 is achieved via at least one sprocket element 238 that is mounted on an external surface of the drum 36 (such as the drum collar 36b). The at least one sprocket element 238 includes a through-opening in which the drum collar 36b is received, for mounting the at least one sprocket element 238 on the drum 36. The at least one sprocket element 238 is structured to be rotatably coupled to the rotor 42 of the electric machine 40, via a chain element (or other similar element such as a belt), for rotatably coupling the clutch slider element 50 and the rotor 42 via the drum 36.

In an alternate embodiment, the connection between the clutch slider element 50 and the rotor 42 is achieved via at least one gear element (not shown) that is mounted on an external surface of the drum 36 such as the drum collar. The at least one gear element is structured to engage (either directly or indirectly via an additional geartrain), the rotor 42 of the electric machine.

In an additional embodiment where the transmission system 10 includes the at least one gear element for rotatably coupling the rotor 42 and the clutch slider element 50, an axle of the rotor 42 is disposed at an angle of relative to an axle of the clutch slide element 50.

In an embodiment, the first connector 54 of the clutch slider element 50 includes a plurality of first tooth members 57 that define the plurality of first engagement surfaces 54*a* thereon, and the second connector 56 of the clutch slider element 50 includes a plurality of second tooth members 59 that define the plurality of second engagement surfaces 56*a* thereon.

In an additional embodiment, the portion of the centrifugal clutch 30 that is engaged by the plurality of first engagement surfaces 54*a* of the first connector 54 on the clutch slider element 50 is the clutch connection element 61, and the portion of the driven shaft 16 that is engaged by the plurality of second engagement surfaces 56*a* of the second connector 56 on the clutch slider element 50 is a driven shaft connection element 63.

In the embodiment where the first and second connectors 54, 56 includes the respective first and second tooth members 57, 59, the driven shaft connection element 63 and the clutch connection element 61 each include a plurality of tooth members that are structured to engage the plurality of first tooth members 57 or the plurality of second tooth members 59. In this way, the clutch connection element 61 is capable of mate-ably engaging the first connector 54, and the driven shaft connection element 63 is capable of mate-ably engaging the second connector 56.

In an additional embodiment, the mating engagement of the first tooth members 57 with the tooth members of the clutch connection element 61 and of the mating engagement of the second tooth members 59 with the plurality of tooth members of the driven shaft connection element 63 are facilitated by a tapering that is provided on at least some of the first tooth members 57, second tooth members 59 and/or the plurality of tooth members.

Figure 5A:
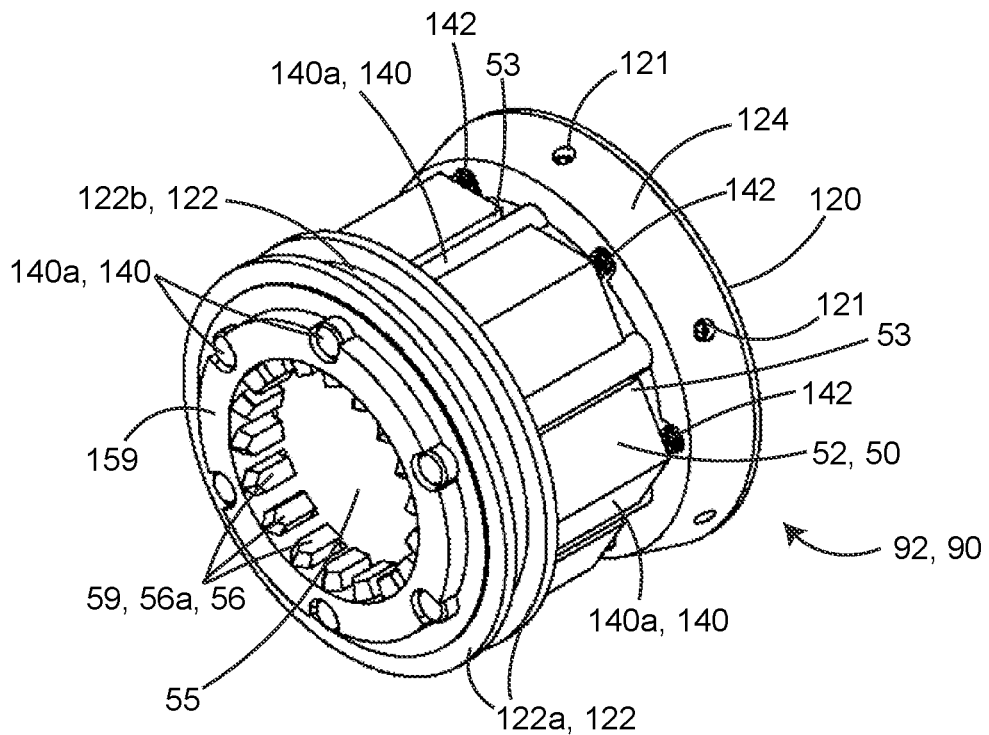
FIG. 5A shows a perspective view of the clutch slider element of the first embodiment of the transmission system shown in FIG. 2.
Figure 5B:
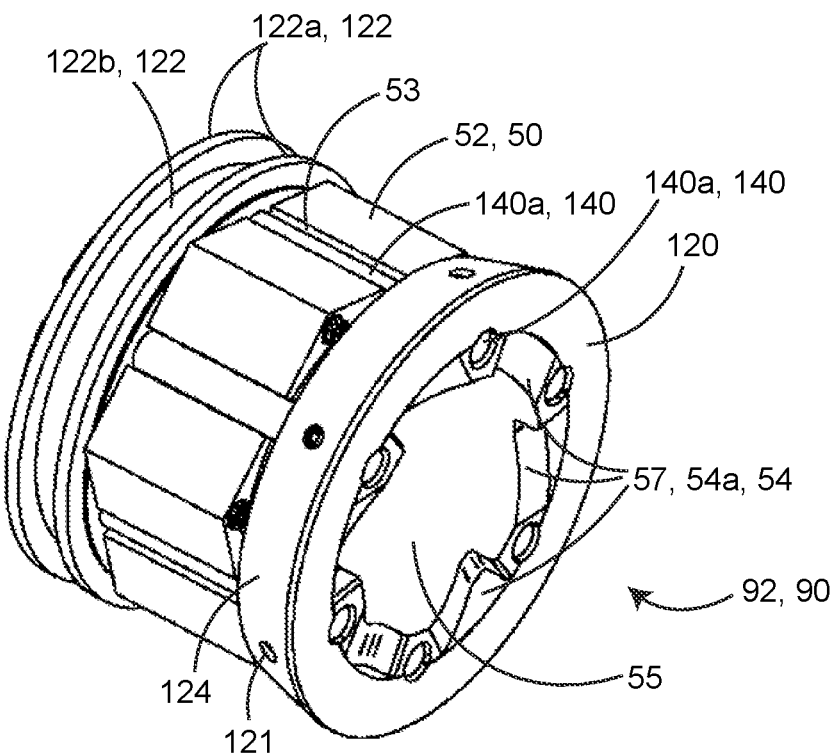
FIG. 5B shows another perspective view of the clutch slider element of the first embodiment of the transmission system shown in FIG. 2.
Figure 7:
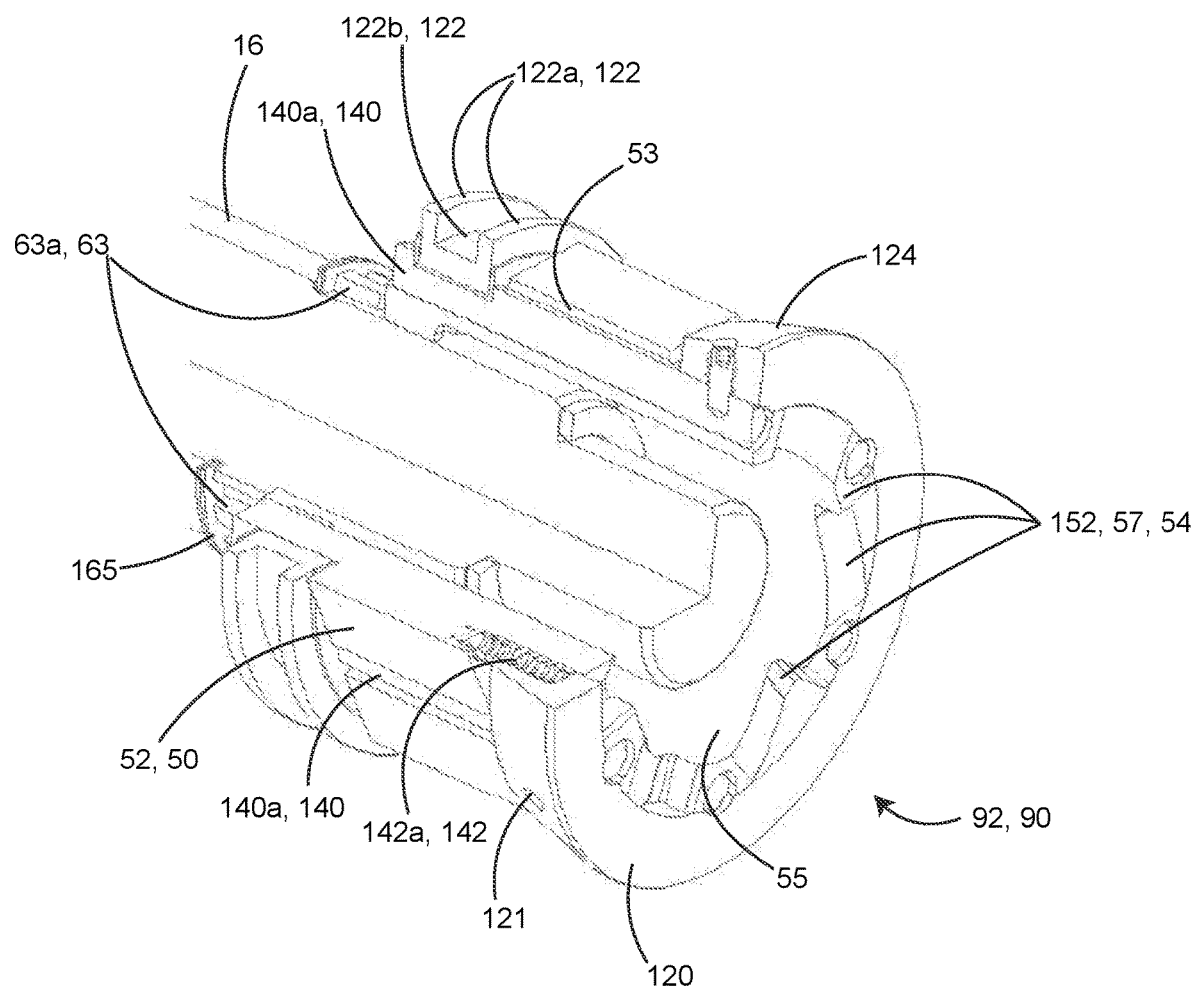
FIG. 7 shows a partial section view of the clutch slider element of FIG. 5A, where the clutch slider element is mounted on the driven shaft.

Referring to FIGS. 5A, 5B, and 7, a first embodiment of the clutch slider element 50 is provided. In this first embodiment of the clutch slider element 50, the first clutch hub 52 of the clutch slider element 50 is shaped to be received through the through-aperture 58*a* of the mounting plate 58 that is connected on the drum 36.

In the specific embodiment provided in FIGS. 5A, 5B, and 7, the first tooth members 57 of the first connector 54 are formed as a plurality of spiral teeth 152 that are arranged circumferentially on a first end face of the first clutch hub 52 (i.e., an end face on a first end of first clutch hub 52), where the first end of the first clutch hub 52 is closer to the centrifugal clutch 30 than a second, opposing end face of the first clutch hub 52. The plurality of spiral teeth 152 are structured to engage the clutch connection element 61 of the centrifugal clutch 30. In this embodiment, the clutch connection element 61 can be formed as a plurality of corresponding spiral gear teeth.

In the same embodiment, the second tooth members 59 of the second connector 56 are formed as a plurality of dog teeth 154 that are positioned on an inner surface of a through-bore 55 of the first clutch hub 52. The plurality of dog teeth 154 extend from the second end of the first clutch hub 52, along a length of the through-bore 55 and are shaped to engage with the driven shaft connection element 63 of the driven shaft 16. In this embodiment, the driven shaft connection element 63 can include a plurality of corresponding dog teeth 63*a*. The clutch slider element 52 also includes a thrust washer 159 that is mounted on an end face thereof, proximate the second tooth members 59.

Figure 6A:
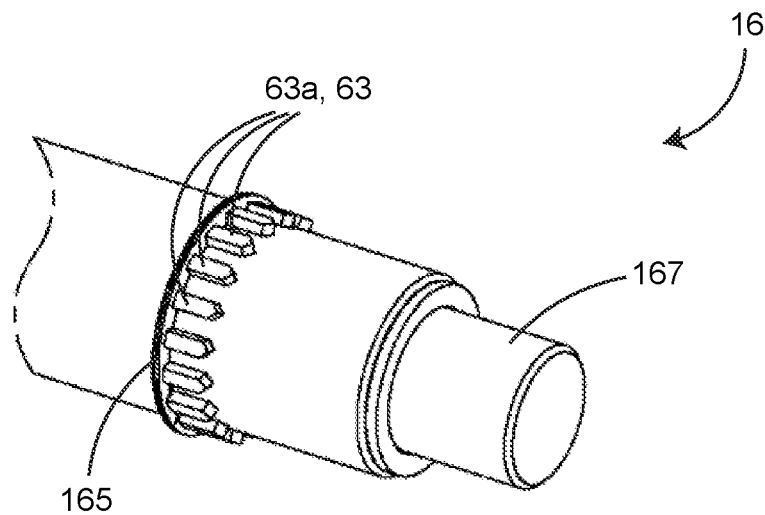
FIG. 6A shows an embodiment of a driven shaft that is connectable to the clutch slider element of FIG. 5A.
Figure 6B:
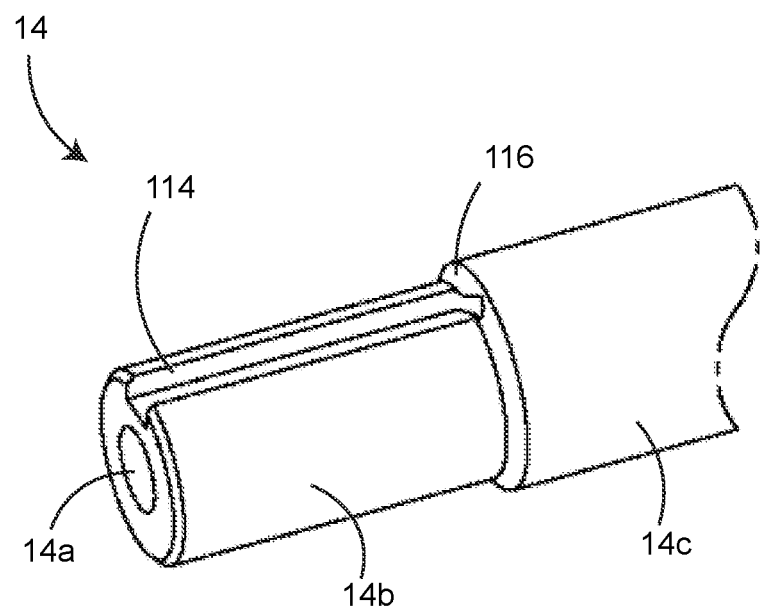
FIG. 6B shows an embodiment of a driving shaft that is connectable to the slide centrifugal clutch of FIG. 4.

Referring to FIGS. 6A, 6B, and 7A, there is provided an embodiment of the driven shaft 16 and driving shaft 14 for use with the first embodiment of the clutch slider element 50 provided in FIGS. 5A, 5B, and 7A.

In the specific embodiment provided in FIG. 6B, the driving shaft 14 is a cylindrical drive shaft that includes a keyway 114 for connecting the driving shaft 14 to the inner hub portion of the second clutch hub 32 of the centrifugal clutch 30. In alternate embodiments, the driving shaft 14 can include a spline in place of the keyway 114. The driving shaft 14 also includes the threaded hole 14*a* for receiving a mounting element such as the threaded fastener 34 described above. The driving shaft 14 also includes a shoulder portion 116 against which the inner hub portion 135 of the second clutch hub 32 will abut, where the shoulder portion 116 joins a narrow cylindrical portion 14*b* and a wide cylindrical portion 14*c* of the driving shaft 14.

In the specific embodiment provided in FIGS. 6A, and 7A, the driven shaft connection element 63 of the driven shaft 16 includes the corresponding plurality of dog teeth 63*a* for engaging the plurality of dog teeth 154 of the second connector 56 when the clutch slider element 50 is in the third engagement position. The driven shaft 16 also includes a thrust washer (could also be formed as a bearing) for mating the driven shaft 16 with the first clutch hub 52, and a stop ring 165 that is structured to abut a second end of the first clutch hub 52, when the clutch slider element 50 engages the driving shaft 14, to prevent the clutch slider element 50 from moving beyond the third engagement position. The driven shaft 16 also includes a shaft end 167 that can be received in the bearing 33 of the second clutch hub 32.

Figure 12A:
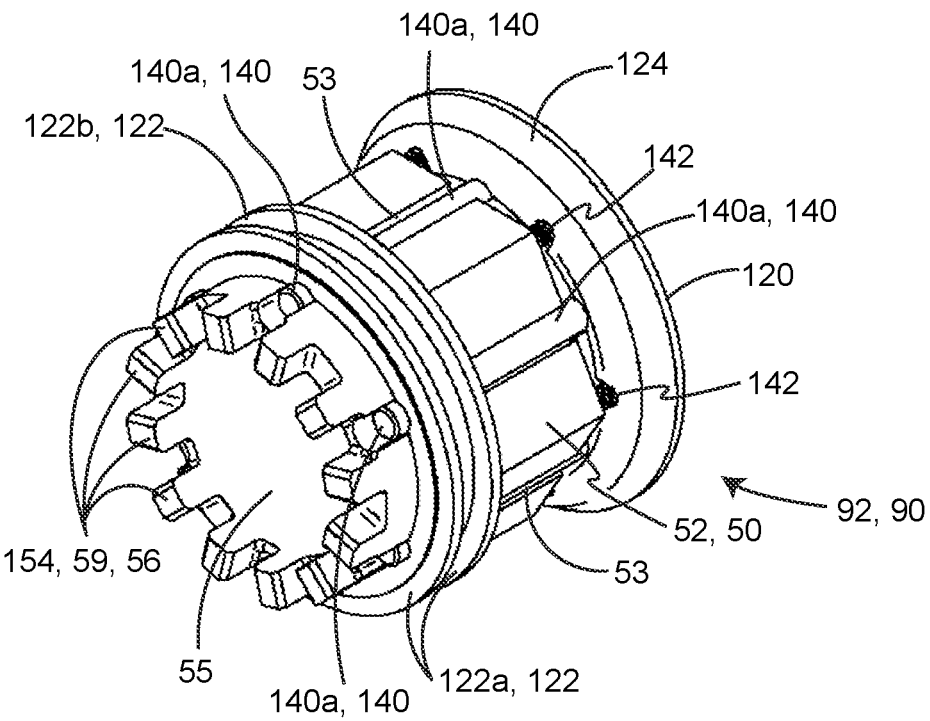
FIG. 12A shows a perspective view of the clutch slider element of the second embodiment of the transmission system shown in FIG. 9.
Figure 12B:
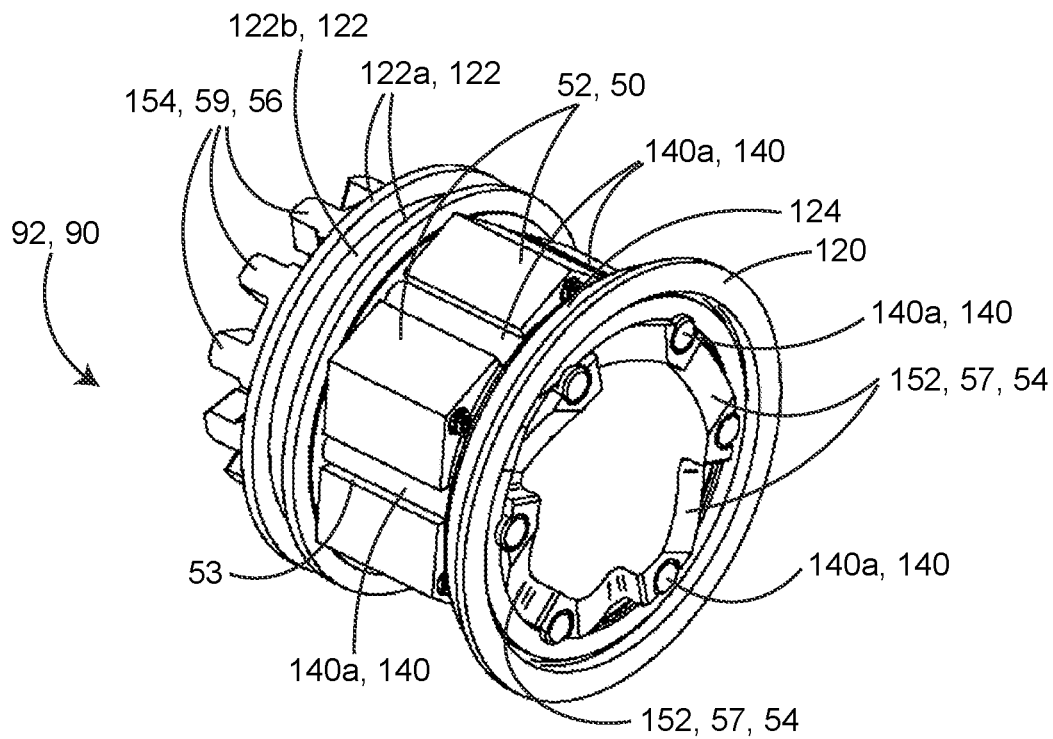
FIG. 12B shows another perspective view of the clutch slider element of the second embodiment of the transmission system shown in FIG. 9.
Figure 14:
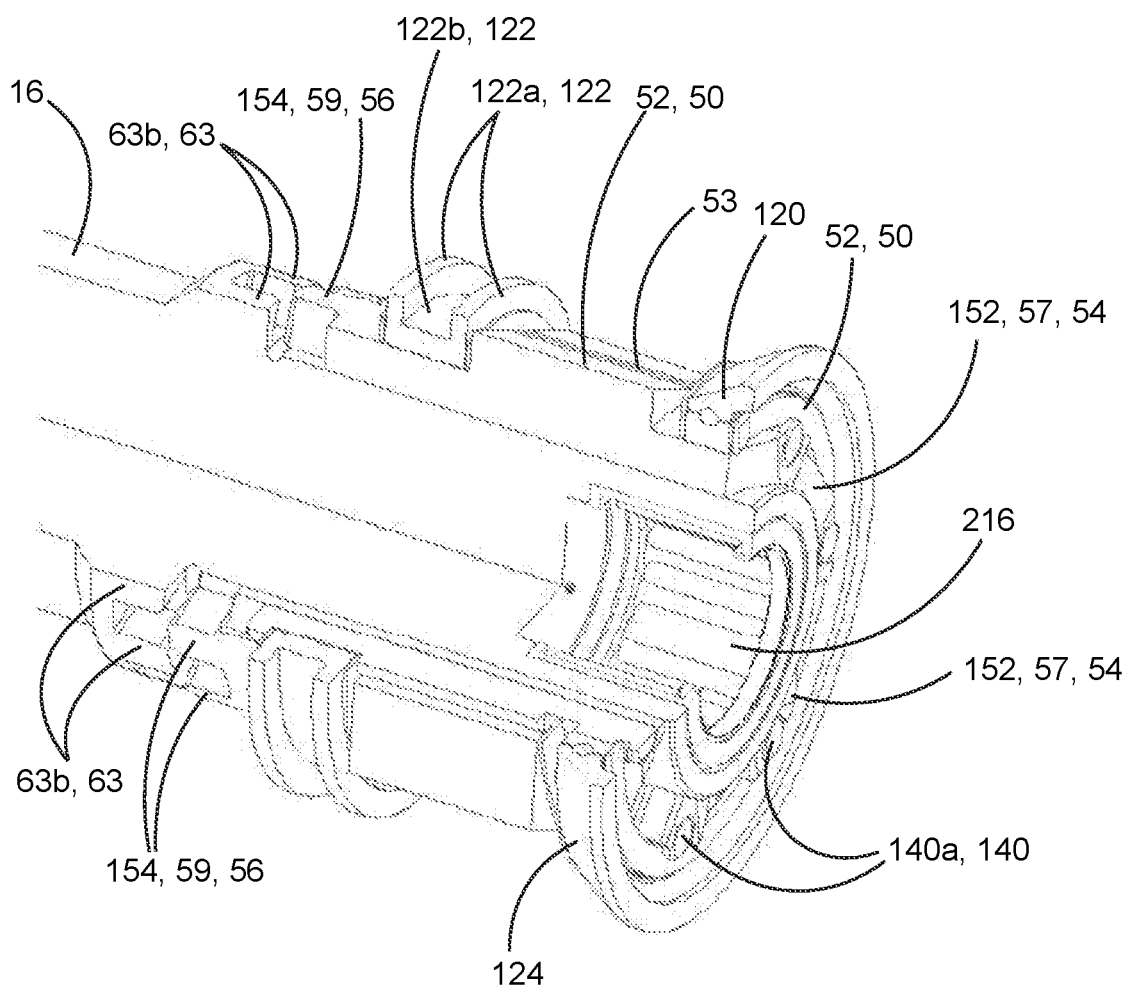
FIG. 14 shows a partial section view of the clutch slider element of FIG. 12A, where the clutch slider element is mounted on the driven shaft.

Referring to FIGS. 12A, 12B and 14, a second embodiment of the clutch slider element 50 is provided. In this second embodiment of the clutch slider element 50, the first clutch hub 52 of the clutch slider element 50 is again shaped to be received through the through-aperture 58*a* of the mounting plate 58 on the drum 36.

In the specific embodiment provided in FIGS. 12A, 12B and 14, the first tooth members 57 of the first connector 54 are formed as the plurality of spiral teeth 152 that are arranged circumferentially on the first end face of the first clutch hub 52 (i.e., the end face on the end of the first clutch hub 52 that is closer to the centrifugal clutch 30 than the second, opposing end face of the first clutch hub 52). The plurality of spiral teeth 152 are structured to engage the clutch connection element 61 of the centrifugal clutch 30. In this embodiment, the clutch connection element 61 can be formed as a plurality of corresponding spiral gear teeth. In this same embodiment, the second tooth members 59 of the second connector 56 are formed as plurality of square teeth 156 that are arranged in a circumferential pattern on the second end face of the first clutch hub 52. The plurality of square teeth 156 are radially aligned along the second end face of the first clutch hub 52 and are structured for engaging with the driven shaft connection element 63 on the driven shaft 16. In this embodiment, the driven shaft connection element 63 can include the plurality of corresponding square teeth 63*b*.

Figure 13A:
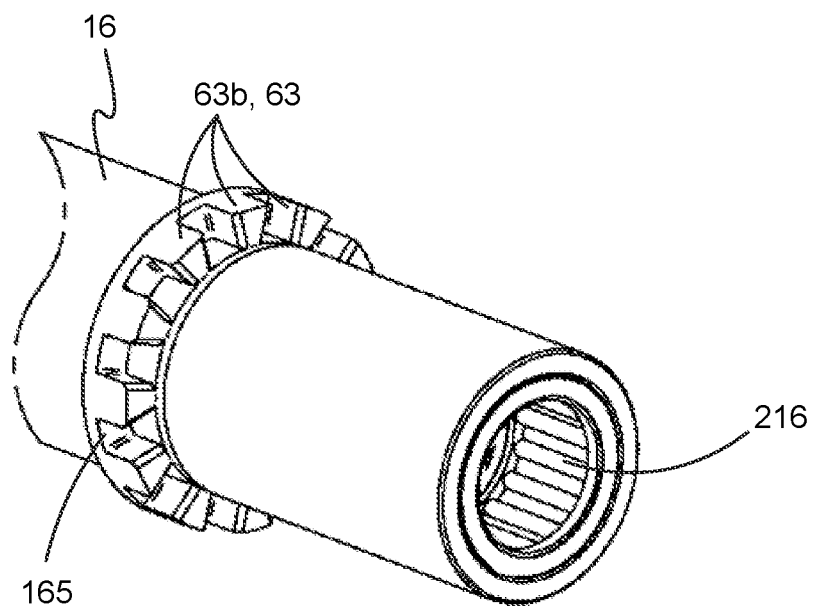
FIG. 13A shows an embodiment of a driven shaft that is connectable to the clutch slider element of FIG. 12A.
Figure 13B:
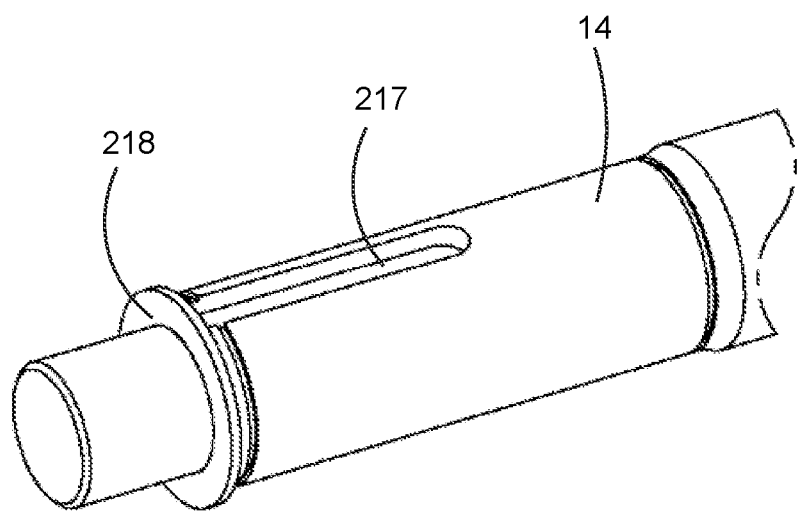
FIG. 13B shows an embodiment of a driving shaft that is connectable to the slide centrifugal clutch of FIG. 11.

Referring to FIGS. 13A, 13B, and 14, there is provided an embodiment of the driven shaft 16 and driving shaft 14 for use with the second embodiment of the clutch slider element 50 provided in FIGS. 12A, 12B and 14.

In the specific embodiment provided in FIG. 13B, the driving shaft 14 is a cylindrical drive shaft that includes a keyway 217 for connecting the driving shaft 14 to the inner hub portion of the second clutch hub 32 of the centrifugal clutch 30. In alternate embodiments, the driving shaft 14 can include a spline in place of the keyway. The driving shaft 14 also includes a thrust/washer bearing for output shaft mating, and a seat for at least one thrust washer 218 to position the clutch slider element 50 onto the driving shaft 14 when the clutch slider element 50 is in the first engagement position.

In the specific embodiment provided in FIGS. 13A, and 14, the driven shaft connection element 63 of the driven shaft 16 includes a plurality of square teeth to engage with the square teeth of the second connector 56 of the clutch slider element 50 when the clutch slider element 50 is in the third engagement position. The driven shaft 16 includes a bearing 216 for receiving a portion of the driven shaft 14 therewithin, and the stop ring 165.

In the embodiments provided in FIGS. 12A, 12B, 13A, 13B, and 14, the structure of the square teeth of the second tooth members 59 may requires the clutch slider element 50 to be slowly rotated when engaging the square teeth of the second tooth members 59 on the clutch slider element 50 with the corresponding square teeth on the driven shaft 16. This slow rotation of the clutch slider element 50 can be accomplished via operation of electric machine 40 to rotate the rotor 42.

Referring to FIGS. 19, 20, 21A, and 21B, a third embodiment of the clutch slider element 50 is provided.

In the specific embodiment provided in FIGS. 19, 20, 21A, and 21B, the first tooth members 57 of the first connector 54 are again formed as the plurality of spiral teeth that are arranged circumferentially on the first end face of the first clutch hub 52. The plurality of spiral teeth are structured to engage the clutch connection element 61 of the centrifugal clutch 30. In this embodiment, the clutch connection element 61 can be formed as a plurality of corresponding spiral gear teeth. In the same embodiment, the second tooth members 59 of the second connector 56 are formed as the plurality of dog teeth that are positioned on inner surface of the through-bore 55 of the first clutch hub 52. In this embodiment, the driven shaft connection element 63 can include a plurality of corresponding dog teeth.

While the above embodiments provide specific structures of the first connector 54, second connector, clutch connection element 61 and driven shaft connection element 63, it will be appreciated that the first connector 54, second connector, clutch connection element 61 and driven shaft connection element 63, may take on any suitable form of connector for achieving the various operating configurations described herein.

Clutch Override Assembly

In the transmission system 10 as described herein, the driven shaft 16 can be driven to produce an output torque via an electric only drive mode (i.e., when the clutch slider element 50 is in the third engagement position and only the electric machine 40 is operated to drive the rotation of the driving shaft 14). While in the electric-only drive mode, the internal combustion engine 12 is generally turned off and does not drive the driving shaft 14. In operation, the internal combustion engine 12 is started by disengaging the clutch slider element 50 from the driven shaft 16 (i.e., the third engagement position) and driving the clutch slider element 50 to the first engagement position so as to reengage with the centrifugal clutch 30 and driving shaft 14.

If the transmissions system of the present disclosure is provided without the clutch override assembly 90, the step of disengaging the clutch slider element 50 from the driven shaft 16 to start the internal combustion engine 12 produces a momentary loss of torque transfer to the driven shaft 16 and an inevitable slow-down of the speed of the driven shaft 16. While the slow-down of the driven shaft 16 speed may be acceptable for some applications of the transmission system 10, there exist a number of applications of the transmission system 10 where this loss of torque transfer and resulting slow-down of the speed of the driven shaft 16 is very undesirable.

For example, if the transmission system 10 is used in an automotive vehicle, and a driver of the automotive vehicle decides to switch from the electric-only drive mode to the at least one hybrid mode to take advantage of the internal combustion engine 12 power while surpassing another vehicle 20, a momentary loss of torque transfer could actually be unsafe and dangerous. Similarly, a driver of the automotive vehicle could decide to switch from the electric-only drive mode to the at least one hybrid mode to take when accelerating on a highway ramp in order to have enough power to keep up with fast moving traffic. Again, a momentary loss of torque transfer could create an unsafe situation.

By providing the transmission system 10 that includes the clutch override assembly 90, the clutch override assembly 90 is able to provide engagement between the clutch slider element 50 and the centrifugal clutch 30 for transferring torque from the internal combustion engage, while the clutch slider element 50 remains in the third engagement position, connected to the driveline (therefore still transferring torque to the driven shaft 16). The clutch override assembly 90 provides for a quick engagement between the centrifugal clutch 30 and the clutch slider element 50 without separating the clutch slider element 50 from the driven shaft 16, thereby allowing continuous torque transfer during the starting of the internal combustion engine 12 and also allowing for an increase in torque transfer to be quickly realized by the combined, simultaneous input of the electric machine 40 and the internal combustion engine 12.

As described above and shown in FIGS. 8A to 8D, the clutch override assembly 90 includes the actuator element 92, where the actuator element 92 is movable between the non-override (D) and override (E) positions for engaging the centrifugal clutch 30 and rotatably coupling the centrifugal clutch 30 to the drum 36.

In some embodiments of the transmissions system as disclosed herein, the clutch override assembly 90 is structured to force engagement of the centrifugal clutch 30 by forcing the at least one clutch element 38 of the centrifugal clutch 30 towards a radially outward position. In these embodiments, the clutch override assembly 90 is structured to apply a wedging force to the at least one clutch element 38 of the centrifugal clutch 30, via the actuator element 92, for driving the at least one clutch element 38 towards the radially outward position. As the actuator element 92 moves from the non-override to the override position, the actuator element 92 will contact the at least one clutch element 38 and will engage and apply the wedging force to the at least one clutch element 38. Due to the application of the wedging force by the actuator element 92, the at least one clutch element 38 will be driven to the radially outward position, and the centrifugal clutch 30 will engage and become rotatably coupled to the drum 36 (and/or the rotor).

In an embodiment, the actuator element 92 includes at least one wedged surface 124 that is formed at an angle relative to a long axis of the clutch slider element 50. The at least one wedged surface 124 is positioned on the actuator element 92 such that as the actuator element 92 is driven from the non-override position to the override position, the at least one wedged surface 124 will contact the at least one clutch element 38 (e.g., the radially slidable clutch shoes 132a or the weighted levers 234) for applying the wedging force to the at least one clutch element 38 to force the at least one clutch element 38 towards the radially outward position.

In an embodiment, the actuator element 92 is slidably mounted on the first clutch hub 52 for sliding therealong between the non-override position and the override positions.

In an additional embodiment, the actuator element 92 includes an actuation ring 120 that is structured to engage the at least one clutch element 38 of the centrifugal clutch 30 when the actuator element 92 is slid into the override position, and a selector ring 122 that is structured to be driven by the at least one selector element for driving the actuator element 92 between the non-override and override positions. The actuation ring 120 and selector ring 122 are structured to slide together along the first clutch hub 52, between the non-override and override positions. In this embodiment, it is the actuation ring 120 that functions to engage with the clutch element 38 of the centrifugal clutch 30 for driving the clutch element 38 towards the radially outward position.

In an additional embodiment such as shown in FIGS. 2A to 8D where the actuator element 92 includes the at least one wedged surface 124, the at least one wedged surface 124 is formed on the actuation ring 120.

In an embodiment, the at least one selector element can engage the selector ring 122 of the actuator element 92 to either i) drive the clutch slider element 50 (that includes the actuator element 92) between the first, second, and third engagement positions, or ii) drive the actuator element 92 to slide between the non-override position and the override position.

In some embodiments, the clutch slider element 50 and actuator element 92 are collectively structured such that the actuator element 92 remains in the non-override position when the clutch slider element 50 is in either the first engagement position or the second engagement position. In this way, the actuator element 92 can only be driven from the non-override position to the override position when the clutch slider element 50 is in the third engagement position.

In an additional embodiment, the clutch slider element 50 and actuator element 92 are structured to be driven by the at least one selector element such that i) in the first engagement position, the clutch slider element 50 and actuator element 92 are at a first axial distances relative to the centrifugal clutch 30 ii) in the second engagement position the clutch slider element 50 and actuator element 92 are at a second axial distances relative to the centrifugal clutch 30 which are greater than the respective first axial distances, and iii) in the third engagement position the clutch slider element 50 and actuator element 92 are at a third axial distances relative to the centrifugal clutch 30 that are greater than the respective second axial distances. As shown in FIGS. 8A to 8D and FIGS. 15A to 15D, when moving the actuator element 92 from the non-override position to the override position, the actuator element 92 is slid along the first clutch hub 52 such that the actuator element 92 travels from the third axial distance to a fourth axial distance from the centrifugal clutch 30 that is greater than the third axial distance.

In the specific embodiment provided in FIGS. 3 to 8D and FIGS. 9 to 15D, the selector ring 122 of the actuator element 92 is structured to include a pair of flanges 122a that extend circumferentially around the clutch slider element 50. A selector channel 122b is defined between the pair of flanges 122a, and the channel selector 122b is sized such that the at least one selector element (described in further detail above) can be received therewithin for engaging the selector ring 122.

In an embodiment such as shown in FIGS. 3 to 8D and FIGS. 9 to 15D where the actuator element 92 includes the selector ring 122 and the actuation ring 120, the actuator element 92 further includes a plurality of connector elements 140 that are mounted between the actuation ring 120 and the selector ring 122.

In the specific embodiment provided in FIGS. 3 to 8D and FIGS. 9 to 15D, the plurality of connector elements 140 are a plurality of axial connection rods 140a that extend along the length of the first clutch hub 52. Each of the selector ring 122 and actuation ring 120 includes a plurality of corresponding through-apertures. The ends of each connection rod 140a of the plurality of axial connection rods 140a are received in one of the plurality of through-apertures on each of the selector ring 122 and the actuation ring 120 such that the selector ring 122 and actuation ring 120 are connected together via the plurality of axial connection rods 140a. In this way, the selector ring 122 and actuation ring 120 are slidably coupled together.

In the specific embodiment provided in FIGS. 3 to 8D, the axial connection rods 140a are secured in the actuation ring 120 via a plurality of long nose set screws 121.

In an additional embodiment, the actuator element 92 further includes at least one actuator biasing element 142 that is connected between the actuator element 92 and the first clutch hub 52, and that is structured to bias the actuator element 92 towards the non-override position.

In the specific embodiment provided in FIGS. 3 to 8D and FIGS. 9 to 15D, the at least one actuator biasing element 142 includes a plurality of radially disposed compression springs 142a that are connected between the actuation ring 120 and a portion of the second clutch hub 32.

The plurality of radially disposed compression springs 142a or other actuator biasing element 142 keeps the selector ring 122 and actuation ring 120 in the non-override position. When the force exerted by the at least one selector element onto the selector ring 122 overcomes the biasing force of the radially disposed compression springs 142a (or other actuator biasing element 142), the selector ring 122 and actuation ring 120 will slide along the first clutch hub 52 towards the override position.

In an additional embodiment such as shown in FIGS. 3 to 8D and FIGS. 9 to 15D, the first clutch hub 52 includes a plurality of longitudinal channels 53 formed around the circumference of the clutch hub. Each of the plurality of longitudinal channels 53 is sized to slidable receive one of the connector elements 140 therewithin such that the connector element can slide within the longitudinal channels 53 as the actuator element 92 slides between the non-override and override positions. Said another way, the plurality of connector elements 140 are sized to be slidably received within the plurality of longitudinal channels 53 on the clutch hub such for slidably mounting the actuator element 92 on the clutch slider element 50.

The connector elements 140 can, in some embodiments, be embedded in the clutch slider element 50. Alternatively, the connector elements 140 may extend at least partially beyond an outer circumference of the first clutch hub 52 of the clutch slider element 50. In the embodiments where the connector elements 140 protrude beyond the circumference of the first clutch hub 52, the mounting plate 58 will include a plurality of notches so that the connector elements 140 are not subjected to any contact force transmitted between the mounting plate 58 and the clutch slider element 50 during torque transmission from the rotor 42 to the clutch slider element 50. In the same way, the connector elements 140 will also not be subjected to any contact force that is transmitted between the mounting plate 58 and the clutch slider element 50 when the engine 12 is supplying torque to the driven shaft 16 in combination with the rotor 42.

In the specific embodiment provided in FIGS. 3 to 8D and FIGS. 9 to 15D, each of the plurality of longitudinal channels 53 is formed in one circumferential face of the hexagonally-shaped first clutch hub 52. In this embodiment, the plurality of longitudinal channels 53 are specifically sized relative to the size of each of the plurality of axial connection rods 140a such that the axial connection rods 140a are not subjected to any contact pressure with the mounting plate 58 on the drum 36, and the axial connection rods 140a can freely slide within the longitudinal channels 53, as long as the at least one selector element (not shown) exerts enough force to overcome the at least one biasing element that is biasing the actuator element 92 towards the non-override position. In this way, the axial connection rods 140a that connect the selector ring 122 and actuation ring 120 are not subject to the torque transmitted to or from the clutch slider element 50 and can therefore slide axially when the force applied by the at least one selector element overcomes the force exerted by the at least one actuator biasing element 142.

Figure 8A:
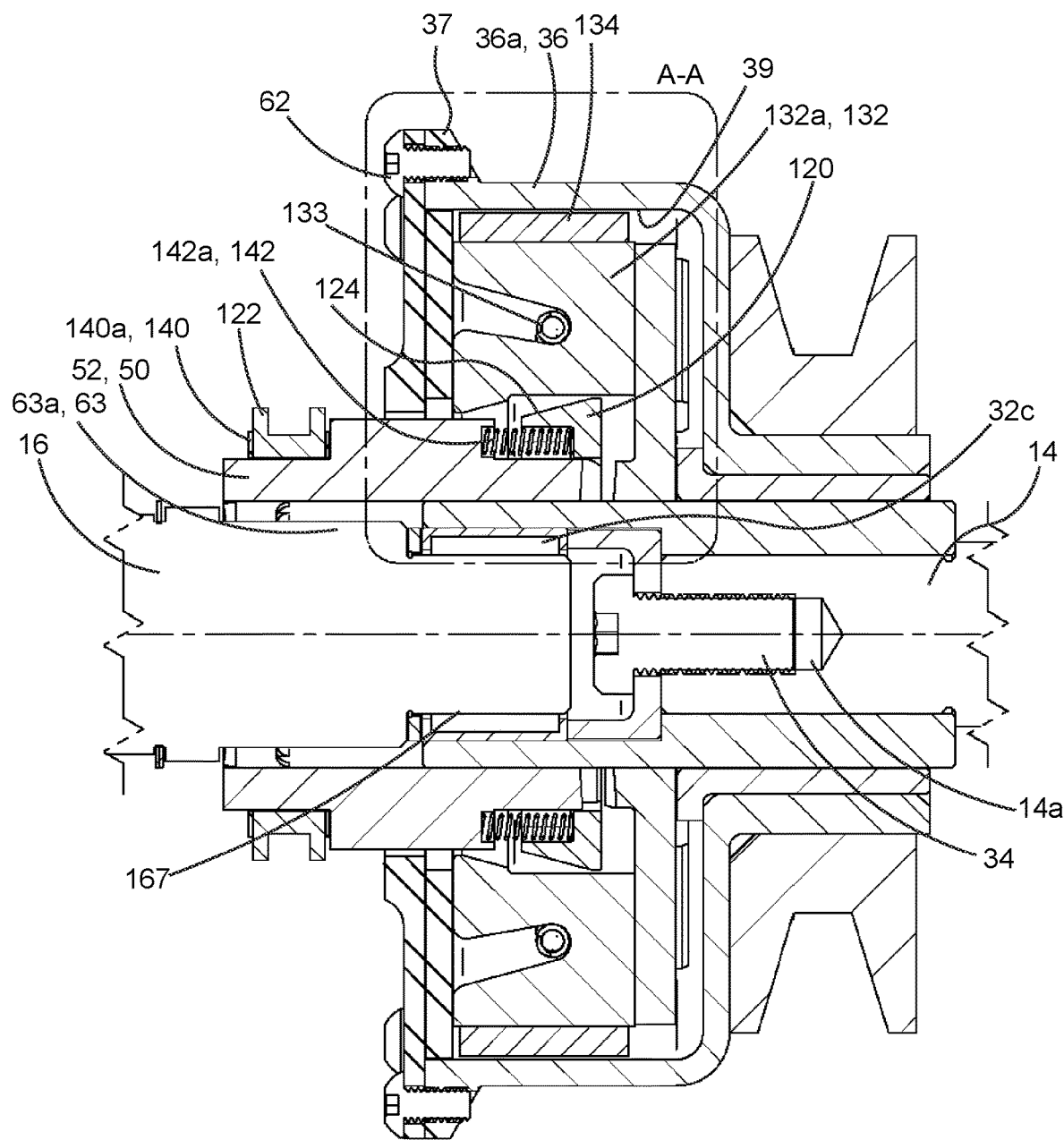
FIG. 8A shows a side, section view of the first embodiment of the transmission system shown in FIG. 2, where the actuator element is in the non-override position.
Figure 8B:
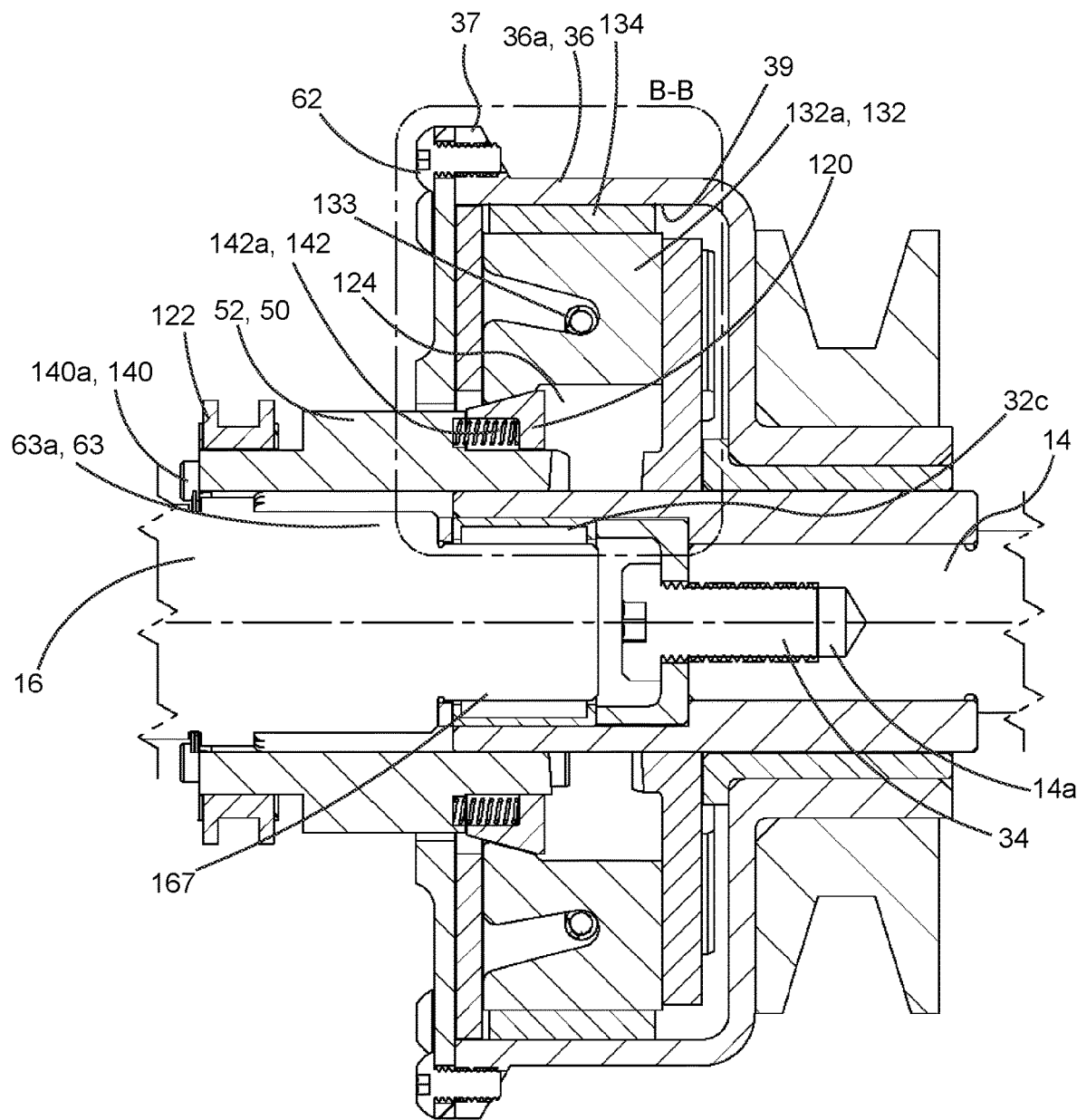
FIG. 8B shows a side, section view of the first embodiment of the transmission system shown in FIG. 2, where the actuator element is in the override position.
Figure 8C:
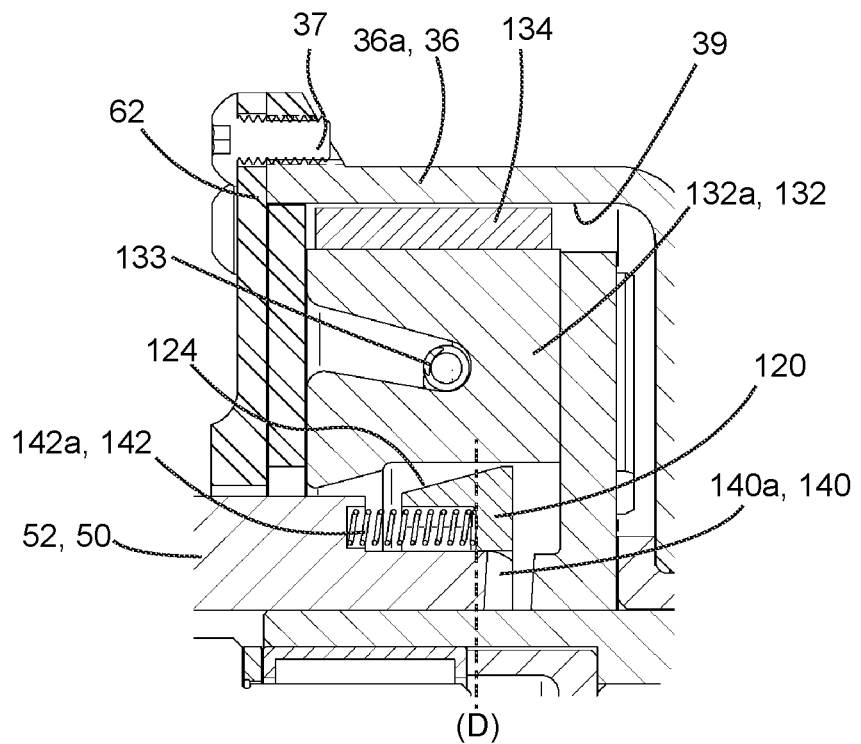
FIG. 8C shows a close-up, section view of the region A-A of the first embodiment of the transmission system shown in FIG. 8A.
Figure 8D:
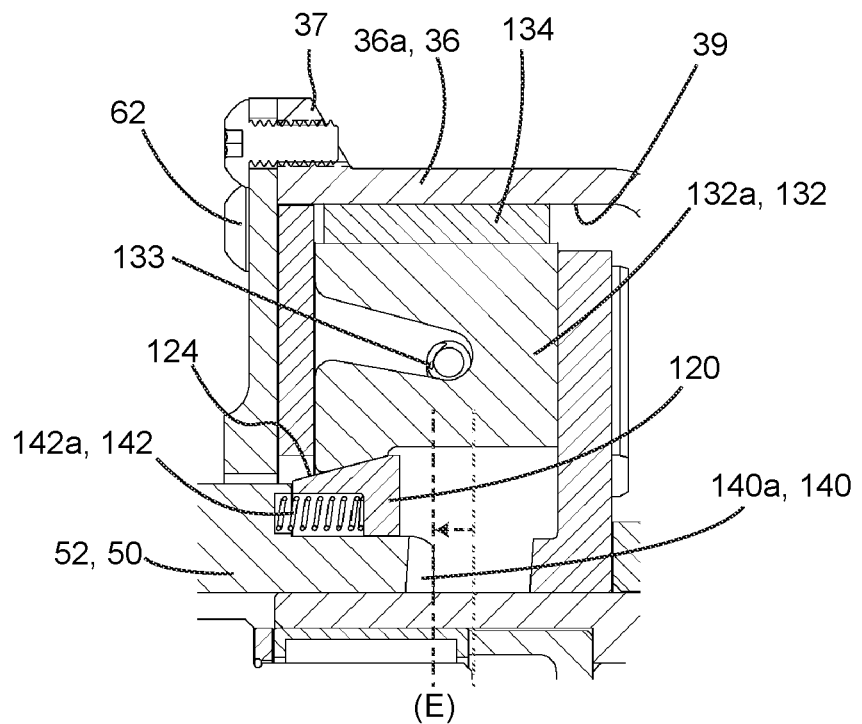
FIG. 8D shows a close-up, section view of the region B-B of the first embodiment of the transmission system shown in FIG. 8B.

In the specific embodiment provided in FIGS. 1 to 8D where the centrifugal clutch 30 includes the plurality of radially slidable clutch shoes 132a that are slidably mounted to the inner hub portion 135 of the second clutch hub 32, the plurality of radially slidable clutch shoes 132a define the at least one clutch element 38 of the centrifugal clutch 30. As shown in FIGS. 8A and 80, when the actuator element 92 is in the non-override position, the slidable clutch shoes 132a are held in the radially inward position. As shown in FIGS. 8B and 8D, when the actuator element 92 moves from the non-override position to the override position, the actuator element 92 directly engages each of the plurality of radially slidable clutch shoes 132a to force the plurality of slidable clutch shoes 132a to slide along the second clutch hub 32 from the radially inward position to the radially outward position to thereby engage the inner surface of the drum 36.

In the specific embodiment provided in FIGS. 9-7B where the centrifugal clutch 30 is the axial-centrifugal clutch 30 with the clutch pack 232 and the plurality of weighted levers 234, the plurality of weighted levers 234 define the at least one clutch element 38 of the centrifugal clutch 30. As shown in FIGS. 15A and 15C, when the actuator element 92 is in the non-override position, the plurality of weighted levers 234 are held in the radially inward position. As shown in FIGS. 15B and 15D, when the actuator element 92 moves from the non-override position to the override position, the actuator element 92 directly engages each of the plurality of weighted levers 234 to force the plurality of weighted levers 234 to pivot about the second clutch hub 32 from the radially inward position to the radially outwards position and thereby engage the clutch pack 232 of the axial-centrifugal clutch 30.

By engaging the centrifugal clutch 30 (either the slide centrifugal clutch 130 or the axial-centrifugal clutch 230), the driven shaft 16 is rotatably coupled to the driving shaft 14, therefore allowing to quickly start the internal combustion engine 12 by the combined simultaneous actions of the electric motor and the vehicle's 20 inertia. The electric machine 40 quickly adjusts its torque output to smoothen the power transmitted to the driven shaft 16.

In some embodiments of the present disclosure such as shown in FIGS. 16A to 23B, the clutch override assembly 90 is not structured to force "engagement" of the at least one clutch element 39 of the centrifugal clutch 30 for rotatably coupling the centrifugal clutch 30 and the rotor 42 (and the drum 36, if present). Rather, the clutch override assembly 90 is structured to frictionally engage with the centrifugal clutch 30 to effectively "clamp" the centrifugal clutch 30 and thereby rotationally connect the centrifugal clutch 30 with the clutch slider element 50. In these embodiments, the actuator element 92 is structured such that in the override position, the actuator element 92 will frictionally engage at least one surface of the second clutch hub 32 of the centrifugal clutch 30 for rotatably connecting the centrifugal clutch 30 element and the clutch slider element 50.

In an additional embodiment, the at least one surface of the second clutch hub 32 of the centrifugal clutch 30 that is frictionally engaged by the actuator element 92 is at least one lateral surface of the second clutch hub 32.

In the specific embodiment provided in FIGS. 16A to 22B, the at least one lateral surface of the second clutch hub 32 includes a surface of one of the retaining plates 35 of the second clutch hub 32.

In an embodiment such as shown in FIGS. 16A to 22B, the centrifugal clutch 30 is the pivoting flyweight centrifugal clutch 330, and the clutch override assembly 90 is structured so that the actuator element 92 frictionally engages the second clutch hub 32 of the pivoting flyweight centrifugal clutch 330. In this embodiment, the second clutch hub 32 includes at least one friction-enhancing surface that is formed on the at least one lateral surface of the second clutch hub 32 (e.g., a surface of at least one of the retaining plates 35).

In the specific embodiment provided in FIGS. 16A to 22B, the at least one friction-enhancing surface includes a plurality of friction covers 334 that are mounted on the retaining plates 35 of the second clutch hub 32.

In an embodiments such as shown in FIGS. 16b, 19, 20, 21A, and 21B, the clutch override assembly 90 further includes a torque plate 340 that is mounted on the clutch slider element 50, and a drive assembly 360 that is connected between the torque plate 340 and the actuator element 92. The drive assembly 360 is structured to drive the actuator element 92 of the clutch override assembly 90 to move relative to the torque plate 340 between the non-override position and the override position.

In an additional embodiment, the torque plate 340 is structure to include some or all of the above-described features and/or element of the mounting plate 58 that is mounted to the drum 36.

In an additional embodiment, the clutch override assembly 90 further includes an actuation plate 342, where the actuation plate 342 defines the actuator element 92 of the clutch override assembly 90. The actuation plate 342 is connected to the torque plate 340 and/or the first clutch hub 52 of the clutch slider element 50 such that the actuation plate 342 can move relative to the first clutch hub 52 between the non-override and override positions. In this embodiment, the non-override position of the actuation plate 342 is defined as a position where the actuation plate 342 is spaced apart from the centrifugal clutch 30, and the override position is defined as a position where at least one surface of the actuation plate 342 frictionally contacts the at least one surface of the second clutch hub 32 on the centrifugal clutch 30. In this way, the actuation plate 342 allows the clutch override assembly 90 to "matingly", frictionally clamp against the lateral side surfaces of the second clutch hub 32 on the centrifugal clutch 30, thereby transferring torque to the second clutch hub 32 by friction forces to rotatably couple the centrifugal clutch 30 and the clutch slider element 50.

In the specific embodiment provided in FIGS. 16b, 19, 20, 21A, and 21B, the torque plate 340 is structured to be mounted to the drum 36 such that the torque plate 340 rotates with the clutch slider element 50 and the rotor 42, due to rotation of the rotor 42. In this embodiment, the torque plate 340 includes a first plurality of holes 340a that are formed on a radially outward portion of the torque plate 340, around the entire torque plate 340. A plurality of bolted connections are provided through the first plurality of holes 340a on the torque plate 340 for mounting the torque plate 340 directly to the mounting flange of the drum 36. The torque plate 340 also includes a plurality of first mounting apertures 340c through which the actuation plate 342 is movably connected thereto.

The torque plate 340 also includes an inner through aperture 340d that is sized to be received around the clutch slider element 50 for connecting torque plate 340 on clutch slider element 50. In the specific embodiment shown in FIGS. 16b, 19, 20, 21A, and 21B, the inner through aperture 340d has a hexagonal cross-section corresponding to hexagonal cross-section of the first clutch hub 52 of the clutch slider element 50. By forming the first clutch hub 52 and inner through-aperture 340d in this way, the torque plate 340 will rotate with rotation of the clutch slider element 50, regardless of whether the torque plate 340 is directly mounted to the drum 36. The torque plate 340 is generally rotatably connected to the clutch slider element 50 in the various embodiments of the present disclosure. The torque plate 340 is generally mounted to the drum 36 or, in a particular embodiment where the rotor 42 is concentric to the drum 36, the torque plate 340 may be mounted to the rotor 42, and the rotor 42 is rotatably connected to the drum 36.

The actuation plate 342 of the clutch override assembly 90 is connected to the torque plate 340 such that the actuation plate 342 is rotatably coupled to, and rotates with, the torque plate 340. The actuation plate 342 is also connected to the torque plate 340 such that the actuation plate 342 can be slid axially relative to the torque plate 340 (along a long axis of the first clutch hub 52), when moving between the non-override and override positions.

As noted above, the torque plate 340 includes the plurality of first mounting apertures 340c through which the actuation plate 342 is movably connected. In the specific embodiment provided in FIG. 16A to 16B, a plurality of rod elements 343 are mounted to the actuation plate 342 and are slidable received within the first mounting apertures 340c on the torque plate 340 such that the actuation plate 342 is axially slidable relative to the torque plate 340, along the long axis of the first clutch hub 52. In this way, the actuation plate 342 can slide axially relative to the torque plate 340 but the actuation plate 342 remains rotationally connected to the torque plate 340.

Figure 21A:
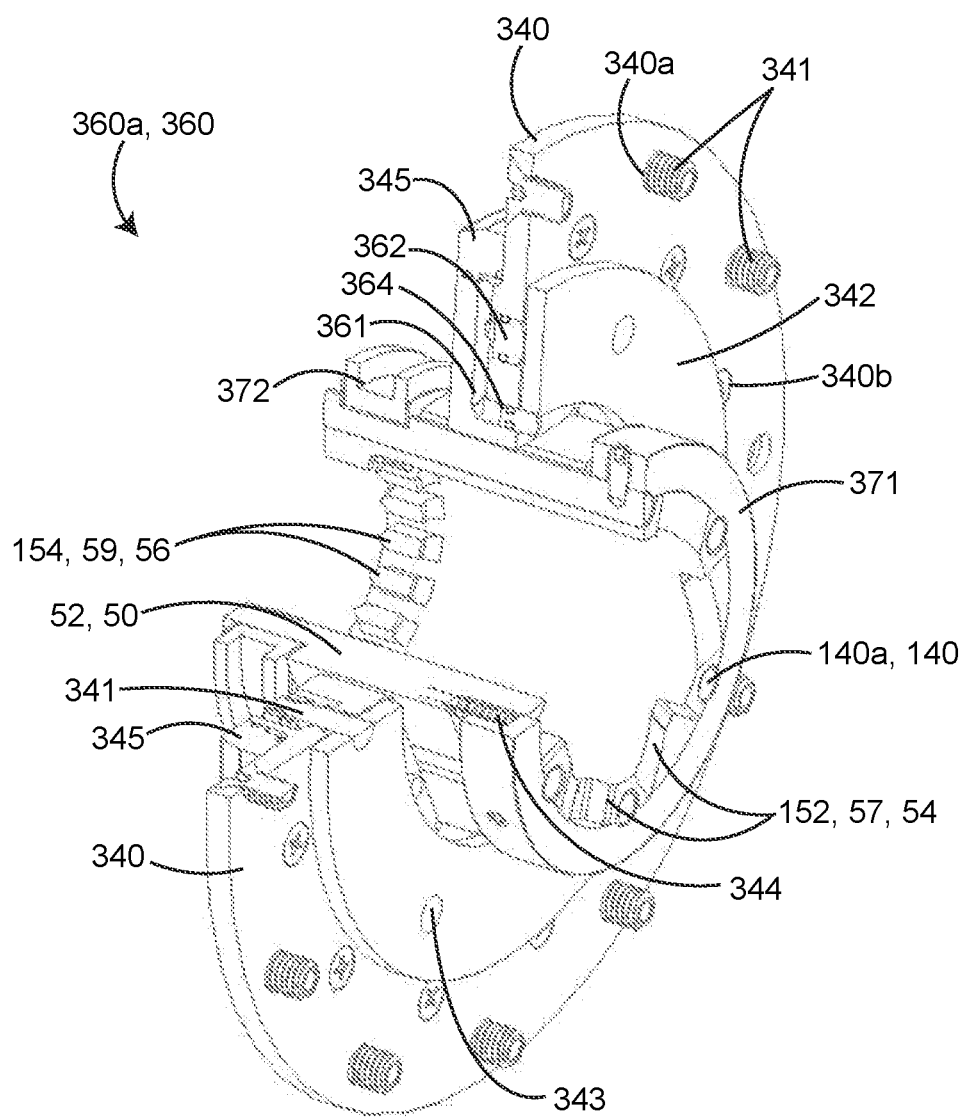
FIG. 21A shows a partial section view of the clutch slider element, torque plate and drive actuator of the third embodiment of the transmission system shown in FIG. 16A.
Figure 21B:
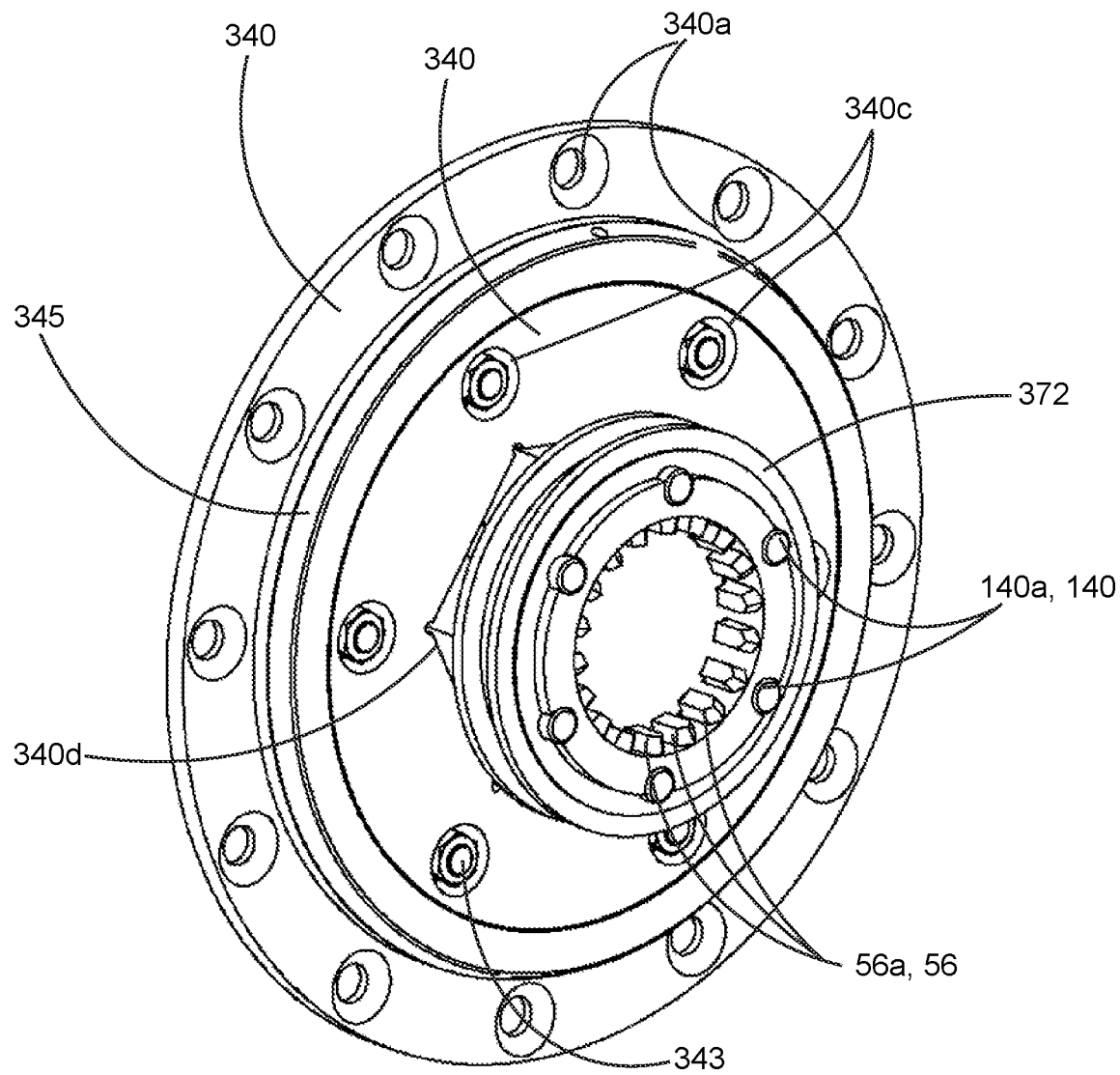
FIG. 21B shows another perspective view of the clutch slider element, torque plate and drive actuator of the third embodiment of the transmission system shown in FIG. 16A.

In an additional embodiment such as shown in FIG. 21A, the clutch override assembly 90 includes at least one primary biasing element 341 for biasing the actuation plate 342 towards the non-override position. In the specific embodiment provided in FIG. 21A, the at least one primary biasing element 341 is structured as a plurality of compression springs that are connected between actuation plate 342 and the torque plate 340.

In an embodiment such as provided in FIGS. 16A to 23B the clutch override assembly 90 further includes a driving actuator 370. The driving actuator 370 is structured to be connected to the clutch slider element 50 for engaging with the drive assembly 360 such that the drive assembly 360 drives the actuation plate 342 from the non-override position to the override position.

In an additional embodiment such as shown in FIGS. 16A to 23B, the driving actuator 370 further includes a contact ring 371 that is structured to abut at least one driving rod 364 of the hydraulic drive assembly 360. The driving actuator 370 also includes a control ring 372 that is structured to be driven by the at least one selector element for sliding the driving actuator 370 between the actuated and unactuated positions.

In the specific embodiment provided in FIGS. 16A to 22B, the clutch slider element 50 and driving actuator 370 are mounted through the through-aperture 340d of the torque plate 340 such that the control ring 372 is disposed on a first side of the torque plate 340, and the contact ring 371 is disposed on a second side of the torque plate 340.

In an additional embodiment, the contact ring 371 of the driving actuator 370 is sized so that an outer diameter of the contact ring 371 is smaller than an inner diameter of the actuation plate 342. In this embodiment, the outer diameter of the contact ring 371 is sufficiently smaller such that the actuation plate 342 does not contact the contact ring 371 as the action plate is driven between the non-override and override positions and/or such that the actuation plate 342 does not contact the contact ring 371 as the contact ring 371 is driven between the actuated and unactuated positions.

In at least some embodiments of the driving actuator 370 as disclosed herein, the contact ring 371 of the driving actuator 370 includes some or all of the above-described features of the actuation ring 120 described above with reference to the embodiments of FIGS. 3 to 8D and FIGS. 9 to 15D, and the control ring 372 includes some or all of the above-described features of the selector ring 122 described above with reference to the embodiments of FIGS. 3 to 8D and FIGS. 9 to 15D.

In an embodiment such as shown in FIGS. 16A to 23B where the actuator element 92 includes the control ring 372 and the contact ring 371, the driving actuator 370 further includes the plurality of connector elements 140, where the plurality of connector elements 140 are mounted between the contact ring 371 and the control ring 372.

In the specific embodiment provided in FIGS. 16A to 23B, the plurality of connector elements 140 are the plurality of axial connection rods 140a that extend along a length of the first clutch hub 52. Each of the control ring 372 and contact ring 371 include a plurality of corresponding through-apertures. The ends of each connection rod of the plurality of axial connection rods 140a are received in one of the plurality of corresponding through-apertures on either the control ring 372 or the contact ring 371 such that the control ring 372 and contact ring 371 are connected together via the plurality of axial connection rods 140a. In this way, the control ring 372 and contact ring 371 are slidably coupled together and can slide relative to the first clutch hub 52 and/or torque plate 340 between the unactuated position (shown in FIGS. 22A and 23A) and the actuated position (shown in FIGS. 22B and 23B).

As described previously the axial connection rods 140a may be either embedded in the first clutch hub 52 of the clutch slider element 50 or, may protrude beyond an outer circumference of the first clutch hub 52 and pass through respective clearance notches of the torque plate 340 so that they are not subjected to any contact force transmitted between the torque plate 340 and the clutch slider element 50.

In the specific embodiment provided in FIGS. 16B to 21, the the first clutch hub 52 includes the plurality of longitudinal channels 53, and the plurality of connector elements 140 of the driving actuator 370 are mounted between the contact ring 371 and the control ring 372 and are sized to be slidably received within the plurality of longitudinal channels 53 on the first clutch hub 52 such for slidably mounting the driving actuator 370 on the clutch slider element 50.

In an additional embodiment, the driving actuator 370 further includes the least one ring biasing element 344 that is connected between the driving actuator 370 and the first clutch hub 52 for biasing the driving actuator 370 towards the unactuated position.

In the specific embodiment provided in FIGS. 16A to 23B, the at least one ring biasing element 344 includes a plurality of radially disposed compression springs that are connected between the contact ring 371 and a portion of the first clutch hub 52. The plurality of radially disposed compression springs are mounted circumferentially around the first clutch hub 52, radially external to the first tooth members 57 of the first clutch hub 52. The compressions springs apply a biasing force to the actuation plate 342 to bias the actuation plate 342 towards the non-override position The plurality of radially disposed compression springs or other biasing element keeps the control ring 372 and contact ring 371 in the unactuated position. When the force exerted by the at least one selector element onto the control ring 372 overcomes the biasing force of the radially disposed compression springs (or other biasing element), the control ring 372 and contact ring 371 will slide along the first clutch hub 52 towards the actuated position.

In an embodiment, the clutch override assembly 90 on the clutch slider element 50 can be assembled based on the following steps. First, the driving actuator 370, without the contact ring 371, is slidably mounted onto the first clutch hub 52 of the clutch slider element 50 (i.e., by sliding the connector elements 140 of the driving into open ends of the longitudinal channels 53 of the first clutch hub 52. The torque plate 340 is then inserted over the driving actuator 370 and the first clutch hub 52 of the clutch slider element 50 such that the clutch slider element 50 received through the inner aperture of the torque plate 340. The contact ring 371 is then mounted on the free ends of each of the plurality of connector elements 140 and is secured in place thereon.

In an embodiment such as shown in FIGS. 16B, and 21C to 22B, the drive assembly 360 is a hydraulic drive assembly 360a.

In the specific embodiment provided in FIGS. 21C to 22B, the hydraulic drive assembly 360a is contained within a hydraulic ring 345 that is positioned on the torque plate 340

Figure 22A:
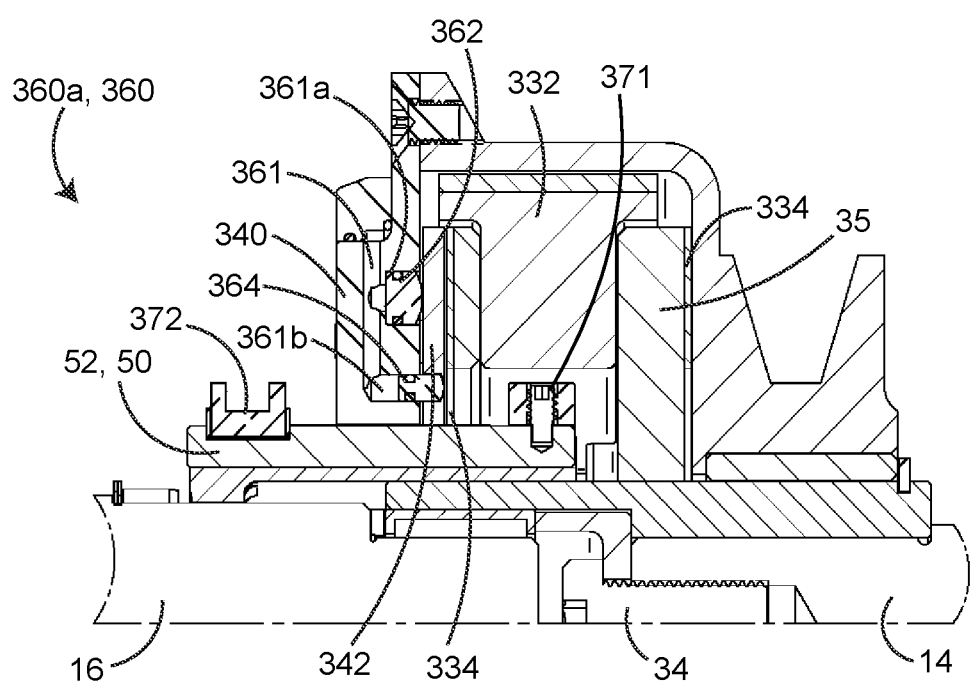
FIG. 22A shows a side, section view of the third embodiment of the transmission system shown in FIG. 16A, where the drive actuator is in the unactuated position.
Figure 22B:
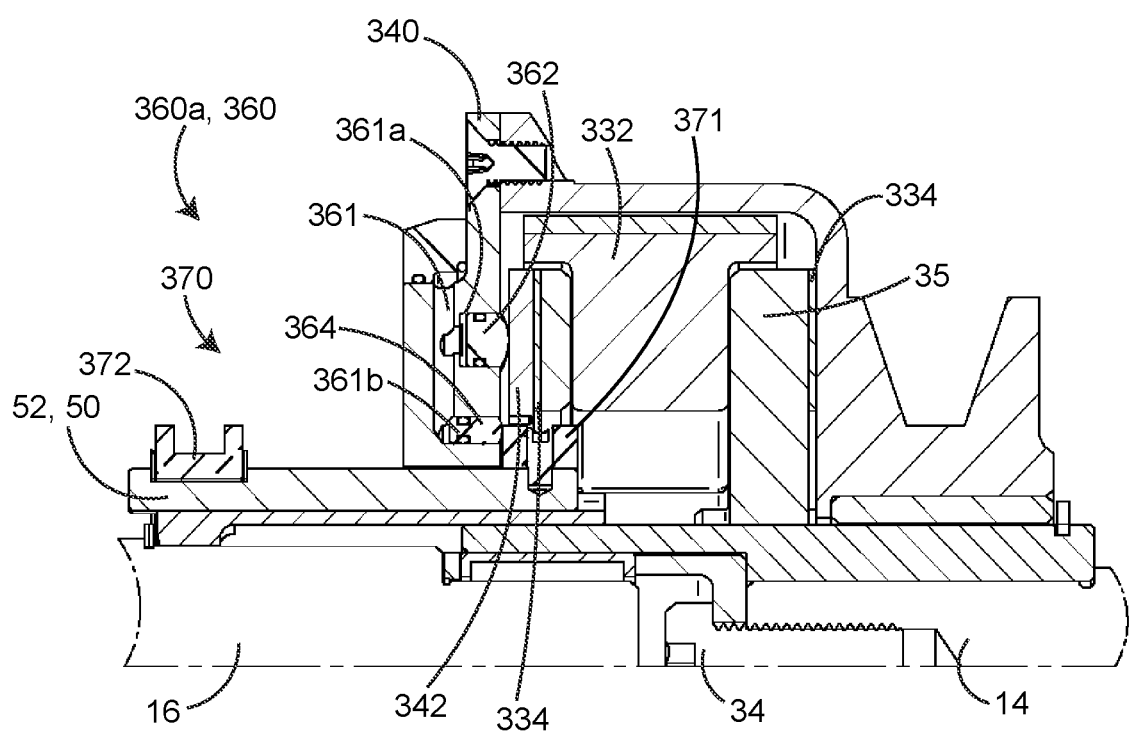
FIG. 22B shows a side, section view of the third embodiment of the transmission system shown in FIG. 16A, where the drive actuator is in the actuated position.

Referring to FIGS. 16B, and 22A to 22B, the hydraulic drive assembly 360a includes a hydraulic conduit 361 that is formed in the torque plate 340 and that contains a volume of hydraulic fluid. The hydraulic drive assembly 360a also includes at least one driving rod 364 that is slidably mounted in at least one first channel 361a of the hydraulic conduit 361 for moving therewithin between a first retracted position (shown in FIGS. 22A) and a first extended position (shown in FIG. 22B). Furthermore, the hydraulic drive assembly 360a includes at least one driven rod 362 that is slidably mounted in at least one second channel 361b of the hydraulic conduit 361 such that when the at least one driving rod 364 is in the first retracted position, the at least one driven rod 362 is positioned in a second retracted position (also shown in FIGS. 22A), and when the at least one driving rod 364 is moved towards the first extended position, the at least one driven rod 362 will be driven towards a second extended position (also shown in FIG. 22B). Within the hydraulic drive assembly 360a, the hydraulic conduit 361 is formed in the torque plate 340 such that when the at least one driven rod 362 is driven from the second retracted position, towards the second extended position, the at least one driven rod 362 will contact the actuation plate 342 for driving the actuation plate 342 towards the override position. The movement of the at least on driving rod 364 from the first retracted position to the first extended position, within the hydraulic conduit 361, pressurizes the hydraulic fluid contained within the hydraulic conduit 361 and thereby drives the at least one driven rod 362 from the second retracted position to the second extended position, where the at least one driven rod 362 will then contact the actuation plate 342, and effectively drive the actuation plate 342 from the non-override position to the override position. In this way, when the at least one driven rod 362 is in the second retracted position, the actuation plate 342 will be in the non-override position and when the at least one driven rod 362 is in the second extended position, the actuation plate 342 will be in the override position.

In an embodiment such as shown in FIGS. 22A and 22B, the at least one first channel 361a of the hydraulic conduit 361 is a plurality of first channels 361a, and the at least one second channel 361b of the hydraulic conduit 361 is a plurality of second channels 361b. In this same embodiment, the at least one driving rod 364 is a plurality of driving rods 364 that are slidably mounted in the plurality of first channels 361a, and the at least one driven rod 362 is a plurality of driven rods 362 that are slidably mounted in the plurality of second channels 361b.

In an additional embodiment such as shown in FIGS. 22A and 22B the hydraulic conduit 361 is formed in the torque plate 340 such that the at least one second channel 361b is positioned at a radially more outward position than the at least one first channel 361a.

Figure 19:
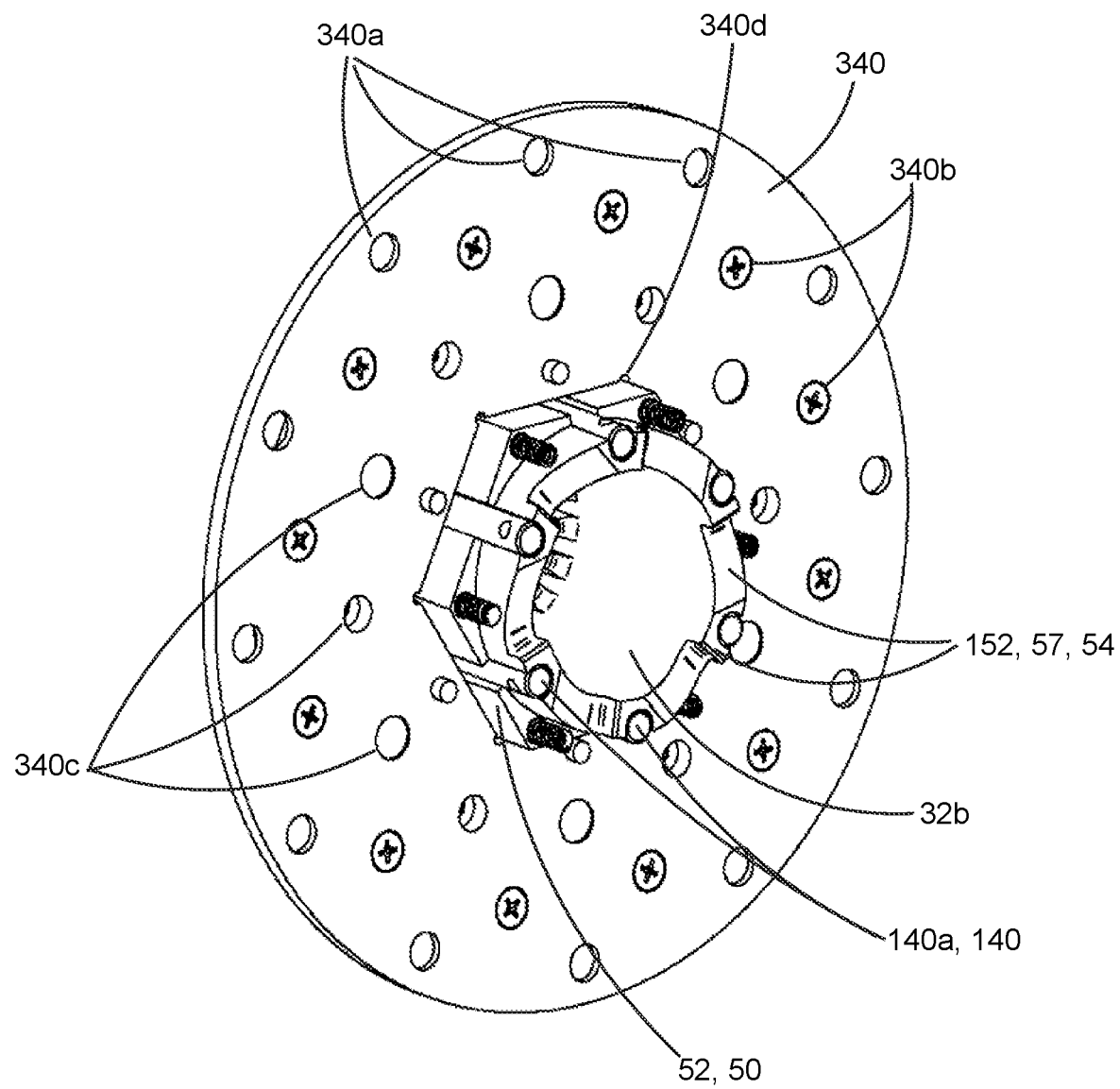
FIG. 19 shows a perspective view of the torque plate and clutch slider element of the third embodiment of the transmission system shown in FIG. 16A.
Figure 20:
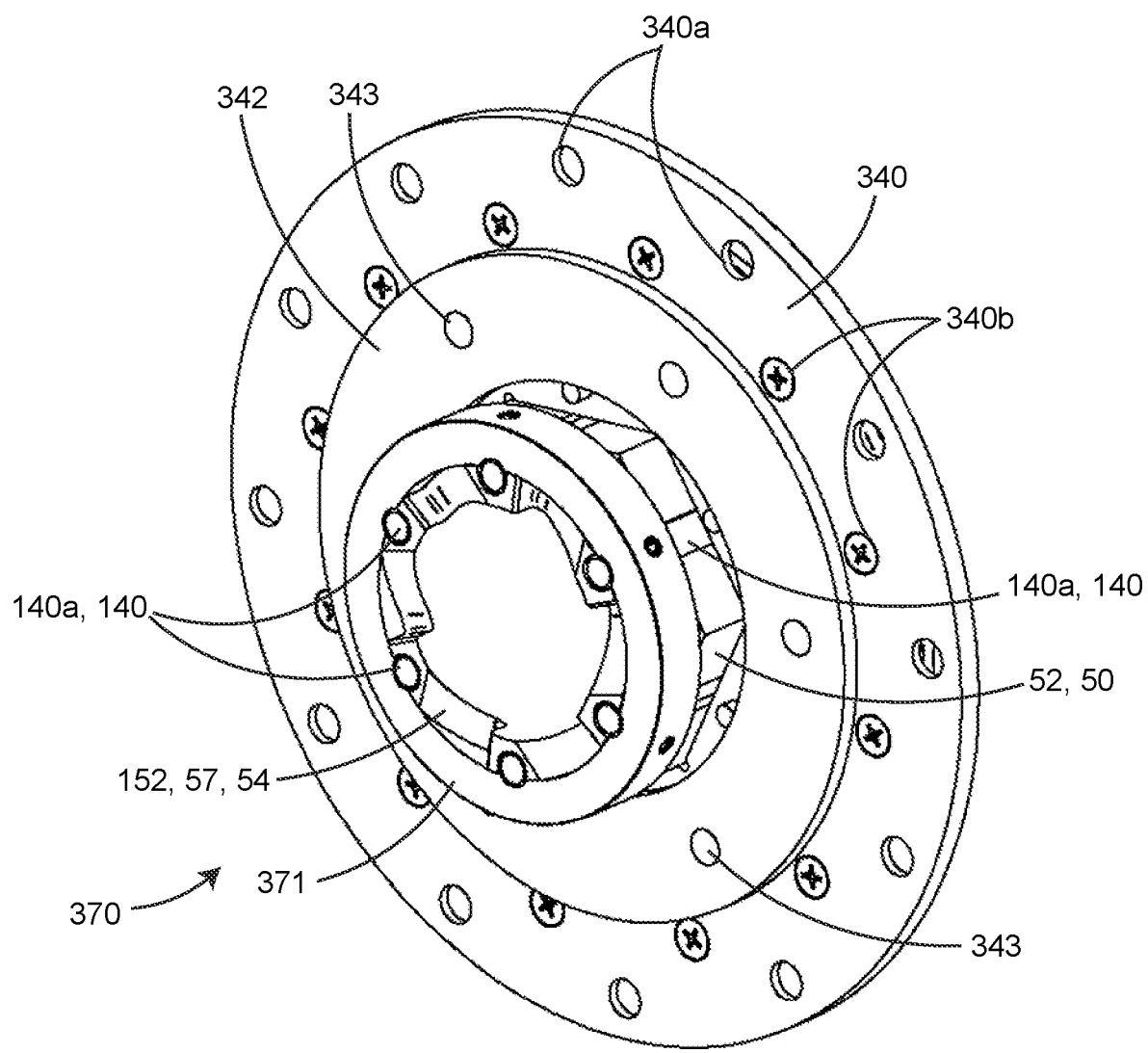
FIG. 20 shows a perspective view of the clutch slider element, torque plate and drive actuator of the third embodiment of the transmission system shown in FIG. 16A.

In the specific embodiment provided in FIG. 19, the torque plate 340 includes a third plurality of holes that are arranged in an annular a pattern about the torque plate 340, where the third plurality of holes define the plurality of first channels 361a of the hydraulic conduit 361. The torque plate 340 also includes a fourth plurality of holes which are also arranged in an annular pattern about the torque plate 340, and the fourth plurality of holes define the plurality of second channels 361b of the hydraulic conduit 361.

In the specific embodiments provided in FIGS. 16B, and 22A to 23B, the hydraulic conduit 361 includes a ring-shaped hydraulic conduit 361 that is at least partially formed within the hydraulic ring 345 and which extends circumferentially around the hydraulic ring 345. The hydraulic conduit 361 also includes the third and fourth pluralities of holes that define the plurality of first channels 361a and the plurality of second channels 361b. The torque plate 340 includes at least one fluid inlet for filling the hydraulic conduit 361 with the hydraulic fluid, and at last one closure structure that is provided with the at least one fluid inlet for sealing off the hydraulic conduit 361 during operation of the clutch override assembly 90.

In the specific embodiment shown in FIG. 19, the torque plate 340 also includes a second plurality of holes 340b for mounting the hydraulic ring 345 over the hydraulic drive assembly 360a.

In an additional embodiment such as provided in FIGS. 16A to 22B, the driving actuator 370 of the clutch override assembly 90 is structured for driving the at least one driving rod 364 between the first retracted position and the first extended position. Specifically, the driving actuator 370 is slidably connected on the clutch slider element 50 for sliding there along between a unactuated position where the driving actuator 370 does not contact that at least one driving rod 364 and the at least one driving rod 364 remains in the first retracted position, and an actuated position where a portion of the driving actuator 370 (i.e., the contact ring 371) abuts the at least one driving rod 364 and applies a force to the at least one driving rod 364 for driving the at least one driving rod 364 from the first retracted position towards the first extended position. As described previously, the movement of the at least on driving rod 364 from the first retracted position to the first extended position, within the hydraulic conduit 361, pressurizes the hydraulic fluid contained within the hydraulic conduit 361 and thereby drives the at least one driven rod 362 from the second retracted position to the second extended position.

Furthermore, by properly sizing the rods of the hydraulic circuit, it is possible to exert a higher clamping force than the one exerted by the actuation ring 120. In some embodiments, the at least one driven rod 362 has a cross-sectional size that is substantially the same as the at least one driving rod 364.

In at least some other embodiments, the at least one driven rod 362 has a cross-sectional size that is larger than that of the at least one driving rod 364. In this way, it is possible for the at least one driven rod 362 to exert greater force on the actuation plate 342 than the force that is exerted by the driving actuator 370 on the at least one driving rod 364. For example, sizing the at least one driven rod 362 with a diameter that is double the diameter of the at least one driving rod 364 will result in the at least one driven rod 362 exerting a force that is four times greater than the force exerted by the driving actuator 370 on the at least one driving rod 364.

Figure 23A:
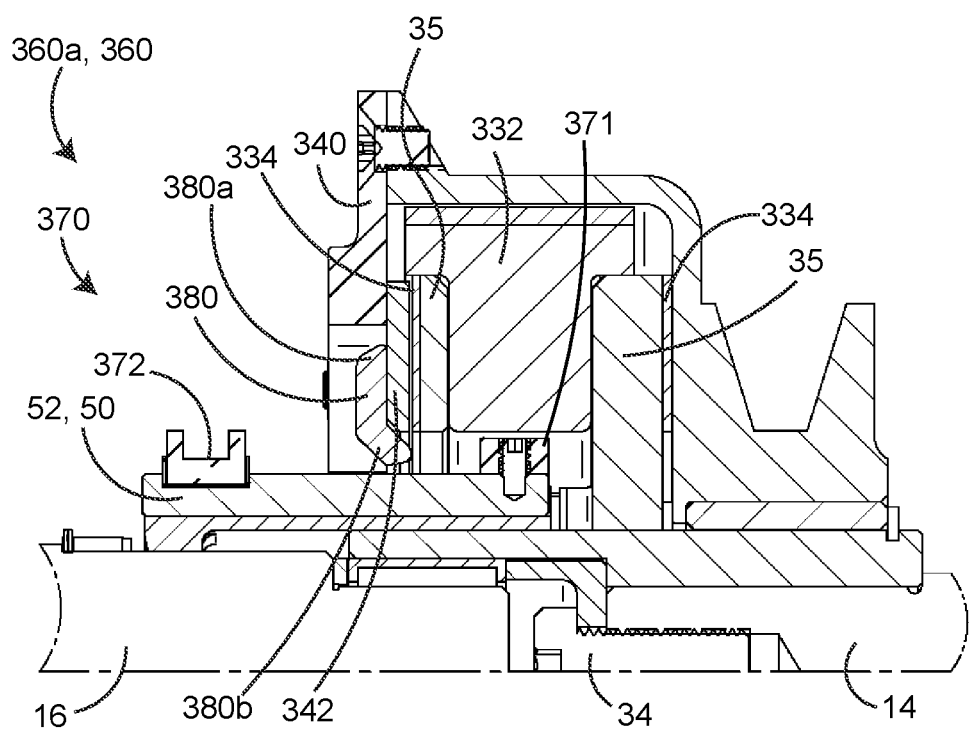
FIG. 23A shows a side, section view of the third embodiment of the transmission system shown in FIG. 16A, where the drive actuator includes a pivoting lever member, and the pivoting lever member is in a first pivot position.
Figure 23B:
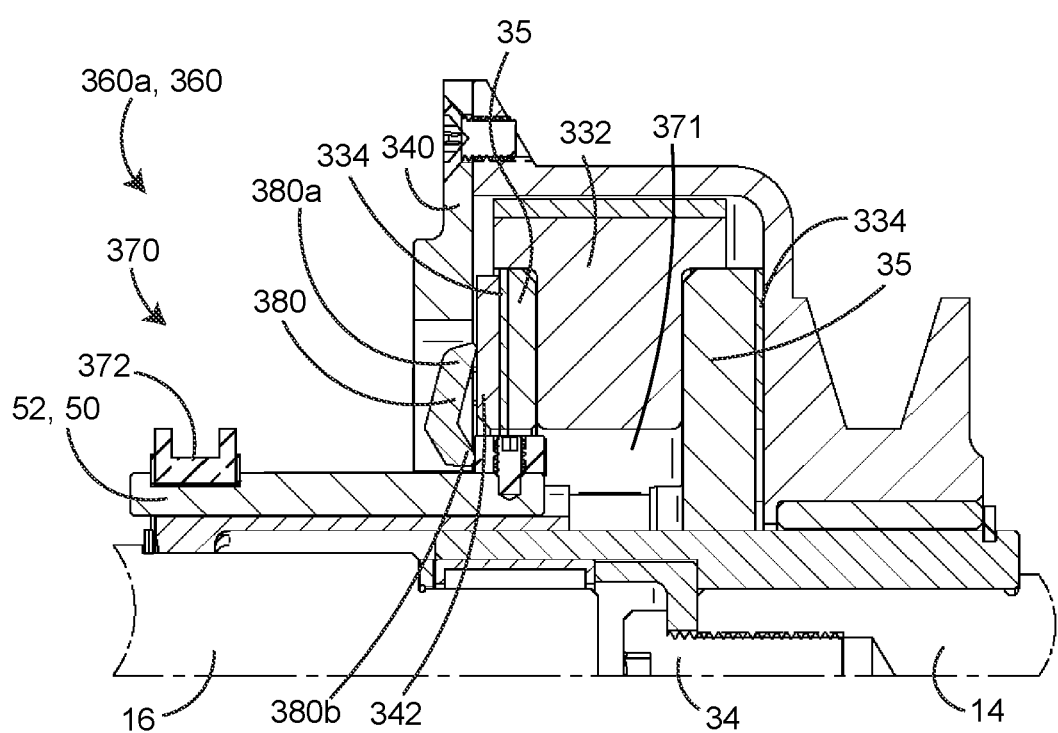
FIG. 23B shows a side, section view of the third embodiment of the transmission system shown in FIG. 23A, where the pivoting lever member is in a second pivot position.

In an alternate embodiment of the drive assembly 360 shown in FIGS. 23A and 23B, the drive assembly 360 is a lever-based drive assembly 360. In the embodiments, the drive assembly 360 includes a pivoting lever member 380, where the pivoting lever member 380 is pivotably connected to the torque plate 340 to pivot thereabout between a first pivot position (shown in FIG. 23A) where the lever does not contact the actuation plate 342, and a second pivot position (shown in FIG. 23B). The pivoting lever member 380 is structured such that as the pivoting lever member 380 pivots from the first pivot position to the second pivot position, a first lever arm 380a of the pivoting lever member 380 is brought into contact with the actuation plate 342 (see FIGS. 23B) and applies a force to the actuation place to force the actuation plate 342 from the non-override position, towards the override position.

In the embodiment shown in FIGS. 23A and 23B, the driving actuator 370 of the clutch override assembly 90 functions to drive the pivoting of the pivoting lever member 380 between the first and second positions. As the driving actuator 370 slides from the unactuated position (shown in FIG. 23A) to the actuated position (shown in FIG. 23B), the contact ring 371 of the driving actuator 370 contacts a second lever arm 380b of the pivoting lever member 380 that is opposite the first lever arm 380a. As the contact ring 371 contacts the second lever arm 380b, the contact ring 371 drives the pivoting lever member 380 to pivot about a pivot point thereof, from the first pivot position to the second pivot position to drive the motion of the actuation plate 342 relative to the torque plate 340.

In the specific embodiments provided in FIGS. 23A and 23B, the torque plate 340 includes a plurality of regularly spaced notches that span radially along the torque plate 340 from the inner through aperture 340d to a location that is approximately at the middle of the actuation plate 342. The pivoting lever member 380 is a continuous member that is pivotably mounted within the annular opening of the torque plate 340.

By structuring the clutch override assembly 90 and driving actuator 370 in this way, the force that is required to be applied by the contact ring 371 of the driving ring (and therefore the force that must be applied by the at least one selector element on the control ring 372) in order to start the internal combustion engine 12 while in the electric-only drive mode is independent of the biasing forces acting on the shoes, weighted levers 234, or flyweights of the centrifugal clutch 30. The force applied by the contact ring 371 (e.g., the driving actuator 370) only needs to be sufficiently high so as to overcome the biasing' forces maintaining the actuation plate 342 and the actuation ring 120 in the non-override and unactuated positions, respectively. As many embodiments of the transmissions system will have centrifugal biasing elements with greater biasing forces than the biasing forces maintaining the actuation plate 342 and the actuation ring 120 in the non-override and unactuated positions, the structure of the clutch override assembly 90 and drive assembly 360 can provide for a more straightforward starting of the internal combustion engine 12 when the transmission system 10 is in the electric-only drive mode and the cutch slider element is in the third engagement position.

The specific embodiments described above have been shown by way of example, and it should be understood that these embodiments may be susceptible to various modifications and alternative forms. It should be further understood that the above-described embodiments are intended to be examples of the present disclosure and alterations and modifications may be affected thereto, by those of skill in the art, without departing from the scope of the disclosure that is defined solely by the claims appended hereto.

REFERENCE NUMERALS 10 transmission system
12 internal combustion engine
14 driving shaft
14a threaded hole
14b narrow cylindrical portion
14c wide cylindrical portion
16 driven shaft
20 vehicle
30 centrifugal clutch
32 second clutch hub
32a collar
32b mounting bore
32d keyway
33 bearing
34 threaded fastener
35 retaining plate
36 drum
36a drum body
36b drum collar 37 mounting flange
38 clutch element
39 inner surface
40 electric machine
42 rotor
44 stator
50 clutch slider element
52 first clutch hub
53 longitudinal channels
54 first connector
54a first engagement surfaces
55 through-bore
56 second connector
56a second engagement surfaces
57 first tooth members
58 mounting plate
58a through-opening of mounting plate
59 second tooth members
61 clutch connection element
6X2 bolted connections
63 driven shaft connection element
63a dog teeth
63b square teeth
65 tooth members
74 power store
76 battery management system
77 power electronics
80 external load
82 control unit
84 user/operator
86 slider element actuator
90 clutch override assembly
92 actuator element
114 keyway
116 shoulder portion
120 actuator ring
121 long nose set screws
122 selector ring
122a pair of flanges
122b selector channel
124 wedged surface
130 slide centrifugal clutch
132 spring-biased flyweights
132a radially slidable clutch shoes
132b shoe body
132c slide portion
133 shoe biasing element
134 frictional surface
135 inner hub portion
136 hub flange
137 slots
140 connector elements
140a axial connection rods
142 actuator biasing element
142a compression springs
152 spiral teeth
154 dog teeth
156 square teeth
159 thrust washer
165 stop ring
167 shaft end
218 thrust washer
230 axial-centrifugal clutch
232 clutch pack
232a first friction plates
232b second friction plates
233 engagement portion
234 weighted levers
234a bottom contact portion
235 pivot point
236 longitudinal openings
238 gear element
240 plate biasing element
240a helical springs
241 rod
330 pivoting flyweight centrifugal clutch
332 pivoting flyweights
333 spacer
334 friction cover
340 torque plate
340a first plurality of holes
340b second plurality of holes
340c first mounting apertures
340d inner through aperture
341 primary biasing elements
342 actuation plate
343 rod elements
344 ring biasing elements
345 hydraulic ring
360 drive assembly
360a hydraulic drive assembly
361 hydraulic conduit
361a first channel
361b second channel
362 driven rod
364 driving rod
370 driving actuator
371 contact ring
372 control ring
380 pivoting lever member
380a first lever arm
380b second lever arm

What is claimed is:

1. A transmission system for selectively connecting a driven shaft, a driving shaft that is driven by an internal combustion engine, and an electric machine that includes a rotor and a stator, the transmission system comprising:
a centrifugal clutch that is connected to the driving shaft for rotating therewith, the centrifugal clutch being structured to engage the rotor, when the driving shaft is driven to rotate above a threshold speed of the centrifugal clutch, for rotatably coupling the rotor and the centrifugal clutch;
a clutch slider element that includes a first clutch hub and first and second connectors positioned thereon, the first clutch hub being connected to the rotor such that the clutch slider element rotates with the rotor, the first connector including a plurality of first engagement surfaces that are circumferentially disposed about a first portion of the first clutch hub and the second connector including a plurality of second engagement surfaces that are circumferentially disposed about a second portion of the first clutch hub, the clutch slider element being slidable relative to the centrifugal clutch between:
i) a first engagement position where the second connector is disconnected from the driven shaft, and at least some of the plurality of first engagement surfaces of the first connector are engaged with the centrifugal clutch for rotatably coupling the clutch slider element and the centrifugal clutch, the clutch slider element being rotatably coupled to the centrifugal clutch to thereby couple the electric machine to the driving shaft such that the electric machine is operable to start the internal combustion engine;

ii) a second engagement position where the first connector is disconnected from the centrifugal clutch and the second connector is disconnected from the driven shaft such that the internal combustion engine is operable to drive a rotation of the driving shaft at a speed above the threshold speed to thereby engage the centrifugal clutch and rotate the rotor such that the electric machine is operable as a generator; and iii) a third engagement position where the first connector is disconnected from the centrifugal clutch and at least some of the plurality of second engagement surfaces of the second connector are engaged with the driven shaft for rotatably coupling the clutch slider element and the driven shaft to thereby rotatably couple the rotor to the driven shaft, the rotor being rotatably coupled to the driven shaft so as to permit the driving of the driven shaft via energization of the stator and/or by rotation of the driving shaft via the internal combustion engine at a speed above the threshold speed such that the centrifugal clutch engages the rotor; and a clutch override assembly that is structured to selectively engage the centrifugal clutch, when the clutch slider element is in the third engagement position, for rotatably coupling the clutch slider element and the centrifugal clutch, the clutch override assembly including an actuator element that is movably connected to the clutch slider element for moving independently of the clutch slider element while the clutch slider element is in the third engagement position, relative thereto between a non-override position where the actuator element is positioned to permit the centrifugal clutch to be rotatably uncoupled from the clutch slider element, and an override position where the actuator element engages the centrifugal clutch such that the centrifugal clutch becomes rotatably coupled to at least one of the clutch slider element and the rotor while the rotor and clutch slider element remain rotatably coupled with the driven shaft.

2. The transmission system of claim 1, wherein the centrifugal clutch includes a second clutch hub, and at least one clutch element that is movably connected to the second clutch hub for moving between a radially inward position and a radially outward position due to rotation of the centrifugal clutch above the threshold speed; and wherein the centrifugal clutch is structured to engage the rotor when the at least one clutch element is in the radially outward position.

3. The transmission system of claim 2, wherein the actuator element is structured such that in the override position, the actuator element will engage the at least one clutch element of the centrifugal clutch such that the at least one clutch element is driven to the radially outward position and the centrifugal clutch becomes rotatably coupled to the rotor.

4. The transmission system of claim 3, wherein the centrifugal clutch is an axial-centrifugal clutch that includes a clutch pack and a plurality of weighted levers that move relative to the clutch pack, due to the rotation of the centrifugal clutch, for selectively engaging the clutch pack; and wherein the plurality of weighted levers define the at least one clutch element of the centrifugal clutch.

5. The transmission system of claim 3, wherein the centrifugal clutch includes the second clutch hub, a drum positioned about the second clutch hub, and a plurality of spring-biased flyweight elements that are pivotably connected to the second clutch hub for pivoting thereabout between the radially inward position and the radially outward position due to the rotation of the centrifugal clutch; and wherein the plurality of spring-biased flyweights define the at least one clutch element of the centrifugal clutch.

6. The transmission system of claim 5, wherein the actuator element includes at least one wedged surface that is formed at an angle relative to a long axis of the centrifugal clutch; and wherein the at least one wedged surface is positioned on the actuator element such that as the actuator element is driven from the non-override position to the override position, the at least one wedged surface contacts the at least one clutch element of the centrifugal clutch for wedging the at least one clutch element towards the radially outward position.

7. The transmission system of claim 3, wherein the actuator element is slidably mounted on the first clutch hub for sliding there along between the non-override position and the override position.

8. The transmission system of claim 7, wherein the actuator element further includes:

an actuator ring that is structured to engage the at least one clutch element of the centrifugal clutch when in the override position; and a selector ring that is structured to be driven by a selector element for driving the actuator element between the non-override position and the override position.

9. The transmission system of claim 8, wherein the first clutch hub includes a plurality of longitudinal channels formed around the circumference of the first clutch hub;

wherein the actuator element further includes a plurality of connector elements that are mounted between the actuator ring and the selector ring; and wherein the plurality of connector elements are sized to be slidably received within the plurality of longitudinal channels on the first clutch hub such for slidably mounting the actuator element on the clutch slider element.

10. The transmission system of claim 3, wherein the centrifugal clutch is at least partially surrounded by the rotor; and wherein the centrifugal clutch is sized such that when the at least one clutch element is in the radially outward position, the centrifugal clutch engages the rotor for rotatably coupling the rotor and the centrifugal clutch.

11. The transmission system of claim 3, wherein the clutch slider element is slidable relative to the centrifugal clutch along a central axis of the centrifugal clutch; and wherein the second engagement position of the clutch slider element is defined between the first engagement position and the third engagement position.

12. The transmission system of claim 2, wherein the actuator element is structured such that in the override position, the actuator element will frictionally engage at least one lateral surface of the second clutch hub of the centrifugal clutch for rotatably coupling the centrifugal clutch element and the clutch slider element.

13. The transmission system of claim 12, wherein the clutch override assembly further includes:

a torque plate that is mounted on the clutch slider element; and a drive assembly that is connected between the torque plate and the actuator element and that is structured to drive the actuator element to move relative to the torque plate between the non-override position and the override position.

14. The transmission system of claim 13, wherein the actuator element includes an actuation plate that is movably connected on the torque plate for moving relative to the torque plate between the override and non-override positions; and
wherein the actuation plate is structured such that when the actuation plate is in the override position, a surface of the actuation plate will frictionally engage at least one lateral face of the second clutch hub for rotatably coupling the centrifugal clutch and the clutch slider element.

15. The transmission system of claim 14, wherein the drive assembly is a hydraulic drive assembly that includes:
a hydraulic conduit that is formed in the torque plate and that contains a volume of hydraulic fluid;
at least one driving rod that is slidably mounted in at least one first channel of the hydraulic conduit for moving therewithin between a first retracted position and a first extended position; and
at least one driven rod that is slidably mounted in at least one second channel of the hydraulic conduit such that when the at least one driving rod is in the first retracted position, the at least one driven rod is positioned in a second retracted position, and when the at least one driving rod is moved towards the first extended position, the at least one driven rod will be driven towards a second extended position; and
wherein the hydraulic conduit is formed in the torque plate such that when the at least one driven rod is driven from the second retracted position, towards the second extended position, the at least one driven rod will contact the actuation plate for driving the actuation plate towards the override position.

16. The transmission system of claim 15, wherein the clutch override assembly further includes:
a driving actuator that is structured for driving the at least one driving rod between the first retracted position and the first extended position, the driving actuator being slidably connected on the clutch slider element for sliding therealong between:
an unactuated position where the driving actuator does not contact the at least one driving rod and the at least one driving rod remains in the first retracted position; and
an actuated position where a portion of the driving actuator abuts the at least one driving rod for driving the at least one driving rod towards the first extended position.

17. The transmission system of claim 16, wherein the driving actuator further includes:
a contact ring that is structured to abut the at least one driving rod of the hydraulic drive assembly; and
a control ring that is structured to be driven by a selector element for sliding the driving actuator between the actuated and unactuated positions.

18. The transmission system of claim 17, wherein the first clutch hub includes a plurality of longitudinal channels formed around the circumference of the first clutch hub;
wherein the driving actuator further includes a plurality of connector elements that are mounted between the contact ring and the control ring; and
wherein the plurality of connector elements are sized to be slidably received within the plurality of longitudinal channels on the first clutch hub such for slidably mounting the actuator element on the clutch slider element.

19. The transmission system of claim 12, wherein the centrifugal clutch is at least partially surrounded by the rotor; and
wherein the centrifugal clutch is sized such that when the at least one clutch element is in the radially outward position, the centrifugal clutch engages the rotor for rotatably coupling the rotor and the centrifugal clutch.

20. The transmission system of claim 12, wherein the clutch slider element is slidable relative to the centrifugal clutch along a central axis of the centrifugal clutch; and
wherein the second engagement position of the clutch slider element is defined between the first engagement position and the third engagement position.

* * * * *